US012654227B2

(12) United States Patent
Mayer et al.

(10) Patent No.: US 12,654,227 B2
(45) Date of Patent: Jun. 16, 2026

(54) ADDITIVE MANUFACTURING APPARATUSES WITH REMOVABLE BUILD BOXES AND LID MANAGEMENT SYSTEMS

(71) Applicant: GENERAL ELECTRIC COMPANY, Evendale, OH (US)

(72) Inventors: Jacob Mayer, Cincinnati, OH (US); Victor Fulton, West Chester, OH (US); Carlos H. Bonilla, West Chester, OH (US)

(73) Assignee: General Electric Company, Evendale, OH (US)

( * ) Notice: Subject to any disclaimer, the term of this patent is extended or adjusted under 35 U.S.C. 154(b) by 395 days.

(21) Appl. No.: 18/250,846

(22) PCT Filed: Oct. 27, 2021

(86) PCT No.: PCT/US2021/056828
§ 371 (c)(1),
(2) Date: Apr. 27, 2023

(87) PCT Pub. No.: WO2022/093943
PCT Pub. Date: May 5, 2022

(65) Prior Publication Data
US 2023/0390825 A1      Dec. 7, 2023

Related U.S. Application Data

(60) Provisional application No. 63/107,119, filed on Oct. 29, 2020.

(51) Int. Cl.
*B22F 12/00*      (2021.01)
*B22F 12/53*      (2021.01)
(Continued)

(52) U.S. Cl.
CPC ............ *B22F 12/38* (2021.01); *B22F 12/222* (2021.01); *B22F 12/53* (2021.01); *B22F 12/90* (2021.01); *B33Y 30/00* (2014.12)

(58) Field of Classification Search
None
See application file for complete search history.

(56) References Cited

U.S. PATENT DOCUMENTS

| | | | |
|---|---|---|---|
| 4,034,219 A | 7/1977 | Louden et al. | |
| 4,404,566 A | 9/1983 | Clark et al. | |

(Continued)

FOREIGN PATENT DOCUMENTS

| | | |
|---|---|---|
| CN | 201815393 U | 5/2011 |
| CN | 103949636 A | 7/2014 |

(Continued)

OTHER PUBLICATIONS

US 9,744,592 B1, 08/2017, Schmitt et al. (withdrawn)
(Continued)

*Primary Examiner* — Yung-Sheng M Tsui
(74) *Attorney, Agent, or Firm* — Dinsmore & Shohl LLP

(57) ABSTRACT

An apparatus for forming a three-dimensional article having successive layers of a powder material, which layers correspond to successive cross-sections of the three-dimensional article includes a process chamber that includes a process chamber floor having an opening therethrough, the opening defining a part processing area and a lid management system. The lid management system includes an actuator including a movable arm that moves between retracted and extended positions and a machine lid connected to the movable arm. The machine lid is sized and configured to sealingly engage a perimeter of the opening of the process chamber floor with the movable arm in the extended position.

20 Claims, 39 Drawing Sheets

(51) Int. Cl.
    *B22F 12/90*      (2021.01)
    *B33Y 30/00*      (2015.01)

(56)          References Cited

U.S. PATENT DOCUMENTS

| | | | |
|---|---|---|---|
| 4,680,895 A | 7/1987 | Roestenberg | |
| 4,722,824 A | 2/1988 | Wiech, Jr. | |
| 5,012,260 A | 4/1991 | Yoshimura et al. | |
| 5,204,055 A | 4/1993 | Sachs et al. | |
| 5,387,380 A | 2/1995 | Cima et al. | |
| 6,007,318 A | 12/1999 | Russell et al. | |
| 6,092,887 A | 7/2000 | Tanino et al. | |
| 6,159,085 A | 12/2000 | Hara | |
| 6,375,874 B1 | 4/2002 | Russell et al. | |
| 6,454,811 B1 | 9/2002 | Sherwood et al. | |
| 6,607,572 B2 | 8/2003 | Gammack et al. | |
| 6,657,155 B2 | 12/2003 | Abe et al. | |
| 6,764,636 B1 | 7/2004 | Allanic et al. | |
| 6,824,714 B1 | 11/2004 | Turck et al. | |
| 6,835,222 B2 | 12/2004 | Gammack | |
| 6,945,638 B2 | 9/2005 | Teung et al. | |
| 6,989,115 B2 | 1/2006 | Russell et al. | |
| 7,034,246 B2 | 4/2006 | Muylaert et al. | |
| 7,037,382 B2 | 5/2006 | Davidson et al. | |
| 7,204,684 B2 | 4/2007 | Ederer et al. | |
| 7,225,803 B2 | 6/2007 | Boyadjieff | |
| 7,281,785 B2 | 10/2007 | Palifka et al. | |
| 7,291,002 B2 | 11/2007 | Russell et al. | |
| 7,296,990 B2 | 11/2007 | Devos et al. | |
| 7,357,629 B2 | 4/2008 | Weiskopf et al. | |
| 7,387,359 B2 | 6/2008 | Hernandez et al. | |
| 7,389,154 B2 | 6/2008 | Hunter et al. | |
| 7,435,368 B2 | 10/2008 | Davidson et al. | |
| 7,585,450 B2 | 9/2009 | Wahlstrom et al. | |
| 7,686,995 B2 | 3/2010 | Davidson et al. | |
| 7,690,909 B2 | 4/2010 | Wahlstrom | |
| 7,820,241 B2 | 10/2010 | Perret et al. | |
| 7,824,001 B2 | 11/2010 | Fienup et al. | |
| 7,850,271 B2 | 12/2010 | Gothait et al. | |
| 7,879,123 B2 | 2/2011 | Lundquist et al. | |
| 7,971,991 B2 | 7/2011 | Davidson et al. | |
| 7,979,152 B2 | 7/2011 | Davidson | |
| 8,017,055 B2 | 9/2011 | Davidson et al. | |
| 8,033,812 B2 | 10/2011 | Collins et al. | |
| 8,105,527 B2 | 1/2012 | Wahlstrom | |
| 8,167,395 B2 | 5/2012 | Fienup et al. | |
| 8,185,229 B2 | 5/2012 | Davidson | |
| 8,322,821 B2 | 12/2012 | Tsai et al. | |
| 8,951,033 B2 | 2/2015 | Hchsmann et al. | |
| 8,956,144 B2 | 2/2015 | Grasegger et al. | |
| 8,997,799 B2 | 4/2015 | Hodson et al. | |
| 9,027,378 B2 | 5/2015 | Crump et al. | |
| 9,346,127 B2 | 5/2016 | Buller et al. | |
| 9,403,235 B2 | 8/2016 | Buller et al. | |
| 9,446,448 B2 | 9/2016 | Mccoy et al. | |
| 9,586,290 B2 | 3/2017 | Buller et al. | |
| 9,636,870 B2 | 5/2017 | Kuzusako et al. | |
| 9,912,915 B2 | 3/2018 | Sinclair | |
| 9,919,474 B2 | 3/2018 | Napadensky | |
| 9,989,396 B2 | 6/2018 | Gold et al. | |
| 10,022,794 B1 | 7/2018 | Redding et al. | |
| 10,093,103 B2 | 10/2018 | Araki et al. | |
| 10,166,603 B2 | 1/2019 | Kawada et al. | |
| 10,183,330 B2 | 1/2019 | Buller et al. | |
| 10,189,267 B2 | 1/2019 | Sakai et al. | |
| 10,195,693 B2 | 2/2019 | Buller et al. | |
| 10,232,443 B2 | 3/2019 | Myerberg et al. | |
| 10,259,044 B2 | 4/2019 | Buller et al. | |
| 10,272,492 B2 | 4/2019 | Gibson et al. | |
| 10,272,525 B1 | 4/2019 | Buller et al. | |
| 10,286,452 B2 | 5/2019 | Buller et al. | |
| 10,286,571 B2 | 5/2019 | Hchsmann et al. | |
| 10,336,053 B2 | 7/2019 | Sasaki | |
| 10,343,725 B2 | 7/2019 | Martin et al. | |
| 10,350,682 B2 | 7/2019 | Myerberg et al. | |
| 10,406,262 B2 | 9/2019 | Bonassar et al. | |
| 10,414,089 B2 | 9/2019 | Maier | |
| 10,449,696 B2 | 10/2019 | Elgar et al. | |
| 10,486,361 B2 | 11/2019 | Kawabata | |
| 10,486,363 B2 | 11/2019 | Sachs et al. | |
| 10,569,331 B2 | 2/2020 | Kawada et al. | |
| 10,632,675 B2 | 4/2020 | Chanclon et al. | |
| 10,695,981 B2 | 6/2020 | Hchsmann et al. | |
| 11,167,454 B2 | 11/2021 | Rockstroh et al. | |
| 2002/0043055 A1 | 4/2002 | Conrad | |
| 2002/0079601 A1 | 6/2002 | Russell et al. | |
| 2002/0116907 A1 | 8/2002 | Gammack et al. | |
| 2004/0194250 A1 | 10/2004 | Conrad et al. | |
| 2006/0219163 A1 | 10/2006 | Merot et al. | |
| 2006/0221127 A1 | 10/2006 | Lee et al. | |
| 2007/0077323 A1 | 4/2007 | Stonesmith et al. | |
| 2008/0111271 A1 | 5/2008 | Khoshnevis | |
| 2008/0117240 A1 | 5/2008 | Sheinman | |
| 2008/0200104 A1 | 8/2008 | Chuang | |
| 2008/0284819 A1 | 11/2008 | Owaki et al. | |
| 2008/0303882 A1 | 12/2008 | Silverbrook et al. | |
| 2008/0303883 A1 | 12/2008 | Miyazawa | |
| 2010/0043698 A1 | 2/2010 | Bolt | |
| 2012/0018032 A1 | 1/2012 | Von Essen | |
| 2013/0004607 A1 | 1/2013 | Hoechsmann et al. | |
| 2014/0240396 A1 | 8/2014 | Rosati et al. | |
| 2015/0110911 A1 | 4/2015 | Snyder | |
| 2015/0298394 A1 | 10/2015 | Sheinman | |
| 2015/0343533 A1 | 12/2015 | Park et al. | |
| 2016/0052054 A1 | 2/2016 | Orange et al. | |
| 2016/0096360 A1 | 4/2016 | Zetzl et al. | |
| 2016/0114533 A1 | 4/2016 | Grasegger et al. | |
| 2016/0151973 A1 | 6/2016 | Juan Jover et al. | |
| 2016/0339640 A1 | 11/2016 | Juan et al. | |
| 2016/0361874 A1 | 12/2016 | Park et al. | |
| 2016/0368054 A1 | 12/2016 | Ng et al. | |
| 2017/0050378 A1 | 2/2017 | Ederer et al. | |
| 2017/0106443 A1 | 4/2017 | Karlsson | |
| 2017/0106595 A1 | 4/2017 | Gnther et al. | |
| 2017/0120521 A1 | 5/2017 | Sakura et al. | |
| 2017/0144374 A1 | 5/2017 | Ono | |
| 2017/0182717 A1 | 6/2017 | Byun et al. | |
| 2017/0203514 A1 | 7/2017 | McCoy et al. | |
| 2017/0217104 A1 | 8/2017 | Cortes I Herms et al. | |
| 2017/0239725 A1 | 8/2017 | Ufton | |
| 2017/0246808 A1 | 8/2017 | Hchsmann et al. | |
| 2017/0252975 A1 | 9/2017 | Park | |
| 2017/0266880 A1 | 9/2017 | Matsubara | |
| 2017/0334138 A1 | 11/2017 | Vilajosana et al. | |
| 2017/0334144 A1 | 11/2017 | Fish et al. | |
| 2018/0001556 A1* | 1/2018 | Buller | B29C 64/386 |
| 2018/0001567 A1 | 1/2018 | Juan et al. | |
| 2018/0009110 A1 | 1/2018 | Langford et al. | |
| 2018/0056582 A1 | 3/2018 | Matusik et al. | |
| 2018/0111194 A1 | 4/2018 | Buller et al. | |
| 2018/0111196 A1 | 4/2018 | Brezoczky et al. | |
| 2018/0236504 A1 | 8/2018 | Pourcher et al. | |
| 2018/0297283 A1 | 10/2018 | Hagedorn et al. | |
| 2018/0304364 A1 | 10/2018 | Myerberg et al. | |
| 2018/0339467 A1 | 11/2018 | Donovan et al. | |
| 2018/0345541 A1 | 12/2018 | Cuyt et al. | |
| 2019/0001413 A1 | 1/2019 | Golz et al. | |
| 2019/0070779 A1 | 3/2019 | Chen et al. | |
| 2019/0084231 A1 | 3/2019 | Chanclon Fernandez et al. | |
| 2019/0099949 A1* | 4/2019 | Stammberger | B29C 64/321 |
| 2019/0134705 A1 | 5/2019 | Sheinman et al. | |
| 2019/0152148 A1 | 5/2019 | Kremer | |
| 2019/0160733 A1 | 5/2019 | Mirkin et al. | |
| 2019/0201982 A1 | 7/2019 | Lombardo et al. | |
| 2019/0210277 A1 | 7/2019 | Sachs et al. | |
| 2019/0210282 A1 | 7/2019 | Sugiura et al. | |
| 2019/0217385 A1 | 7/2019 | Bonilla Gonzalez et al. | |
| 2019/0218501 A1 | 7/2019 | Kamen et al. | |
| 2019/0240732 A1 | 8/2019 | Koch et al. | |
| 2019/0358901 A1 | 11/2019 | Dugan | |
| 2019/0366626 A1 | 12/2019 | Swartz et al. | |
| 2020/0147885 A1 | 5/2020 | Gimenez Manent et al. | |
| 2020/0282461 A1 | 9/2020 | Fang | |

(56) References Cited

U.S. PATENT DOCUMENTS

| | | | |
|---|---|---|---|
| 2020/0298474 A1 | 9/2020 | Gimenez et al. | |
| 2020/0324467 A1 | 10/2020 | Tjellesen et al. | |
| 2022/0111443 A1* | 4/2022 | Hoy | B33Y 40/20 |

FOREIGN PATENT DOCUMENTS

| | | | |
|---|---|---|---|
| CN | 103862045 B | 1/2017 | |
| CN | 106738907 A | 5/2017 | |
| CN | 206528076 U | 9/2017 | |
| CN | 109366982 A | 2/2019 | |
| CN | 208745355 U | 4/2019 | |
| CN | 109732916 A | 5/2019 | |
| CN | 110076991 A | 8/2019 | |
| CN | 209851598 U | 12/2019 | |
| CN | 210211384 U | 3/2020 | |
| CN | 210880916 U | 6/2020 | |
| DE | 19743804 A1 | 4/1999 | |
| DE | 19846478 A1 | 4/2000 | |
| DE | 102009036153 A1 | 2/2011 | |
| DE | 202013009787 U1* | 12/2013 | B22F 12/86 |
| EP | 1704989 A2 | 9/2006 | |
| EP | 1847370 A2 | 10/2007 | |
| EP | 1776910 B1 | 4/2013 | |
| EP | 2782743 A1 | 10/2014 | |
| EP | 2091718 B1 | 8/2016 | |
| EP | 2986405 B1 | 2/2017 | |
| EP | 3456518 A1 | 3/2019 | |
| EP | 3461574 A1 | 4/2019 | |
| EP | 3475057 A1 | 5/2019 | |
| EP | 3492244 A1 | 6/2019 | |
| EP | 3511094 A1 | 7/2019 | |
| EP | 3560714 A1 | 10/2019 | |
| EP | 3566869 A2 | 11/2019 | |
| EP | 3463817 B1 | 4/2021 | |
| EP | 3575064 B1 | 8/2021 | |
| GB | 2550339 A | 11/2017 | |
| JP | 2002292751 A | 10/2002 | |
| JP | 2006511365 A | 4/2006 | |
| JP | 2009136758 A | 6/2009 | |
| JP | 2010149318 A | 7/2010 | |
| JP | 2013193222 A | 9/2013 | |
| JP | 2015522438 A | 8/2015 | |
| JP | 2018001414 A | 1/2018 | |
| JP | 2018047562 A | 3/2018 | |
| JP | 2018144037 A | 9/2018 | |
| JP | 2020093259 A | 6/2020 | |
| WO | 2010055751 A1 | 5/2010 | |
| WO | 2011005690 A1 | 1/2011 | |
| WO | 2013182913 A2 | 12/2013 | |
| WO | 2014006877 A1 | 1/2014 | |
| WO | 2014044676 A1 | 3/2014 | |
| WO | 2014096177 A1 | 6/2014 | |
| WO | 2015112885 A1 | 7/2015 | |
| WO | 2015141779 A1 | 9/2015 | |
| WO | 2016040453 A1 | 3/2016 | |
| WO | 2016055523 A1 | 4/2016 | |
| WO | 2016083234 A1 | 6/2016 | |
| WO | 2017017272 A1 | 2/2017 | |
| WO | 2017088897 A1 | 6/2017 | |
| WO | 2017152142 A1 | 9/2017 | |
| WO | 2017180314 A1 | 10/2017 | |
| WO | 2018017117 A1 | 1/2018 | |
| WO | 2018149544 A1 | 8/2018 | |
| WO | 2018181334 A1 | 10/2018 | |
| WO | 2018183396 A1 | 10/2018 | |
| WO | 2018191667 A1 | 10/2018 | |
| WO | 2018194446 A1 | 10/2018 | |
| WO | 2018194685 A1 | 10/2018 | |
| WO | 2018197888 A1 | 11/2018 | |
| WO | 2019063741 A1 | 4/2019 | |
| WO | 2019076705 A1 | 4/2019 | |
| WO | 2019089497 A1 | 5/2019 | |
| WO | 2019094269 A1 | 5/2019 | |
| WO | 2019094283 A1 | 5/2019 | |
| WO | 2019094367 A1 | 5/2019 | |
| WO | 2019113412 A1 | 6/2019 | |
| WO | 2019136222 A1 | 7/2019 | |
| WO | 2019139742 A1 | 7/2019 | |
| WO | 2019140000 A1 | 7/2019 | |
| WO | 2019157074 A2 | 8/2019 | |
| WO | 2019182618 A1 | 9/2019 | |
| WO | 2019194826 A1 | 10/2019 | |
| WO | 2019209881 A1 | 10/2019 | |
| WO | 2019236074 A1 | 12/2019 | |
| WO | 2020007891 A1 | 1/2020 | |
| WO | 2020013828 A1 | 1/2020 | |
| WO | 2020068101 A1 | 4/2020 | |
| WO | 2020115468 A1 | 6/2020 | |
| WO | 2020146416 A2 | 7/2020 | |
| WO | 2020159507 A1 | 8/2020 | |
| WO | 2020237118 A1 | 11/2020 | |
| WO | 2020237119 A1 | 11/2020 | |
| WO | 2020237120 A1 | 11/2020 | |
| WO | 2020237122 A1 | 11/2020 | |
| WO | 2020237123 A1 | 11/2020 | |
| WO | 2020237138 A1 | 11/2020 | |
| WO | 2020237142 A1 | 11/2020 | |
| WO | 2020237143 A1 | 11/2020 | |
| WO | 2020237144 A1 | 11/2020 | |
| WO | 2020237161 A1 | 11/2020 | |
| WO | 2020237163 A1 | 11/2020 | |
| WO | 2020237165 A1 | 11/2020 | |
| WO | 2020237166 A1 | 11/2020 | |
| WO | 2022086867 A1 | 4/2022 | |
| WO | 2022086868 A1 | 4/2022 | |
| WO | 2022087043 A1 | 4/2022 | |
| WO | 2022087044 A1 | 4/2022 | |
| WO | 2022087046 A1 | 4/2022 | |
| WO | 2022087048 A1 | 4/2022 | |

OTHER PUBLICATIONS

International Search Report for Appln. No. PCT/US2021/055457 mailed Jan. 27, 2022, 20 pages.
International Search Report for Appln. No. PCT/US2021/055458 mailed Jan. 27, 2022, 15 pages.
International Search Report for Appln. No. PCT/US2021/055716 mailed Mar. 22, 2022, 21 pages.
International Search Report for Appln. No. PCT/US2021/055717 mailed Dec. 20, 2021, 16 pages.
International Search Report for Appln. No. PCT/US2021/055719 mailed Jan. 18, 2022, 17 pages.
International Search Report for Appln. No. PCT/US2021/055722 mailed Jan. 3, 2022, 14 pages.
International Search Report for Appln. No. PCT/US2021/056828 mailed Feb. 23, 2022, 11 pages.
International Search Report for Appln. No. PCT/US2021/056451 mailed Apr. 4, 2022, 33 pages.
International Search Report for Appln. No. PCT/US2021/056827 mailed Feb. 11, 2022, 15 pages.
International Search Report for Appln. No. PCT/US2021/056789 mailed Jan. 18, 2022, 18 pages.
International Search Report for Appln. No. PCT/US2021/056787 mailed Aug. 2, 2022, 12 pages.
International Search Report for Appln. No. PCT/US2021/057517 mailed Sep. 6, 2022, 21 pages.
International Preliminary Report for Appln. No. PCT/US2021/055457 mailed May 4, 2023, 14 pages.
International Preliminary Report for Appln. No. PCT/US2021/055458 mailed May 4, 2023, 10 pages.
International Preliminary Report for Appln. No. PCT/US2021/055716 mailed May 4, 2023, 16 pages.
International Preliminary Report for Appln. No. PCT/US2021/055717 mailed May 4, 2023, 11 pages.
International Preliminary Report for Appln. No. PCT/US2021/055719 mailed May 4, 2023, 12 pages.
International Preliminary Report for Appln. No. PCT/US2021/055722 mailed May 4, 2023, 10 pages.
International Preliminary Report for Appln. No. PCT/US2021/056828 mailed May 11, 2023, 8 pages.

(56)                    References Cited

OTHER PUBLICATIONS

International Preliminary Report for Appln. No. PCT/US2021/056451 mailed May 11, 2023, 23 pages.
International Preliminary Report for Appln. No. PCT/US2021/056827 mailed May 11, 2023, 9 pages.
International Preliminary Report for Appln. No. PCT/US2021/056789 mailed May 11, 2023, 11 pages.
International Preliminary Report for Appln. No. PCT/US2021/056787 mailed May 11, 2023, 8 pages.
International Preliminary Report for Appln. No. PCT/US2021/057517 mailed May 11, 2023, 15 pages.
Shanjani "Material Spreading and Compaction in Powder-Based Solid Freeform Fabrication Methods: Mathematical Modeling" Department of Mechanical and Mechatronic Engineering, University of Waterloo, Sep. 10, 2008.
Japanese Office Action for Application No. 2023-521818 dated Feb. 16, 2020 (5 pages with English Translation).
Japanese Office Action for Application No. 2023-521819 dated Feb. 20, 2024 (5 pages with English Translation).
European Patent Office Action for Application No. 21807388.0 dated Mar. 22, 2023 (8 pages).

* cited by examiner

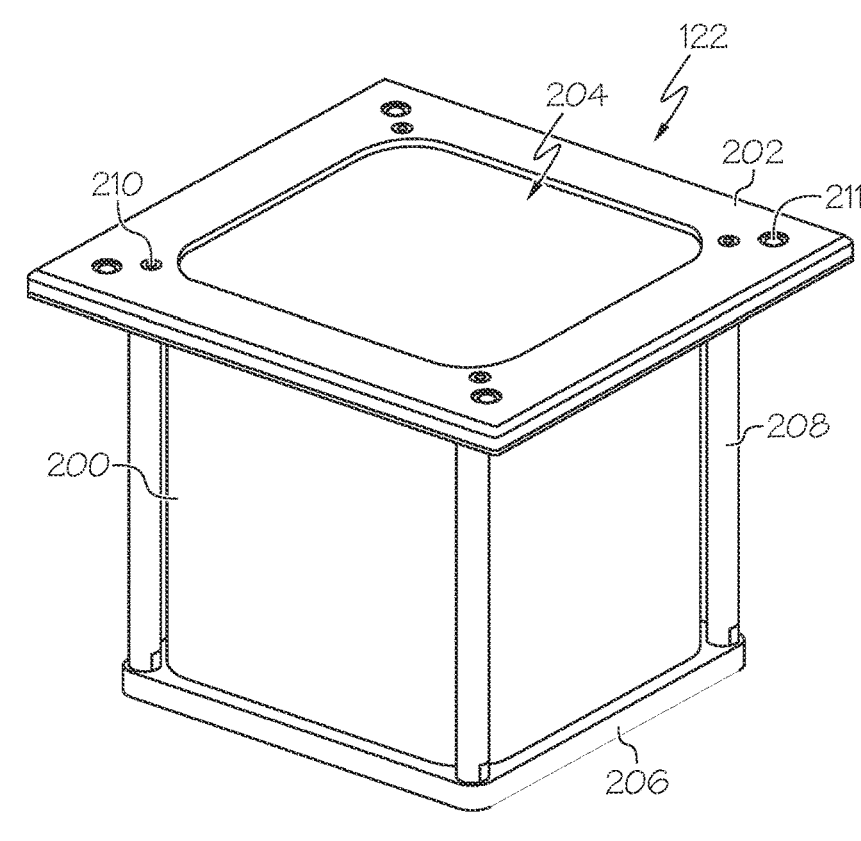
FIG. 10
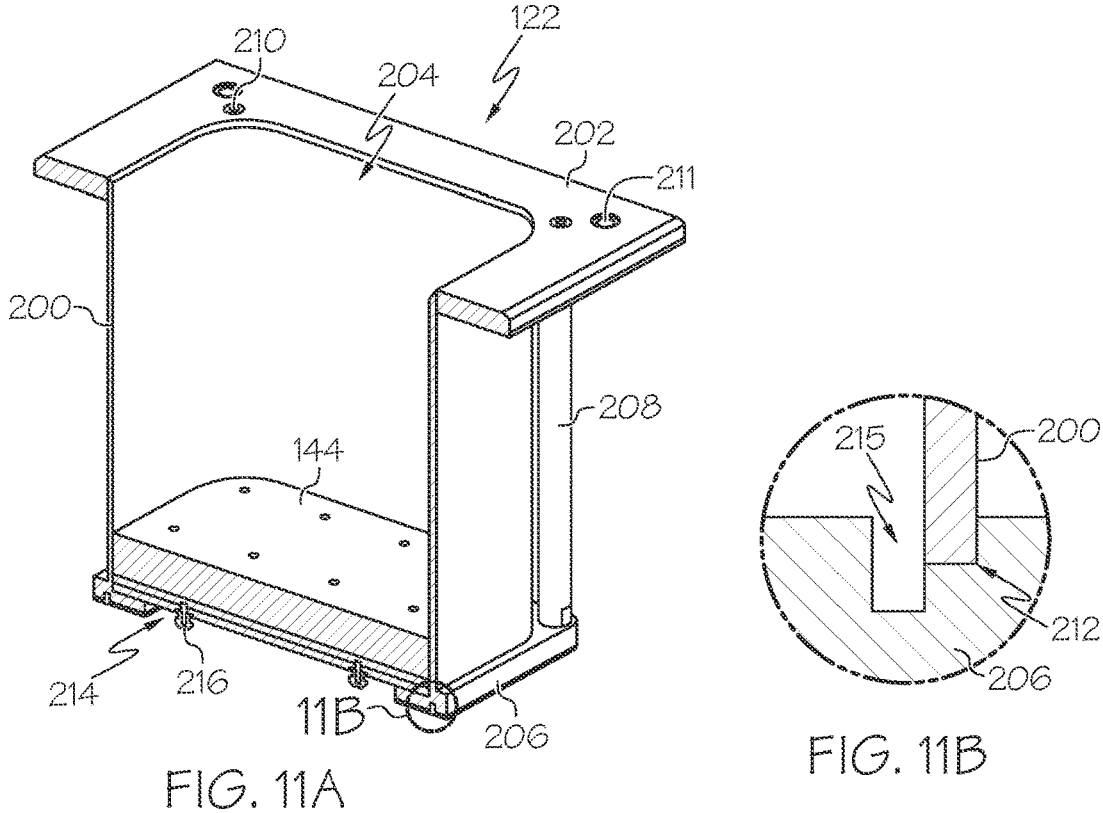
FIG. 11A
FIG. 11B

1

ADDITIVE MANUFACTURING APPARATUSES WITH REMOVABLE BUILD BOXES AND LID MANAGEMENT SYSTEMS

CROSS REFERENCE TO RELATED APPLICATIONS

The present specification is a National Phase Entry of International Application No. PCT/US2021/056827 filed Oct. 27, 2021 entitled "Additive Manufacturing Apparatuses with Removable Build Boxes and Build Box Management Systems" which claims the benefit of U.S. Provisional Patent Application Ser. No. 63/107,120 filed Oct. 29, 2020 and entitled "Additive Manufacturing Apparatuses with Removable Build Boxes and Build Box Management Systems", the entirety of which is incorporated by reference herein.

FIELD

The present specification generally relates to additive manufacturing apparatuses and, more specifically, to additive manufacturing apparatuses with removable build boxes and lid management systems.

TECHNICAL BACKGROUND

Additive manufacturing apparatuses may be utilized to build an object from build material, such as organic or inorganic powders, in a layer-wise manner. Examples of additive manufacturing processes include laser powder bed fusion and binder jet systems. In some applications, the powder material may be reactive with oxygen and the additive manufacturing process may be carried out in an inert atmosphere to reduce the amount of oxygen surrounding the object being built. This flooding of an environment with an inert gas can take time and increase cost. Further, it may be desirable to reduce or even eliminate operator contact with certain potentially harmful and combustible powders, which can also take time and increase cost. There is an increased interest in utilising additive manufacturing apparatuses for large-scale commercial production of objects. Scaling additive manufacturing apparatuses to commercial production needs increased throughput of the additive manufacturing apparatuses to meet commercial demands.

What is needed are additive manufacturing apparatuses that include lid management systems that can be used to automatically handle lid assemblies of removable build boxes in order to preserve gas environments within the removable build boxes before and after additive manufacturing processes.

SUMMARY

In a first embodiment, an apparatus for forming a three-dimensional article having successive layers of a powder material, which layers correspond to successive cross-sections of the three-dimensional article includes a process chamber that includes a process chamber floor having an opening therethrough, the opening defining a part processing area and a lid management system. The lid management system includes an actuator including a movable arm that moves between retracted and extended positions and a machine lid connected to the movable arm. The machine lid is sized and configured to sealingly engage a perimeter of the opening of the process chamber floor with the movable arm in the extended position.

In another embodiment, a build box for an apparatus for forming a three-dimensional article having successive layers of a powder material, which layers correspond to successive cross-sections of the three-dimensional article includes an enclosure body forming a build volume. A build platform is slidably disposed in the build volume. A build box lid covers the build volume that is removable from the enclosure body.

In another embodiment, a method of sealing a process chamber of an apparatus, the apparatus for forming a three-dimensional article having successive layers of a powder material, which layers correspond to successive cross-sections of the three-dimensional article is provided. The method includes sealing an opening that defines a part processing area in a process chamber floor using a machine lid. The machine lid is connected to a movable arm of an actuator for moving the machine lid toward and away from the opening in the process chamber floor. The machine lid is removed from the opening.

Additional features and advantages of the additive manufacturing apparatuses described herein, and the components thereof, will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

FIG. 10 is a diagrammatic view of a build box for use with the additive manufacturing apparatus of FIG. 2, according to one or more embodiments shown and described herein;

FIG. 11A is a section view of the build box of FIG. 10, according to one or more embodiments shown an described herein;

FIG. 11B is a detail view of area B of FIG. 11A;

DETAILED DESCRIPTION

Figure 1:
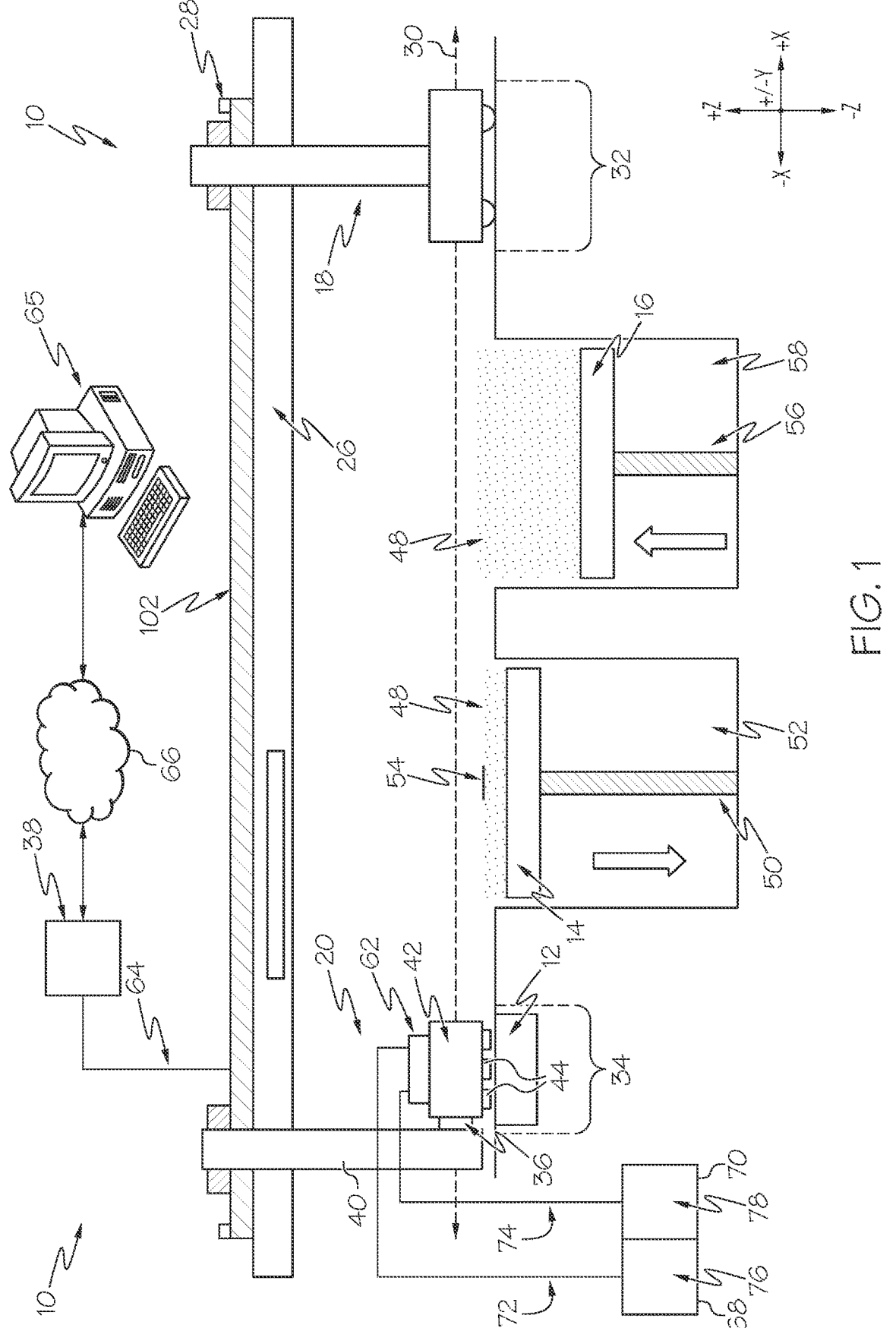
FIG. 1 is a diagrammatic view of a known additive manufacturing apparatus.

Embodiments described herein are generally directed to additive manufacturing apparatuses that include a housing enclosing a process chamber in which an object may be formed using a three-dimensional printing process. A process chamber floor may include an opening through the process floor to the surrounding environment and that is sized and shaped to receive a build platform defining a build area for building a three-dimensional part. This build platform may be provided by a removable build box. The build platform may be exposed to the process chamber once a build box lid is removed from the build box.

The additive manufacturing apparatuses include a build box management system. The build box management system includes a conveyor arrangement that can include an intake conveyor that receives a build box, an elevated conveyor that engages the build box and an outfeed conveyor that receives the build box from the elevated conveyor for one or more downstream operations, such as a depowdering operation. A lift platform assembly is located at the elevated conveyor and between the intake and outfeed conveyors. The lift platform assembly can comprise two stages: a first stage that lifts the entire build box and a second stage that lifts the build platform that is located within the build box. The build box management system can provide reliable and repeatable, hands-free build box handling that can be used repeatedly in order to increase through put and decrease overall part build time.

Embodiments described herein are also generally directed to additive manufacturing apparatuses that include a lid management system. The lid management system includes an actuator that moves a machine lid toward and away from the process chamber floor. The machine lid may be sized and shaped to nest with the opening that defines the build area and may include a seal for sealing against a perimeter of the opening to provide a gas-tight seal around the opening thereby sealing the environment within the process chamber from the surroundings. The lid management system further includes one or more clamping devices that can clamp onto clamping structure that is on the build box lid. As the machine lid is lowered onto the perimeter of the opening in the process chamber floor, the clamping device can clamp onto the clamping structure of the build box lid thereby holding the build box lid against the machine lid face-to-face. When the machine lid is then raised by the actuator, the clamping device holds onto the build box lid thereby removing the build box lid from the build box and exposing the build platform to the environment of the process chamber. The machine lid and the build box lid are both raised out of a travel path of a build head to allow for a build process on the build platform using additive manufacturing. As used herein, the term "build head" may include any of a printing assembly and/or a recoat assembly.

It should be noted that while additive manufacturing using binder jetting is described primarily below, the lid management systems and build box management systems described herein may be used with other types of additive manufacturing apparatuses, such as selective laser sintering (SLS), direct metal laser sintering (DMLS), electron beam melting (EBM), etc. Further, the lid management systems and build box management systems described herein may be used in apparatuses other than the build apparatus where a three-dimensional part is formed layer-by-layer, such as a depowder apparatus where loose powder is removed from a three-dimensional part, as will be described in greater detail below.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom, upper, lower, —are made only with reference to the figures as drawn and are not intended to imply absolute orientation unless otherwise expressly stated.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

As used herein, the term "three-dimensional structures" and the like refer generally to intended or actually fabricated three-dimensional configurations (e.g., of structural material or materials) that are intended to be used for a particular purpose. Such structures may be, for example, designed with the aid of a computer aided design (CAD) program. As used herein, the term "two-dimensional structures" and the like refer generally to layers of the three-dimensional structure that when built, one over the other, form the three-dimensional structures. While referred to as "two-dimensional structures," it should be understood that each layer includes an accompanying thickness in a third dimension, albeit the structures have a relatively planar configuration compared to a fused stack of the two-dimensional structures that form the three-dimensional structures.

General Additive Manufacturing Processes and Components

Referring now to FIG. 1, an embodiment of a manufacturing apparatus 10 is schematically depicted. The manufacturing apparatus 10 includes a cleaning station 12, a build area 14 defining a build area, a supply platform 16, a recoat assembly 18, and a printing assembly 20. The recoat assembly 18 and the printing assembly 20 are coupled to a rail 26 of the manufacturing apparatus 10 and are configured to translate along the rail 26 in response to an actuation of a first actuator assembly 28. The first actuator assembly 28 may be constructed to facilitate independent control of the recoat assembly 18 and the printing assembly 20 along a working axis 30 of the manufacturing apparatus 10. The working axis 30 is also referred to herein as the "longitudinal axis" (i.e., extending along the +/−X axis of the coordinate axes as depicted in the figures). This allows for the recoat assembly 18 and the printing assembly 20 to traverse the working axis 30 of the manufacturing apparatus 10 in the same direction and/or in opposite directions and for the recoat assembly 18 and the printing assembly 20 to traverse the working axis 30 of the manufacturing apparatus 10 at different speeds and/or the same speed.

In the embodiments described herein, the cleaning station 12, the build area 14, the supply platform 16, the recoat assembly 18, and the printing assembly 20 are positioned in series along the working axis 30 of the manufacturing apparatus 10 between a home position 34 of the printing assembly 20, located proximate an end of the working axis 30 in the −X direction, and a home position 32 of the recoat assembly 18, located proximate an end of the working axis 30 in the +X direction. In embodiments, the build area 14 is positioned between the cleaning station 12 and the supply platform 16 along the working axis 30 of the manufacturing apparatus 10.

In embodiments, a second actuator assembly 36 may be constructed to facilitate independent control of the printing assembly 20 along a latitudinal axis (i.e., extending along the +/−Y axis of the coordinate axes as depicted in the figures), which is generally perpendicular to the longitudinal axis (i.e., the working axis 30). The first actuator assembly 28 and the second actuator assembly 36 are generally referred to as a printing head position control assembly. That is, the printing head position control assembly includes the first actuator assembly 28 configured to move the printing head along the longitudinal axis and the second actuator assembly 36 configured to move the printing head along a latitudinal axis. The printing head position control assembly may be controlled via signals generated by a control system 38 such as an electronic control unit. The electronic control unit may include a processor and a non-transitory computer readable memory.

The printing assembly 20 comprises, among other features, a support bracket 40, a printing head 42, and a plurality of print heads 44. The support bracket 40 is movably coupled to the rail 26 and the first actuator assembly 28 of the manufacturing apparatus 10 while the printing head 42 is movably coupled to the support bracket 40 via the second actuator assembly 36.

Each print head 44 comprises one or more jet nozzles. When a plurality of jet nozzles are incorporated into a print head 44, the plurality of jet nozzles are spaced apart from one another. The plurality of jet nozzles are spaced apart from one another in a direction transverse to a longitudinal axis, where a distance from a first jet nozzle to a second jet nozzle positioned adjacent the first jet of the plurality of jets defines a jet-spacing. By way of example only, each of the print heads 44 may include a plurality of jet nozzles from about 5,000 nozzles to about 6,000 nozzles, with each jet nozzle spaced apart from another by about 1/1150 inch from one another. Other jet nozzle spacing is possible and contemplated.

The recoat assembly 18 is constructed to facilitate a distribution of a build material 48 over the build area 14 and the supply platform 16. The build area 14 is coupled to a build platform actuator 50 to facilitate raising and lowering the build area 14 relative to the working axis 30 of the manufacturing apparatus 10 in a vertical direction (i.e., a direction parallel to the +/−Z axis of the coordinate axes depicted in the figures). The build area 14 and build platform actuator 50 are positioned in a build receptacle 52 located below the working axis 30 (i.e., in the −Z direction of the coordinate axes depicted in the figures) of the manufacturing apparatus During operation of the manufacturing apparatus 10, the build area 14 is retracted into the build receptacle 52 by action of the build platform actuator 50 after each layer of binder material 54 is deposited on the build material 48 located on the build area 14.

Still referring to FIG. 1, the supply platform 16 is coupled to a supply platform actuator 56 to facilitate raising and lowering the supply platform 16 relative to the working axis of the manufacturing apparatus 10 in a vertical direction (i.e., a direction parallel to the +/−Z axis of the coordinate axes depicted in the figures). The supply platform 16 and supply platform actuator 56 are positioned in a supply receptacle 58 located below the working axis (i.e., in the −Z direction of the coordinate axes depicted in the figures) of the manufacturing apparatus 10. During operation of the manufacturing apparatus 10, the supply platform 16 is raised relative to the supply receptacle 58 and towards the working axis 30 of the manufacturing apparatus 10 by action of supply platform actuator 56 after a layer of build material 48 is distributed from the supply platform 16 to the build area 14. It should be understood that, in other embodiments, the manufacturing apparatus 10 does not include a supply platform 16, such as in embodiments where build material is supplied to the build area 14 with, for example and without limitation, a build material hopper.

The printing assembly 20 is constructed to facilitate a deposition of a binder material 54 and/or other jettable composition materials (e.g., ink, fluid medium, colorant, nanoparticle s, fluorescing particles, sintering aids, anti-sintering aids, etc.) over the layer of build material 48 in the build area 14 as the printing assembly 20 traverses the build area 14 along the working axis 30 of the manufacturing apparatus 10.

Still referring to FIG. 1, the cleaning station 12 is positioned proximate one end of the working axis 30 of the manufacturing apparatus 10 and is co-located with the home position 34 where the printing assembly 20 is located or "parked" before and after depositing a binder material 54 on a layer of build material 48 positioned on the build area 14. The cleaning station 12 may include one or more cleaning sections to facilitate cleaning the printing assembly 20, and in particular a plurality of print heads 44 of the printing assembly 20 between depositing operations. The cleaning sections may include, for example and without limitation, a soaking station containing a cleaning solution for dissolving excess binder material 54 from the plurality of print heads 44, a wiping station for removing excess binder material 54 and cleaning solution from the plurality of print heads 44, a jetting station for purging binder material 54 and reestablish the meniscus in the plurality of print heads 44, a capping station for maintaining moisture in a plurality of jet nozzles of the plurality of print heads 44, or various combinations thereof. The printing assembly 20 may be transitioned between the cleaning sections by the first actuator assembly 28. In embodiments, the manufacturing apparatus 10 may include a jetting test area positioned proximate to one end of the working axis 30 adjacent to the cleaning station 12 and/or the home position 34. Although not shown, it should be understood that the jetting test area of the manufacturing apparatus 10 may be configured to facilitate a binder material deposition by the printing assembly 20 prior to performing a deposition along the build area 14. Additional information on cleaning stations in manufacturing apparatuses can be found in PCT Application No. PCT/US20/34144, filed on May 22, 2020, and entitled "Cleaning Systems for Additive Manufacturing Apparatuses and Methods for Using the Same."

Still referring to FIG. 1, the manufacturing apparatus 10 may further include a control system 38 communicatively coupled to the first actuator assembly 28, the second actuator assembly 36, the recoat assembly 18, and/or the printing assembly 20. The control system 38 may be particularly coupled to one or more valves of a manifold assembly 62 of the printing assembly 20. In embodiments, the control system 38 is coupled to the manufacturing apparatus 10 via a communication conduit 64, however, it should be understood that in other embodiments the control system 38 may be communicatively coupled to the manufacturing apparatus 10 via various other means or systems, such as, for example, through a wireless connection. The control system 38, which may also be referred to as an electronic control unit, comprises a processor and a non-transitory memory that includes computer readable and executable instructions stored thereon. Any action of the manufacturing apparatus 10, including the actions described herein, may be caused to be performed by the computer readable and executable instructions (e.g., opening and closing valves within the manifold assembly 62) stored in the non-transitory memory of the control system 38 when executed by the processor of the control system 38. For example, one or more actuators may be actuated by the computer readable and executable instructions stored in the non-transitory memory of the control system 38 when executed by the processor of the control system 38 to cause the valves of the manifold assembly 62 to operate.

In embodiments, the control system 38 may be further communicatively coupled to a computing device 65, optionally via a network 66, or directly via a communication link such as a wired or wireless connection. The computing device 65 may be configured to carry out processes such as generating executable instruction for building a component with the manufacturing apparatus 10, such as by implementing CAD or other related three-dimensional drafting and rendering systems as well as a slicing engine or the like.

As shown in FIG. 1, the manufacturing apparatus 10 further includes at least one supply reservoir 68 and at least one return reservoir 70 fluidly coupled to the manifold assembly 62 of the printing assembly 20 via one or more conduit lines 72, 74, respectively. In embodiments, the supply reservoir 68 is highly pressurized to force binder material into the printing head 42. Although the supply reservoir 68 and the return reservoir 70 are illustrated and discussed herein as being separate components for storing binder material, in embodiments, the supply reservoir 68 and the return reservoir 70 may be the same reservoir, such that binder material from the supply reservoir 68 is circulated back to the supply reservoir 68 instead of to a separate return reservoir 70.

The manifold assembly 62 includes an inlet reservoir and an outlet reservoir for storing the binder material. Each of the inlet reservoir and the outlet reservoir may be in fluid communication with the plurality of print heads 44. In particular, the supply reservoir 68 and the return reservoir 70 are fluidly coupled to each of the plurality of print heads 44 disposed within the printing head 42 of the printing assembly 20 via the manifold assembly 62. The plurality of print heads 44 are recirculation-ready, such that binder material is initially delivered to the plurality of print heads 44 and any binder material that is not dispensed through the print heads 44 is drawn back out of the plurality of print heads 44. The binder material is initially delivered to the inlet reservoir of the manifold assembly 62 from the supply reservoir 68 and, subsequently, delivered to the plurality of print heads 44 from the inlet reservoir of the manifold assembly 62. Binder material is then drawn out of the plurality of print heads 44 and into the outlet reservoir of the manifold assembly 62. Thereafter, the binder material may be drawn out of the outlet reservoir and delivered into the return reservoir 70.

In embodiments, the first conduit line 72 and the second conduit line 74 may be coupled to one another via a coupling mechanism, such as, for example, a manifold, a valve, and/or the like. In this instance, the reservoirs 68, 70 may be in fluid communication with the coupling mechanism via the conduits lines 72, 74, and the coupling mechanism includes a third conduit line coupled thereto and extending to the printing head 42. The coupling mechanism may be configured to selectively transition fluid communication between the fluid reservoirs 68, 70 and the printing head 42 such that the plurality of print heads 44 receive one of a first material 76 (e.g., binder solution from the supply reservoir 68) or a second material 78 (e.g., binder solution from the return reservoir 70) in response to an actuation of the coupling mechanism. It should be understood that the coupling mechanism may be further configured to facilitate simultaneous fluid communication of the supply reservoir 68 and the return reservoir 70 with the printing head 42 such that the plurality of print heads 44 receive binder material from the supply reservoir 68 and the return reservoir 70 concurrently. Such an arrangement can, for example, enable faster refill of the manifold assembly 62 during and following purging.

In some instances, such as when working with reactive materials like aluminum or titanium, it may be desirable to provide an environment that is inert using a gas like nitrogen or argon. An inert environment is one in which reactive powders can be used with low or no risk of contamination from gases that exist in the air, such as oxygen and carbon dioxide, with which the powders can have a chemical reaction and/or be combustible. Further, it may be desirable to limit exposure of operators and machine components to powders that are used in build processes.

Additive Manufacturing Apparatuses with Box and Lid Management Systems

Embodiments described herein are directed to additive manufacturing apparatuses and components for additive manufacturing apparatuses that may be implemented to improve the throughput of the additive manufacturing apparatus. The additive manufacturing apparatuses utilize a removable build box that can be sealed and evacuated of air before exposing the internal volume to the inert environment within the process chamber. Such a sealed arrangement can allow for use and reuse of the inert environment in the process chamber as opposed to evacuating and inerting the process chamber before each build operation. A build box handling system is described herein that can be used to handle the build boxes into and out of the additive manufacturing apparatuses and to handle them within the additive manufacturing apparatuses.

Figure 2:
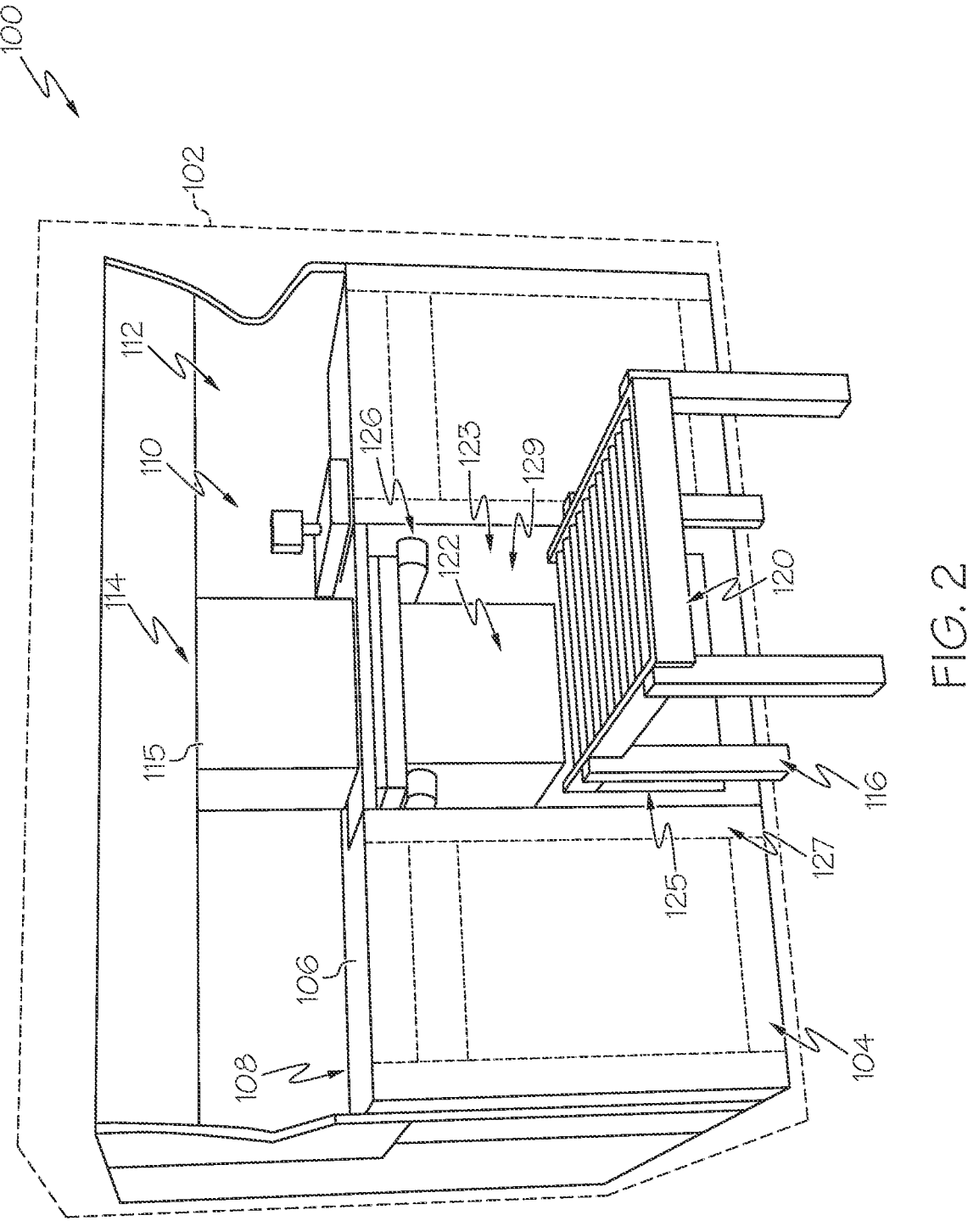
FIG. 2 is a diagrammatic view of another additive manufacturing apparatus, according to one or more embodiments shown and described herein.

Referring to FIG. 2, a diagrammatic, perspective view of an additive manufacturing apparatus 100 is illustrated and generally includes an outer housing (represented by dashed lines 102) and a support structure or chassis 104 that is located in the outer housing 102. The chassis 104 supports a process chamber floor 106 that defines at least a portion of a bottom 108 of a process chamber 110. The process chamber 110 may be isolated within the outer housing 102 by an air-tight seal so that the environment within the process chamber 110 may be inert by forcing air out of the process chamber 110, e.g., using a vacuum system and/or providing an inert gas to the process chamber 110. The process chamber 110 may be accessible through one or more movable access panels. For example, a front portion 112 of the outer housing 102 may include glass or transparent plastic doors or access panels that can be moved to access the process chamber 110. Providing transparent access panels can allow for viewing of components and the build process during use.

The additive manufacturing apparatus 100 further includes a build box management system 116 and a lid management system 114. The build box management system 116 generally includes a conveyor arrangement that includes an intake conveyor 120 that receives a build box 122 and delivers the build box 122 to an elevated conveyor 126. The elevated conveyor 126 may be a chain conveyor that engages the build box 122 at an elevated location, above a bottom of the build box 122. Other elevated conveyors are contemplated, such as roller or ball-type elevated conveyors. A bellows 115 seals the lid management system 114 from the surrounding inert environment during a lid management operation during which air is evacuated from the build box 122, which will be described further below.

The build box management system 116 extends through a lower compartment 123 of the chassis 104 and comprises a build box carriage 125 for receiving a build box 122. The build box carriage 125 is adjustably coupled to a lower chassis section 127. In embodiments, the lower chassis section 127 has a pass-through opening 129 for receiving the build box 122 such that the build box 122 is removably positioned in the opening 129. This opening 129 allows for the build box 122 (and the contents thereof) to be introduced to and removed from the additive manufacturing apparatus 100 after a build operation is completed and another, empty build box 122 to be installed in the opening.

The box management system 116 extends through the opening 129 in the lower compartment 123. The box management system 116 can enable a build box 122 to be received from another conveyor system and automatically installed within the additive manufacturing apparatus 100 and to be removed from the additive manufacturing apparatus 100 and transferred to another conveyor system. Accordingly, the lid management system 114 can enable the build box 122 to pass through the additive manufacturing apparatus 100 in an automated fashion without requiring human intervention.

Figure 3A:
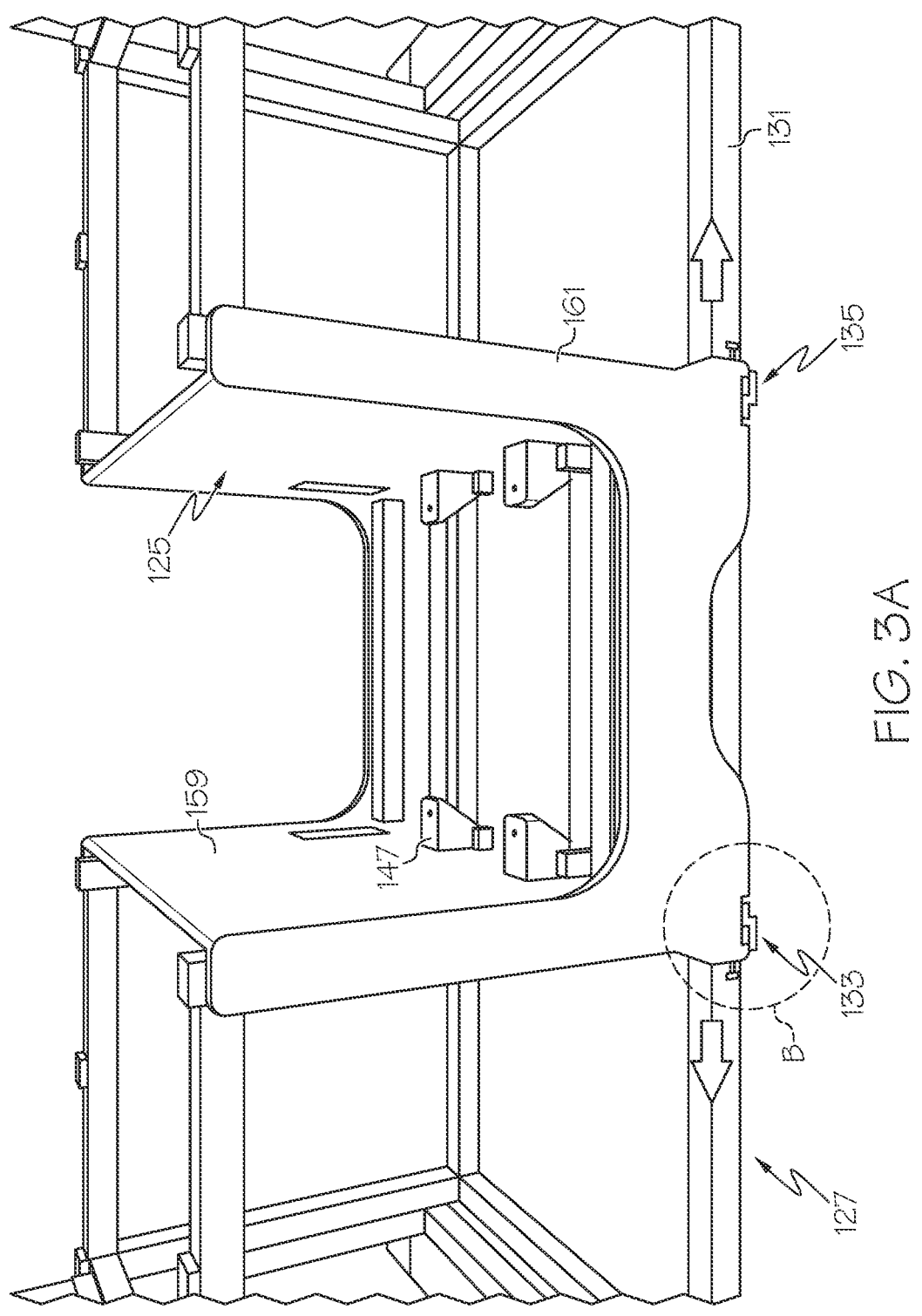
FIG. 3A is a perspective view of a build box carriage of the additive manufacturing apparatus of claim 2, according to one or more embodiments shown and described herein.
Figure 3B:
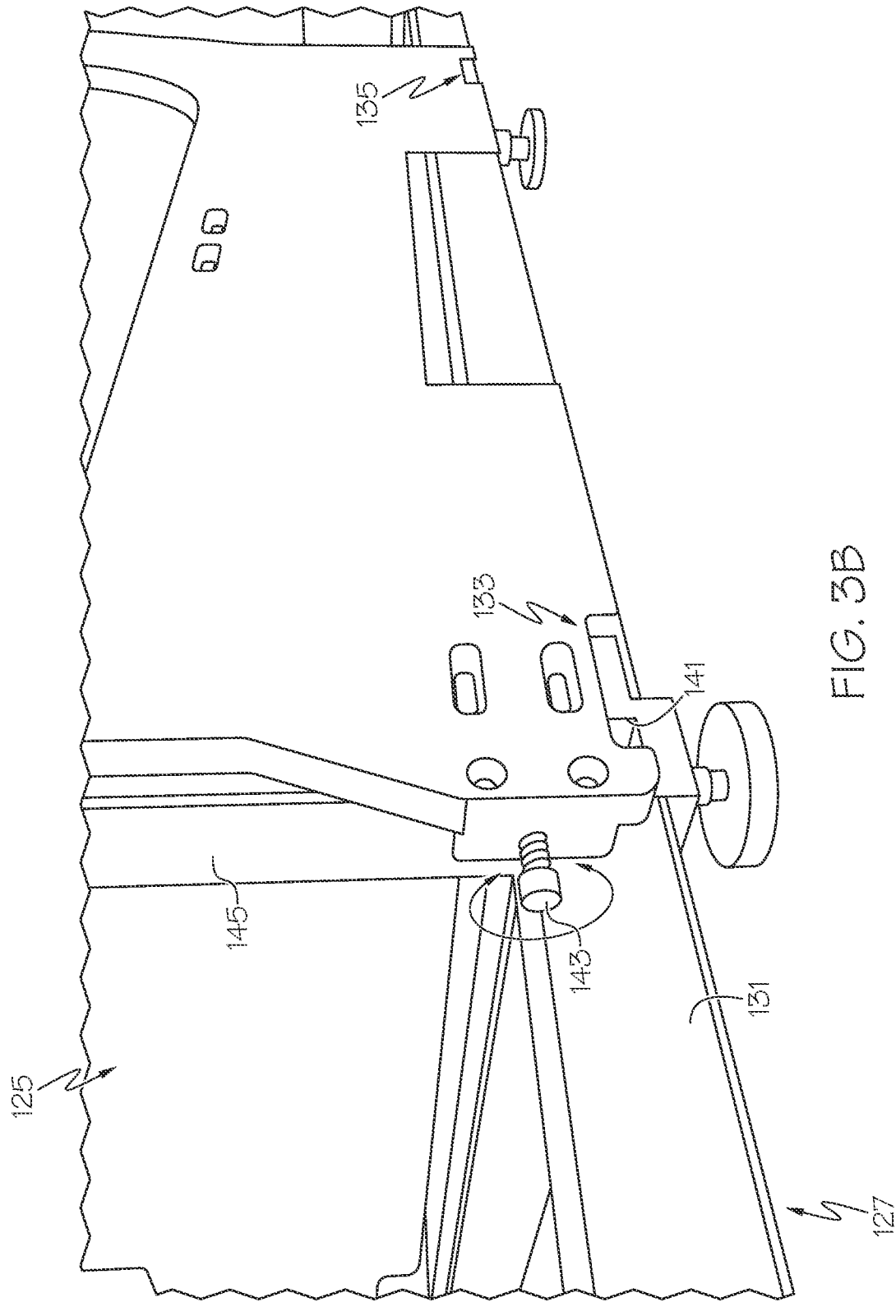
FIG. 3B is a detail view of the build box carriage of FIG. 3A, according to one or more embodiments shown and described herein.

Referring now to FIGS. 3A and 3B, the build box carriage 125 is shown in greater detail. The build box carriage 125 includes sidewalls 159 and front and rear U-shaped walls 161 that together define a build box receiving volume within the lower chassis section 127. A lower horizontal support member 131 of the lower chassis section 127 includes a pair of stepped carriage supports 133, 135, proximate the lower compartment 123. Referring to FIG. 3B, each horizontal carriage support 133, 135 includes a corresponding hard stop 141 and extends in a lateral direction from the lower horizontal support member 131 and in a direction parallel to the working axis to provide a support surface on which the build box carriage 125 is disposed.

The build box carriage 125 may include at least one adjustment pin 143. The adjustment pin 143 may be, for example, a set screw or other pin that extends through an aperture on the build box carriage 125. When the build box carriage 125 is positioned within the opening 129 and on the pair of horizontal carriage supports 133, 135, movement of the adjustment pin 143 causes the adjustment pin 143 to push against the lower chassis section 127, and specifically, against one of the pair of vertical support members 145 to adjust a side-to-side position of the build box carriage 125 relative to the chassis 104. The front-to-back position of the build box carriage 125 may also be adjusted. The corresponding hard stop 141 on the pair of horizontal carriage supports 133, 135 extend vertically (e.g., in the +/−Z direction) from the support surface on which the build box carriage 125 is disposed to limit the range of side-to-side motion of the build box carriage 125.

Referring again to FIG. 3A, the build box carriage 125 includes lift platform mount brackets 147. In the illustrated example, there are four lift platform mount brackets 147; however, there may be more or less than four lift platform mount brackets 147. The lift platform mount brackets 147 are provided to fixedly mount a support platform 137 of a lift platform assembly 136 (FIG. 8) within the build box carriage 125. As will be described in greater detail below, the lift platform assembly 136 is used to raise the build box 122 inside the box receiving volume of the build box carriage 125.

Figure 3C:
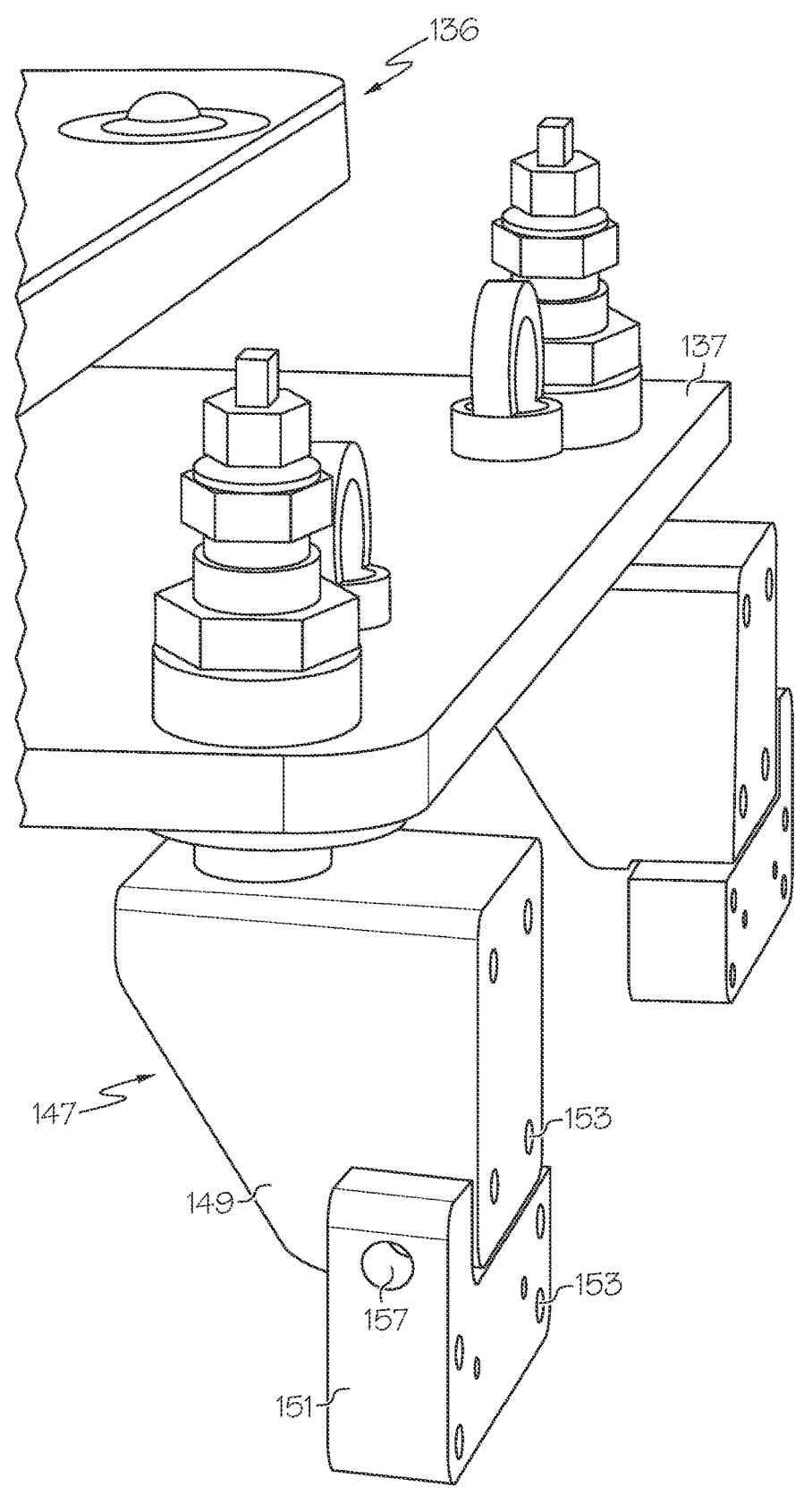
FIG. 3C illustrates a lift platform mount bracket for mounting a lift platform assembly to the build box carriage of FIG. 3A, according to one or more embodiments shown and described herein.

FIG. 3C illustrates the lift platform mount bracket 147 in greater detail mounted to the support platform 137 of the lift platform assembly 136. The mount bracket 147 includes an angled mounting block 149 that is mounted on an L-shaped bracket 151. The L-shaped brackets 151 are each mounted to the sidewalls 159 of the build box carriage 125. Both of the mounting block 149 and the bracket 151 include fastener openings 153 that can be used to fixedly mount the brackets 151 and mounting block 149 to the sidewall 159 of the build box carriage 125. Until the mounting block 149 is mounted to the sidewall 159 of the build box carriage 125, the mounting block 149 may be slidably supported on the bracket 151. An adjustment screw (not shown) may be located in an opening 157. The adjustment screw may allow for fine front-to-rear adjustment of the mounting block 149 and lift platform assembly 136 within the build box carriage 125. When the lift platform assembly 136 is in the desired position, the mounting block 149 may be mounted to the sidewall 159.

Build Box Management System

Figure 4:
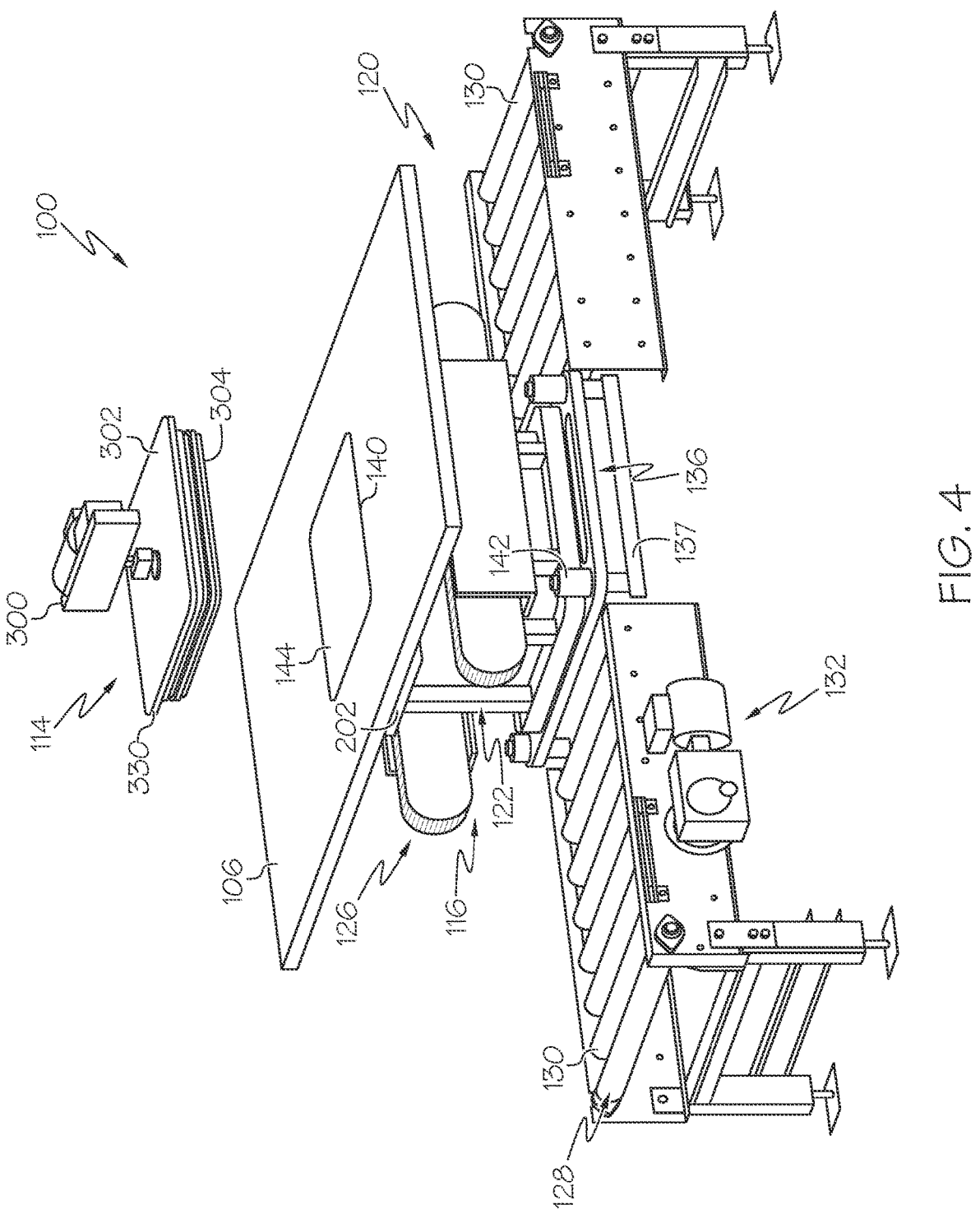
FIG. 4 is a diagrammatic, simplified view of the additive manufacturing apparatus of FIG. 2 with build box management and lid management systems, according to one or more embodiments shown and described herein.

FIG. 4 illustrates a simplified, diagrammatic view of the additive manufacturing apparatus 100 with the housing 102 and other components, such as a build head and bellows 115 (FIG. 2) removed. The build box management system 116 includes the intake conveyor 120, the elevated conveyor 126 and an outfeed conveyor 128. In some embodiments, the intake conveyor 120 and the outfeed conveyor 128 may both include rollers 130 that rotate using one or more motors 132 in order to move the build box 122 linearly toward and away from the elevated conveyor 126. The intake conveyor 120 and/or outfeed conveyor 128 may be supported by two sets of legs and may be free-standing or be supported by a single set of legs at one end and the chassis 104 (FIG. 2) at the other end, as shown. The elevated conveyor 126 engages a top flange plate 202 (FIGS. 10 and 11A) of the build box to expose the bottom of the build box 122 to a lift platform assembly 136. The lift platform assembly 136 can raise and lower the build box 122 toward and away from an opening 140 in the process chamber floor 106.

In the illustrated example, the opening 140 in the process chamber floor 106 has a shape (e.g., rectangular, such as square) that corresponds to a horizontal cross-sectional shape of the build box 122. A size of the opening 140 may be slightly smaller than an outer perimeter of top flange plate 202 of the build box 122 (FIGS. 10 and 11A) to allow the build box 122 to seal against an underside of the process chamber floor 106 and around the opening 140 as the build box 122 is raised to the opening 140. Actuators 142, such as gas springs or pneumatic cylinders, can be used to lift the lift platform assembly 136, which moves the build box 122 located thereon. Other actuators may be used, such as a motor that is geared to move the build box 122 linearly up and down.

Figure 5:
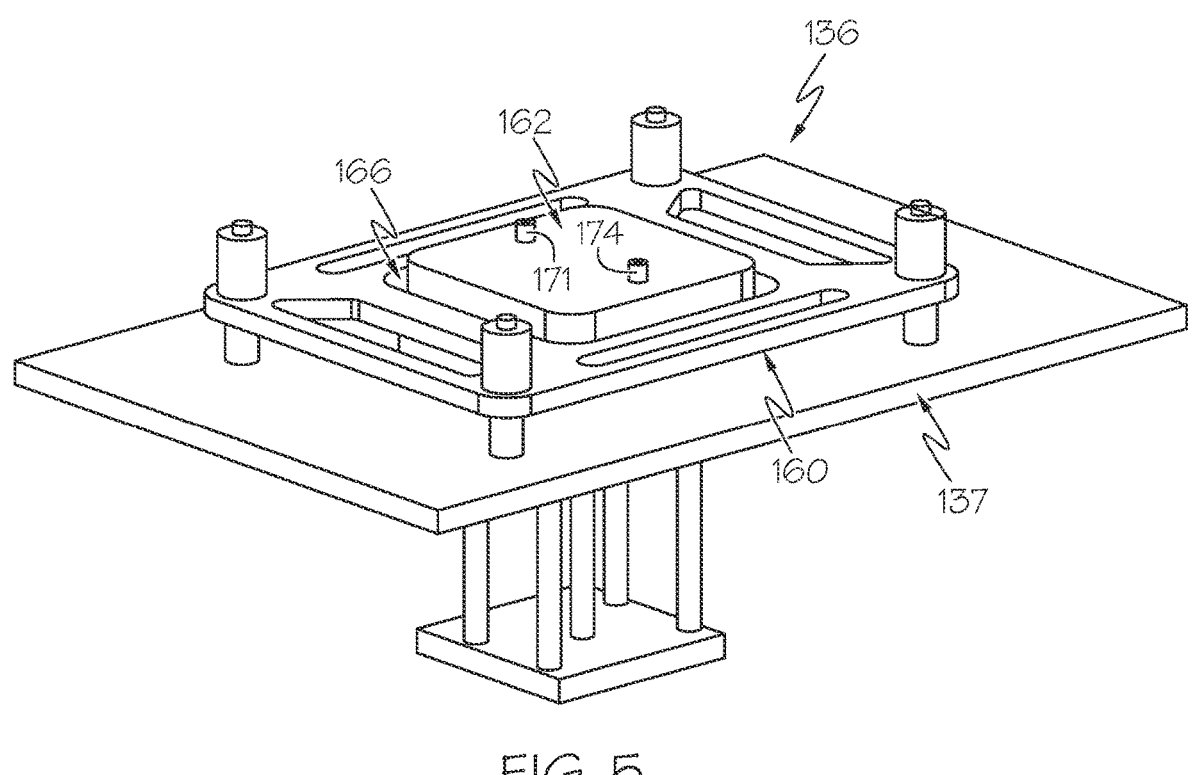
FIG. 5 is a diagrammatic view of a lift platform assembly for use with the build box management system of FIG. 4, according to one or more embodiments shown and described herein.

Referring to FIG. 5, the lift platform assembly 136 is illustrated in greater detail and shown in isolation. The lift platform assembly 136 is a two-stage lift that includes the support platform 137, an outer lift platform 160 and an inner lift platform 162 located inside the outer lift platform 160.

Figure 6:
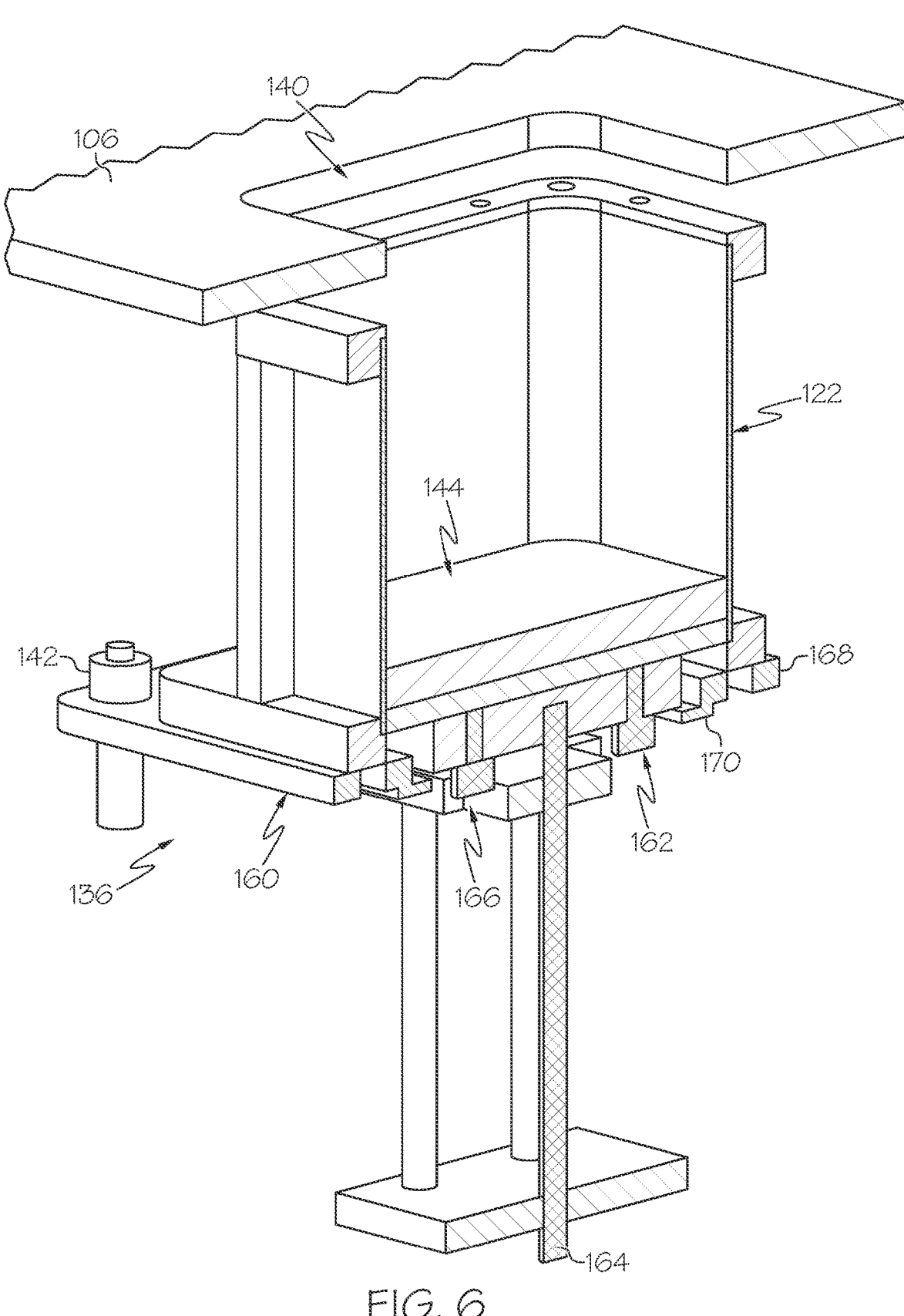
FIG. 6 is a section view of the lift platform assembly of FIG. 5 in use, according to one or more embodiments shown and described herein.
Figure 7:
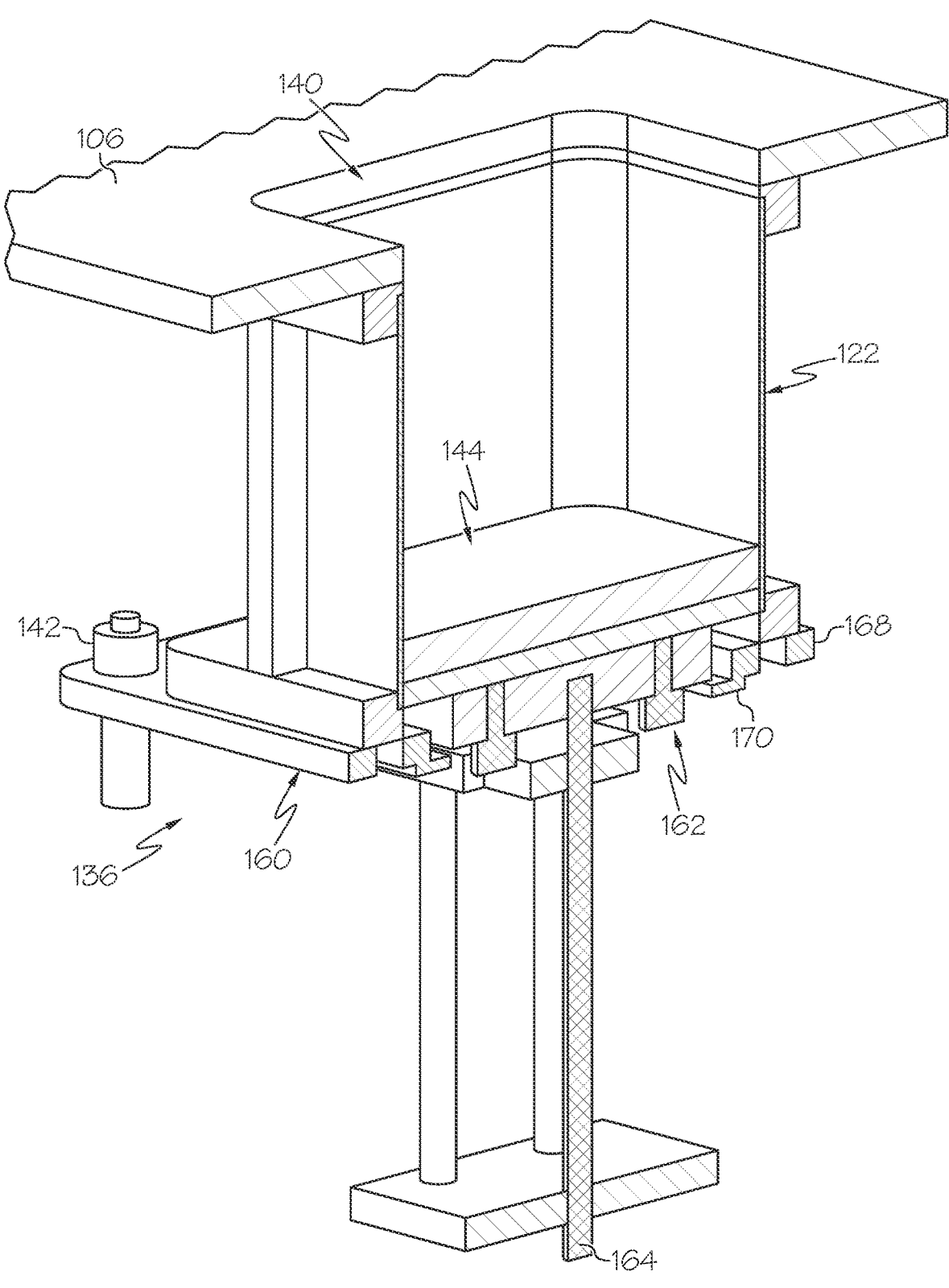
FIG. 7 is a section view of the lift platform assembly of FIG. 5 in use, according to one or more embodiments shown and described herein.
Figure 8:
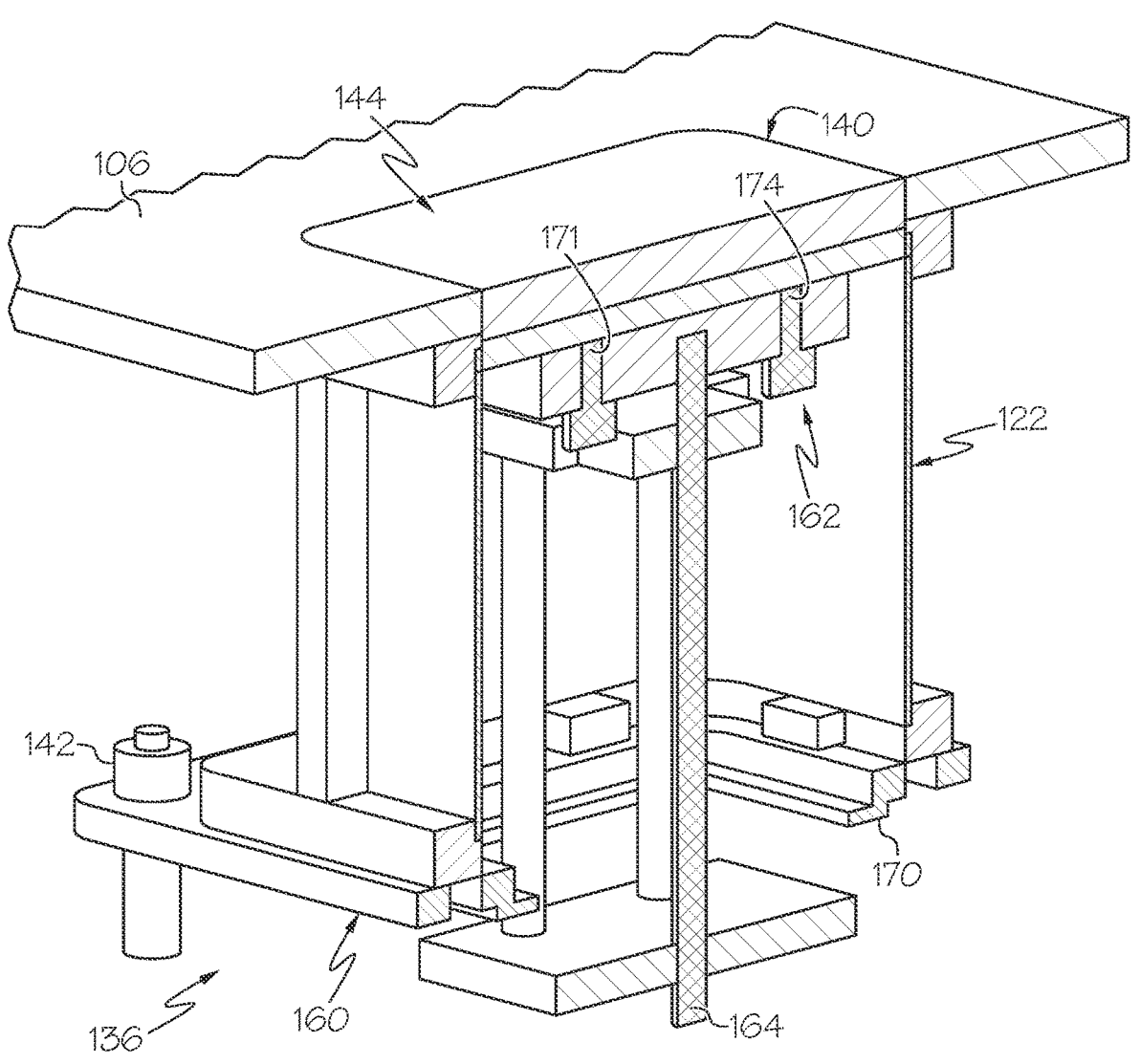
FIG. 8 is a section view of the lift platform assembly of FIG. 5 in use, according to one or more embodiments shown and described herein.

Referring to FIG. 6, a diagrammatic section view of the lift platform assembly 136 is illustrated without the support platform 137 and includes the outer lift platform 160 and the inner lift platform 162 that is located within an opening 166 through the outer lift platform 160. The outer lift platform 160 has a rim portion 168 on which the build box 122 sits and an inner flange portion 170 that defines a perimeter of the opening 166 that extends partially underneath the inner lift platform 162 defining a seat for the inner lift platform 162. Thus, the inner lift platform 162 captures the outer lift platform 160 as shown by FIG. 7 and forces the actuators 142 (e.g., gas springs) into their respective retracted position. The inner lift platform 162 may raise using actuator 164 as shown by FIG. 8. As the inner lift platform 162 raises, the outer lift platform 160 raises therewith due to the bias of the actuators 142 toward extended positions. The outer lift platform 160 is used to lift the build box 122 using actuators 142 toward the process chamber floor 106 while the inner lift platform 162 is used to lift the build platform 144 inside the build box 122. The inner lift platform 162 may be raised and lowered using an actuator 164, such as a ball screw actuator or telescoping ball screw. Further, there may be multiple, such as two or four, actuators 164. Clamping devices 171 and 174 may be provided for engaging with studs 216 (FIG. 11) on a bottom of the build platform 144. The clamping devices 171 and 174 may be pneumatically driven using a pressurized air source. Because the inner lift platform 162 rests on the inner flange portion 170 of the outer lift platform 160, the actuator 164 can also be used to lower the outer lift platform 160 back to the lowered position of FIG. 6 when gas springs are used as actuators 142.

Figure 9:
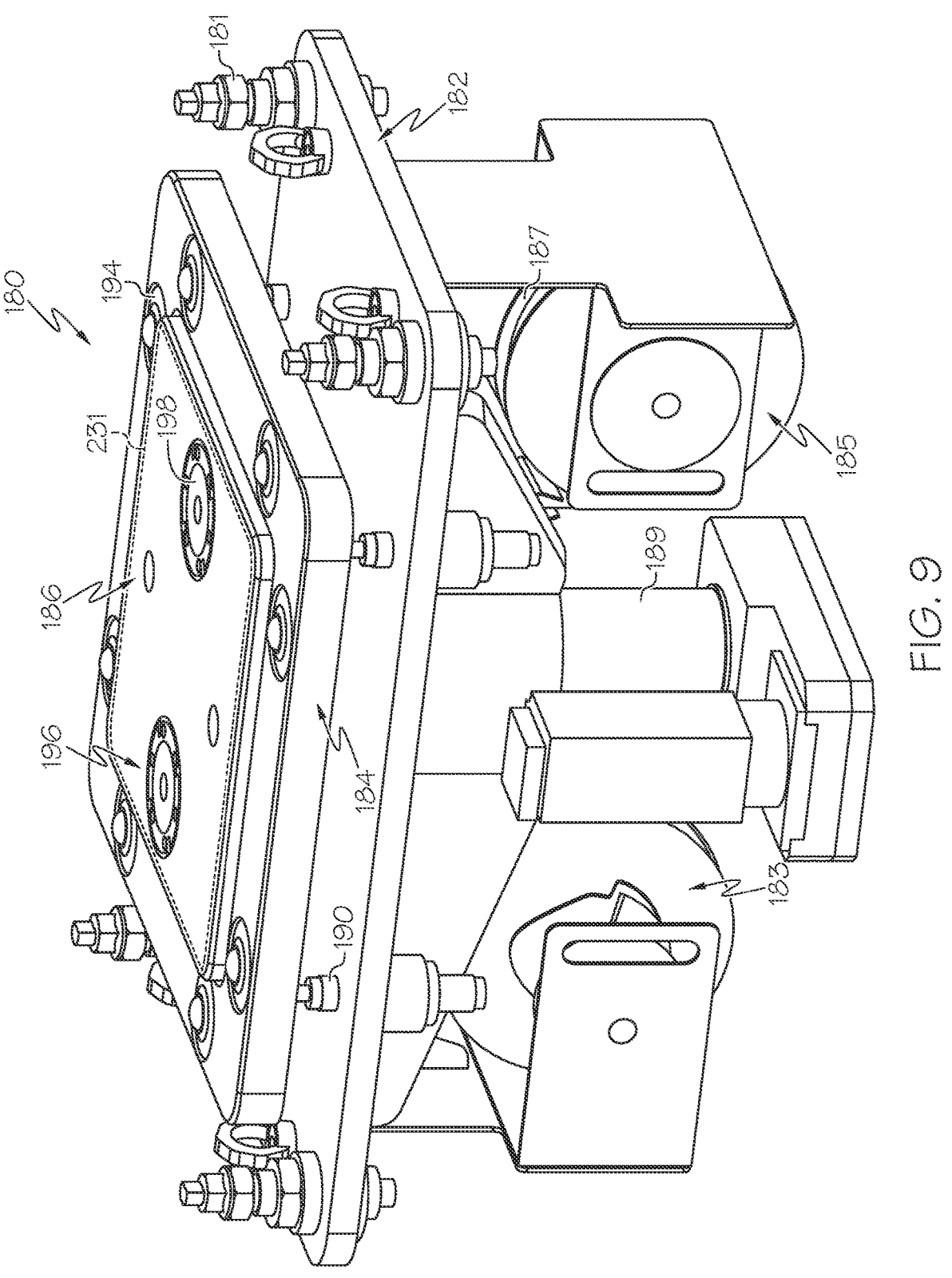
FIG. 9 is a diagrammatic view of another lift platform assembly, according to one or more embodiments shown and described herein.

Referring now to FIG. 9, a more detailed embodiment of another lift platform assembly 180 is illustrated. Any of the components shown and described with reference to FIG. 9 may be used with the lift platform assembly 136 described above. In this embodiment, a support platform 182 is illustrated that can be mounted within the additive manufacturing apparatus 100 using mount brackets 147 (FIG. 3A) and fasteners 181. The support platform 182 may support the lift platform assembly 180 within the additive manufacturing apparatus and provide a location from which the lift platform assembly 180 operates. Spools 183 and 185, such as e-spools, commercially available from igus GmbH of East Providence, RI, can be mounted to support platform 182 and used to manage both electrical and pneumatic cables and tubes, represented by element 187, and allow for movement of the electrical and pneumatic connections, for example, with the lift platform assembly 180.

As above with the lift platform assembly 136, the lift platform assembly 180 include s an outer lift platform 184 and an inner lift platform 186. The inner lift platform 186 is directly mounted to an actuator 189, which may be a servo-driven, telescoping ball screw unit. The outer lift platform 184 is indirectly mounted to the actuator 189 through its nested arrangement with the inner lift platform 186 as discussed above. The outer lift platform 184 is mounted to the support platform 182 using air springs 190 or other suitable actuators. The air springs 190 lift the outer lift platform 184 relative to the support platform 182 to raise the build box 122 and seal the build box 122 against the process chamber floor 106. Adjustment fasteners 181 may be provided that can adjust a height of corners of the support platform 182, which can adjust a tilt and level the lift platform assembly 180 if needed.

In the illustrated embodiment, the outer lift platform 184 includes ball transfer units 194. In this example, each side of the outer lift platform 184 includes two ball transfer units 194, for a total of eight ball transfer units 194. Each side of the outer lift platform 184 may include more than two, such as three ball transfer units 194 or less than two, such as one ball transfer unit 194. The ball transfer units 194 together facilitate sliding movement of the build box 122 over the lift platform assembly 180, for example, as the build box 122 is raised and registers with the bottom of the process chamber floor 106, as will be described in greater detail below. The inner lift platform 186 includes pneumatically-driven clamping devices 196 and 198 that may be commercially available from Jergens, Inc. of Cleveland, OH for engaging with studs 216 (FIG. 11A) on a bottom of the build platform 144.

It should be noted that the lift platform assemblies 136 and 180 may include any number of sensors for determining, for example, positions of the outer lift platforms 160, 184 and/or inner lift platforms 162, 186. Any suitable sensor may be used, such as integrated motor encoders, draw wire encoders, limit switches, etc. Further, sensors may be provided to provide an indication of build box 122 and build platform 144 engagement/disengagement.

Referring to FIGS. 10, 11A and 11B, the build box 122 is shown in greater detail in order to describe operation of the box management system 116. Referring to FIG. 10, the build box 122 includes an enclosure body 200 that, in the illustrated embodiment, is square-shaped in cross section thereby providing a build cross-sectional area. In some embodiments, the build cross-sectional area may be at least about 500 mm×500 mm or more with a build height of at least 500 mm or more, such as 750 mm×750 mm×750 mm. A top flange plate 202 has an opening 204 that extends about a perimeter of the enclosure body 200. The top flange plate 202 may include locating pin openings 211 that receive locating pins to adjust a position of the build box 122. The top flange plate 202 is fixedly mounted to a bottom flange plate 206 by one or more support columns 208. Fasteners 210 may be used to fasten the top and bottom flange plates 202 and 206 to the support columns 208. While the top flange plate 202 extends about the periphery of the enclosure body 200, the bottom flange plate 206 has a stepped groove 212 that receives a bottom edge of the enclosure body 200. In this regard, the bottom flange plate 206 supports the enclosure body 200 thereupon and holds the enclosure body 200 between the top flange plate 202 and the bottom flange plate 206.

The bottom flange plate 206 also has an opening 214 that extends therethrough to the build platform 144. The build platform 144 rests on the bottom flange plate 206 and is slidable in the vertical direction relative to the enclosure body 200 by the lift platform assembly 136, 180. Studs 216 or other clamping features may also be provided that interface with the lift platform assembly 136, 180. A powder collection channel 215 may be provided that can collect powder for removal. The powder collection channel 215 may or may not be continuous around the bottom flange plate 206. A discontinuous powder collection channel 215 can aid in powder removal by terminating the powder collection channel 215 and providing a stop against which powder can be collected.

The build box 122 may be formed to be quarter symmetric, as shown, in order to load the build box 122 onto the box management system 116 in any 90 degree orientation. This can allow for faster throughput of build boxes 122 by eliminating orientation steps while loading the build boxes 122. Further, by providing a multi-piece build box 122, certain ones of the wear surfaces can be removed and replaced without replacing the entire build box 122.

Figure 12:
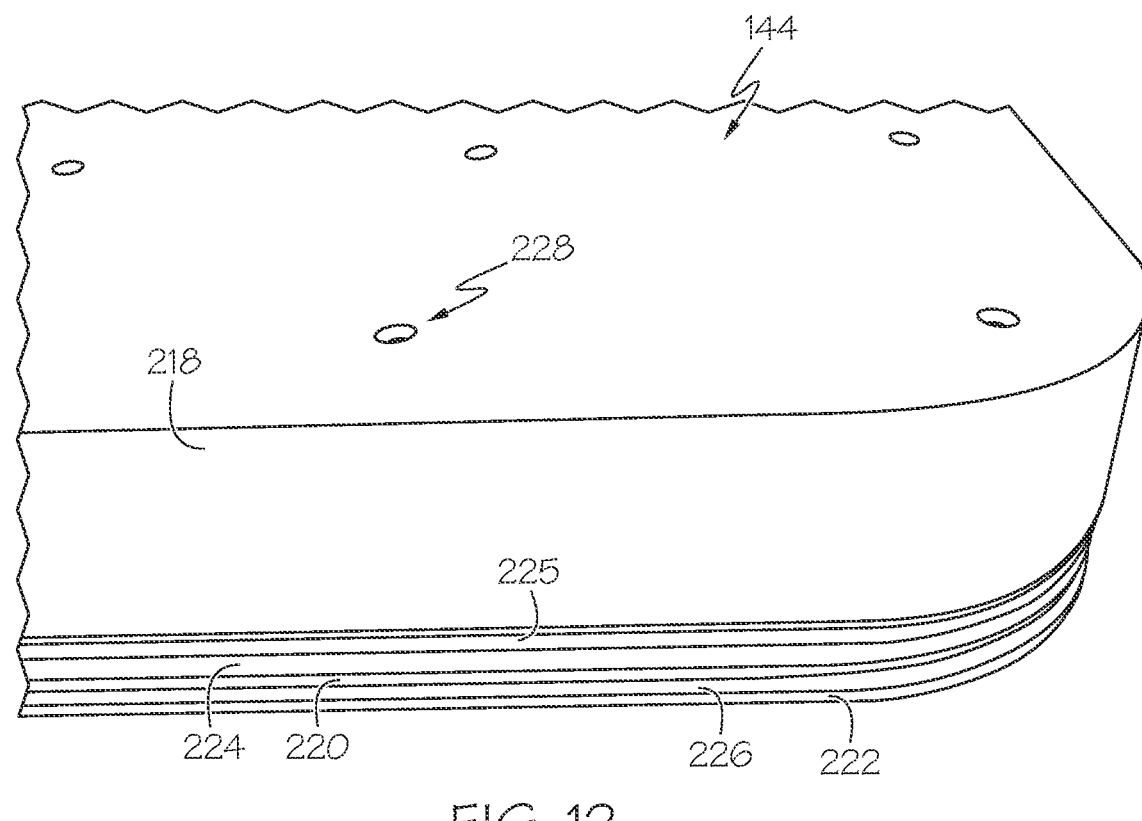
FIG. 12 is a partial view of a build platform of the build box of FIG. 10, according to one or more embodiments shown and described herein.

Referring briefly to FIG. 12, the build platform 144 is illustrated in isolation. The build platform 144 is a multi-piece construction that includes plates 218, 220 and 222. Plates 220 and 222 may be stacked to form multiple grooves 224 and 226 that each receive one or more seals, such as a felt seal and a polymer seal, that maintain a pressure against an inner surface of the enclosure body 200. A capture ring 225 may be provided to cap the groove 224. A distributed bolt pattern 228 through the build platform 144 allows for increased surface contact and heat transfer through the build platform 144. For example, heating elements, represented by element 231 in FIG. 9, may be embedded within the inner lift platform 186 in order to heat the powder on the build platform 144. Thus, the build platform 144 may be formed using a thermally conductive material. In some embodiments, the build platform 144 may be formed of aluminum and the enclosure body 200, top and bottom flange plates 202 and 206 and support columns 208 of the build box 122 may be formed of stainless steel, which is to say the build platform 144 may be more thermally conductive and formed of a lighter material than the rest of the build box construction.

The plate 218 may be a spacer plate of increased thickness compared to the plates 220 and 222. The spacer plate 218 may have a thickness that is selected to achieve a height that is sufficient to be flush with the top of the process chamber floor 106 during operation and with the inner lift plate in its fully extended position. As can be appreciated, the thickness of the plate 218 may be at least about the same thickness as a thickness of the process chamber floor 106.

Figure 13:
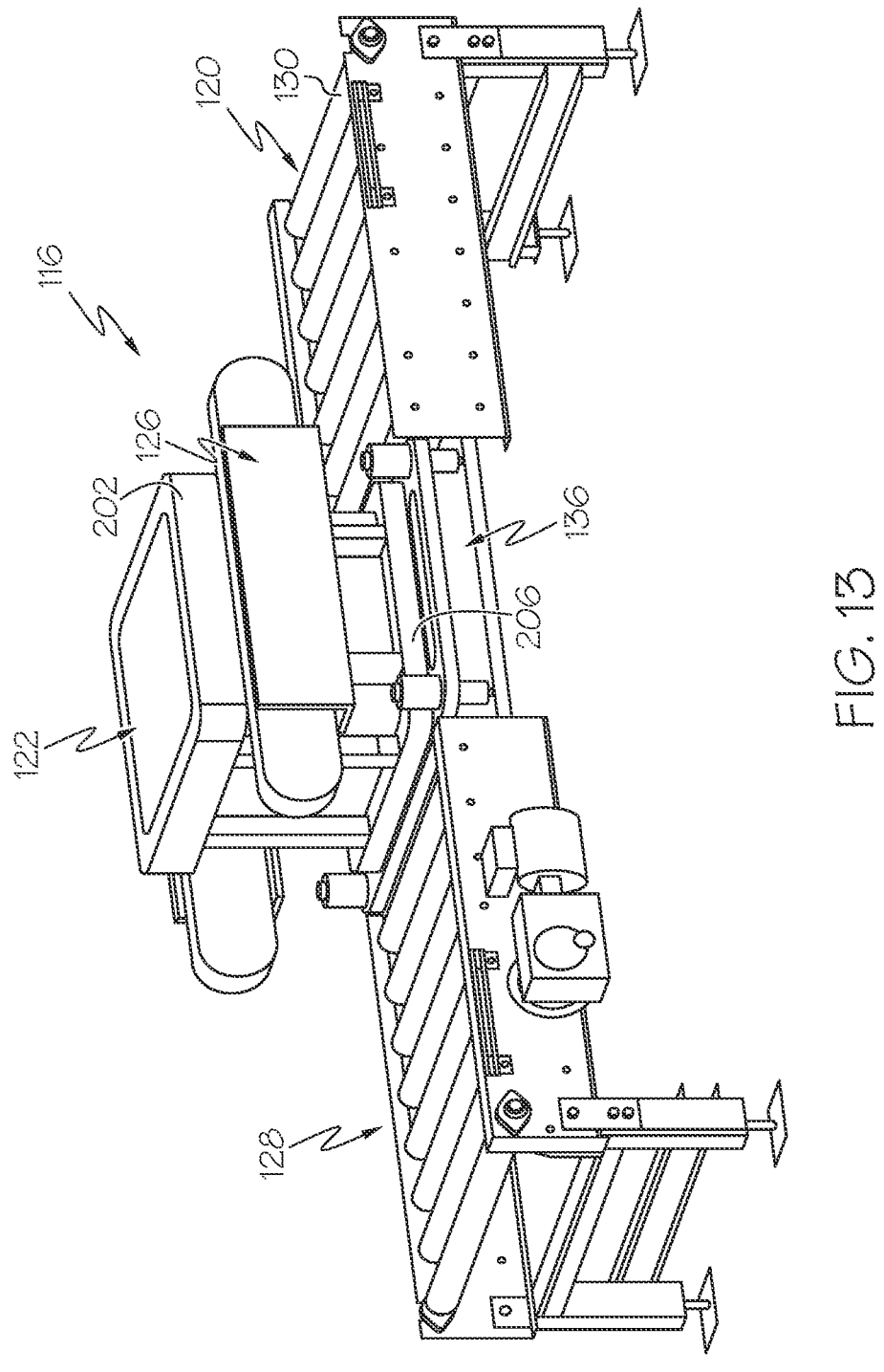
FIG. 13 is a diagrammatic view of the box management system of FIG. 4 in use, according to one or more embodiments shown and described herein.
Figure 14:
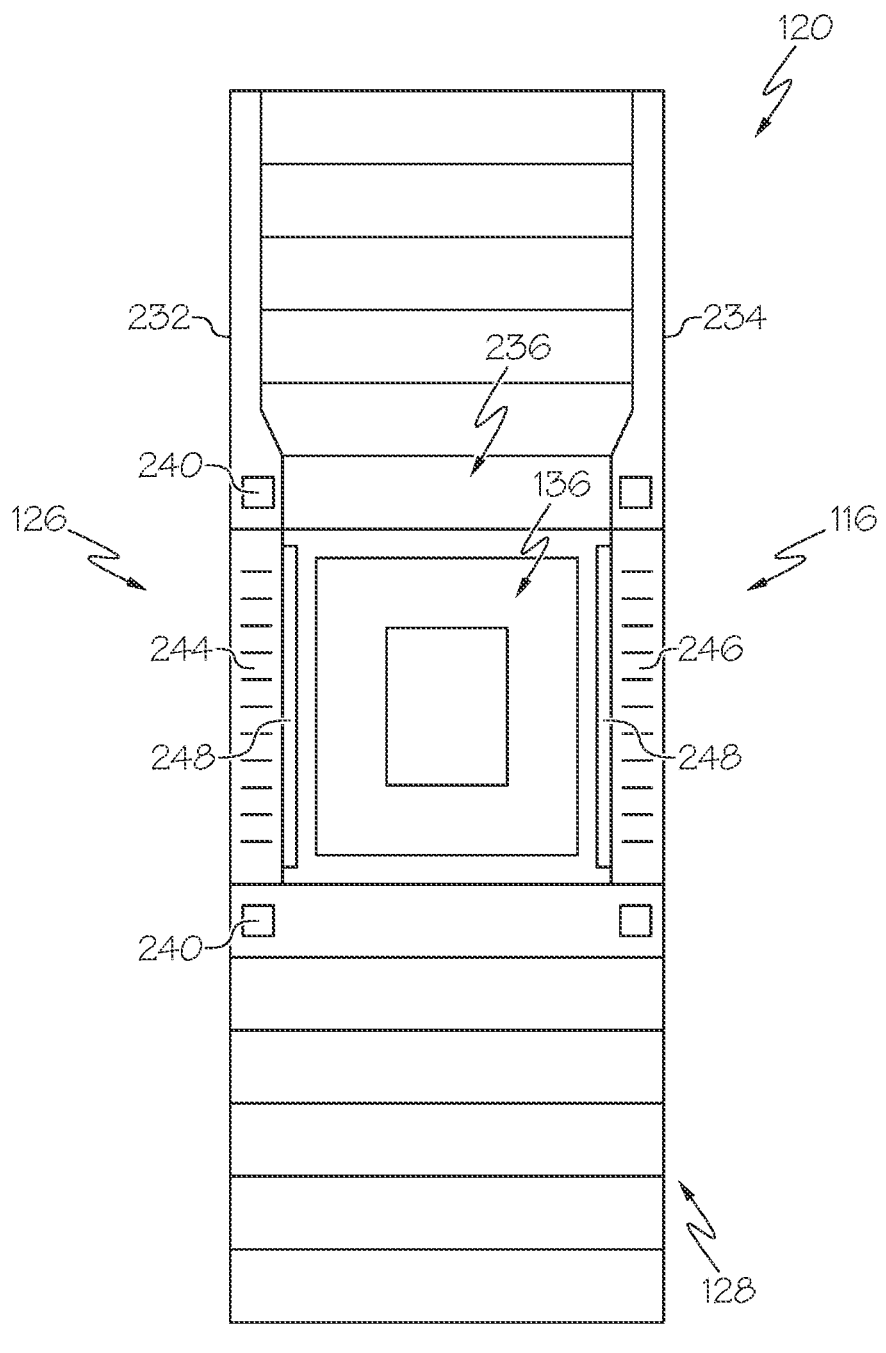
FIG. 14 is a top view of the build box management system of FIG. 13, according to one or more embodiments shown and described herein.

Referring to FIGS. 13-19 operation of the build box management system 116 is described in greater detail. Referring first to FIG. 13, the build box 122 is placed on the intake conveyor 120. As indicated above, the intake conveyor 120 may be motor-driven, driving the rollers 130, which cause the build box 122 to move toward the elevated conveyor 126 and the lift platform assembly 136, 180. FIG. 14 illustrates atop view of the intake conveyor 120. The rollers 130 together define a conveying surface that engages the bottom flange plate 206 of the build box 122. The intake conveyor 120 includes opposite sides 232 and 234 that can be used to guide the build box 122 as the build box moves toward the elevated conveyor 126. In some embodiments, a distance between the sides 232 and 234 may decrease, forming a slight necked-down region 236 that serves to align the build box 122 both rotationally and in the cross-conveying direction so that opposite sides of the build box 122 face the upstream and downstream conveying directions.

Figure 15:
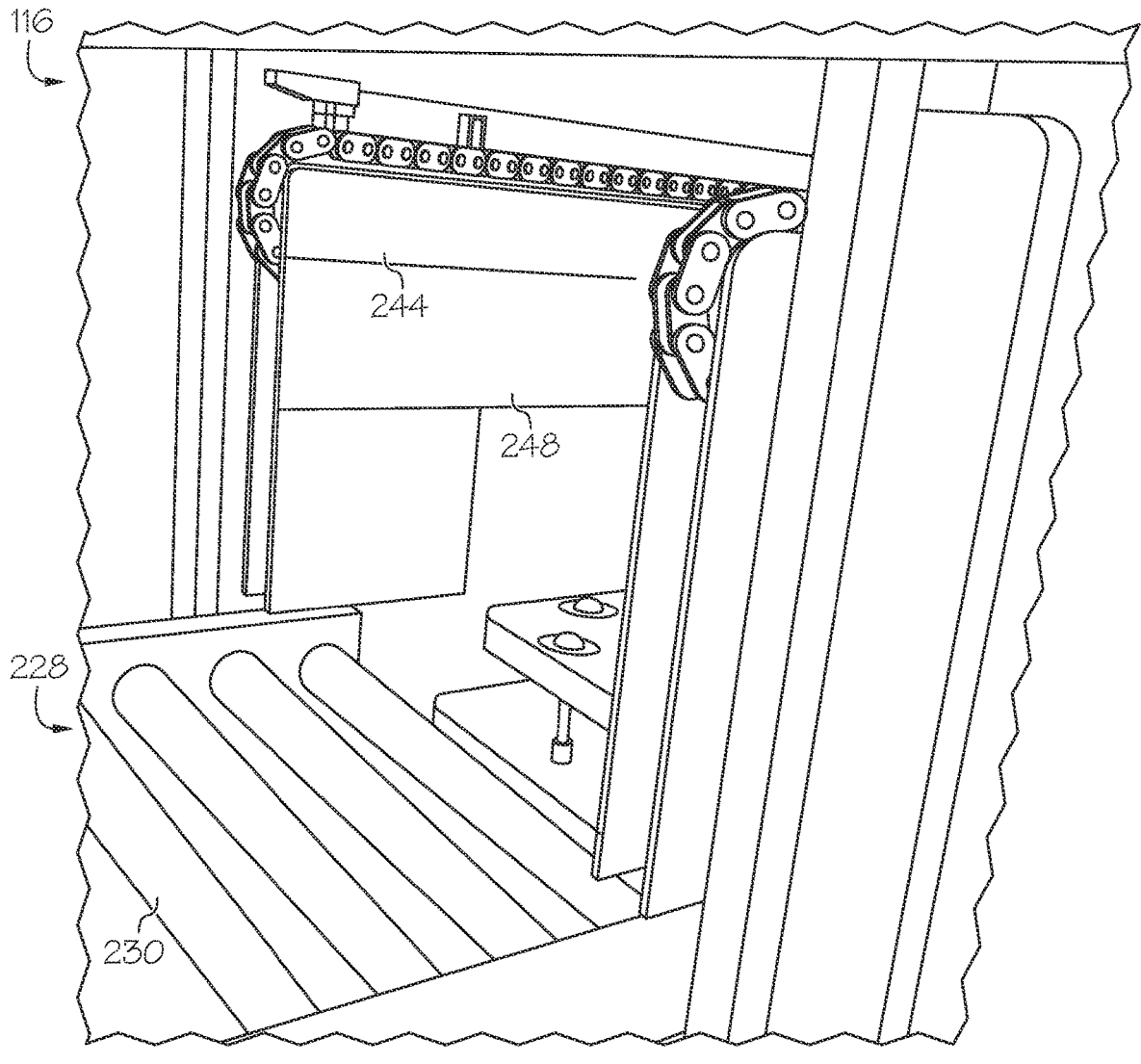
FIG. 15 is a diagrammatic view of a portion of the additive manufacturing apparatus of FIG. 2, according to one or more embodiments shown and described herein.
Figure 16:
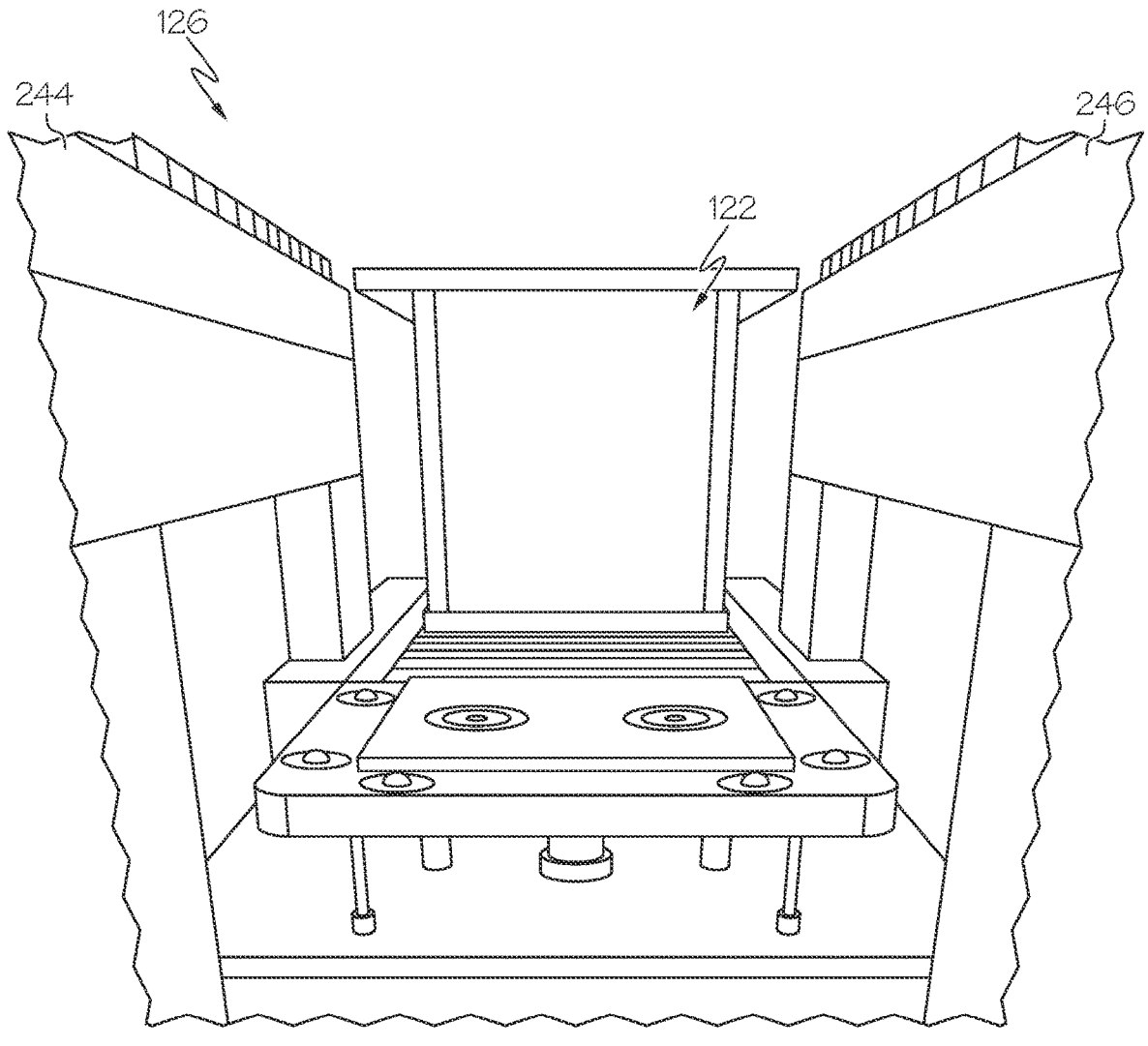
FIG. 16 is another diagrammatic view of the additive manufacturing apparatus of FIG. 2, according to one or more embodiments shown and described herein.

The top flange plate 202 of the build box 122 is then engaged by the elevated conveyor 126 and transferred from the intake conveyor 120 onto the lift platform assembly 136, 180. The elevated conveyor 126 includes conveying elements, such as a drag chain or rollers that are at least partially elevated above the conveying surface provided by the intake conveyor 120. In this regard, the build box 122 hangs from the elevated conveyor 126 by its top flange plate 202. Light curtains 240 or other proximity sensors may be provided that inhibit the operator from reaching into the build box lift area while the build box 122 is being lifted onto and lowered from chain conveyors 244 and 246. Referring briefly to FIG. 15, guide plates 248 may be provided on both of the chain conveyors 244 and 246 that face one another to further decrease conveying width and to align the build box 122 as the build box 122 travels on the elevated conveyor 126. The guide plates 248 may be formed from a low friction bearing material. The guide plates 248 touch off on the support columns 208 (FIG. 10) to finely adjust a position of the build box 122. FIG. 16 illustrates the build box 122 after exiting the elevated conveyor 126. The lift platform assembly 180 is located between the chain conveyors 244 and 246 and is in the lowered position when the build box 122 is lifted onto and off of the chain conveyors 244 and 246.

Figure 17A:
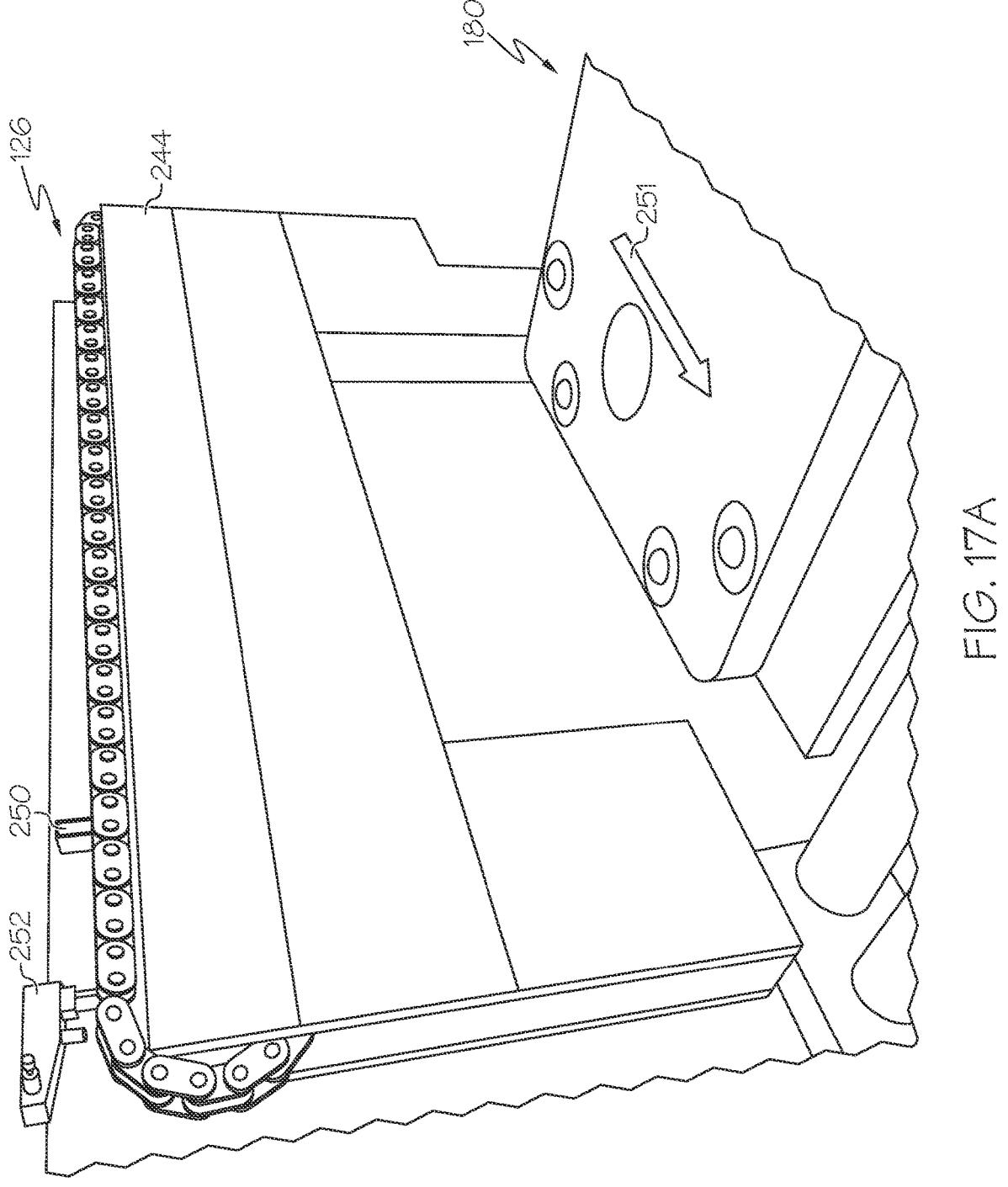
FIG. 17A is another diagrammatic view of the additive manufacturing apparatus of FIG. 2, according to one or more embodiments shown and described herein.
Figure 17B:
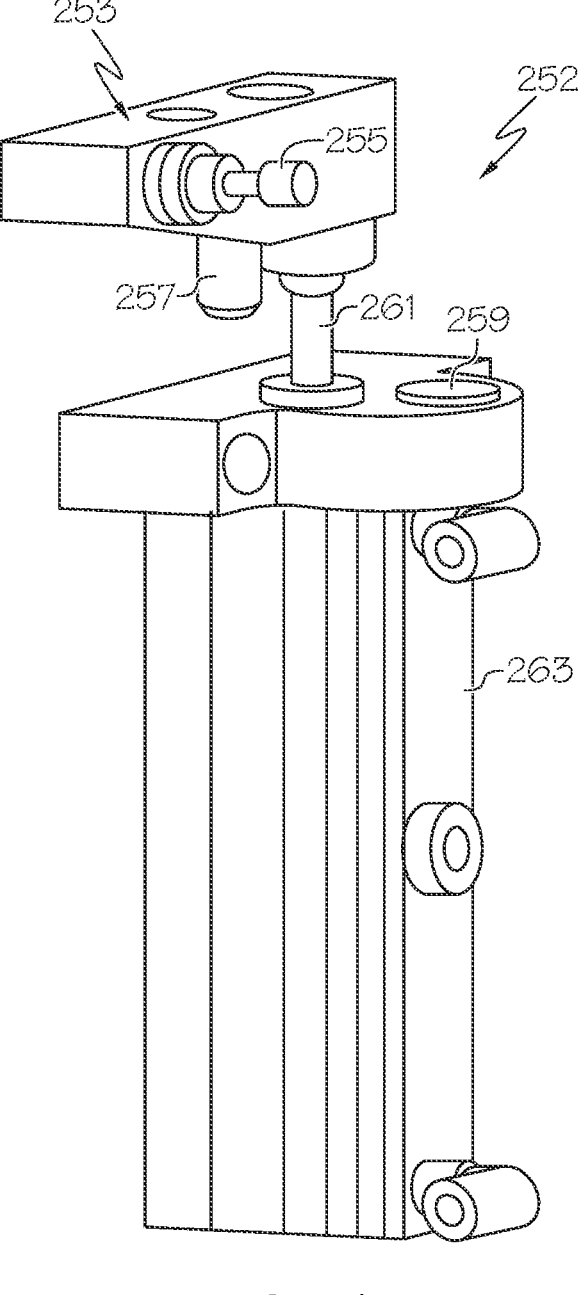
FIG. 17B is a diagrammatic view of a hard stop in an open position for use with the additive manufacturing apparatus of FIG. 17A, according to one or more embodiments shown and described herein.
Figure 17C:
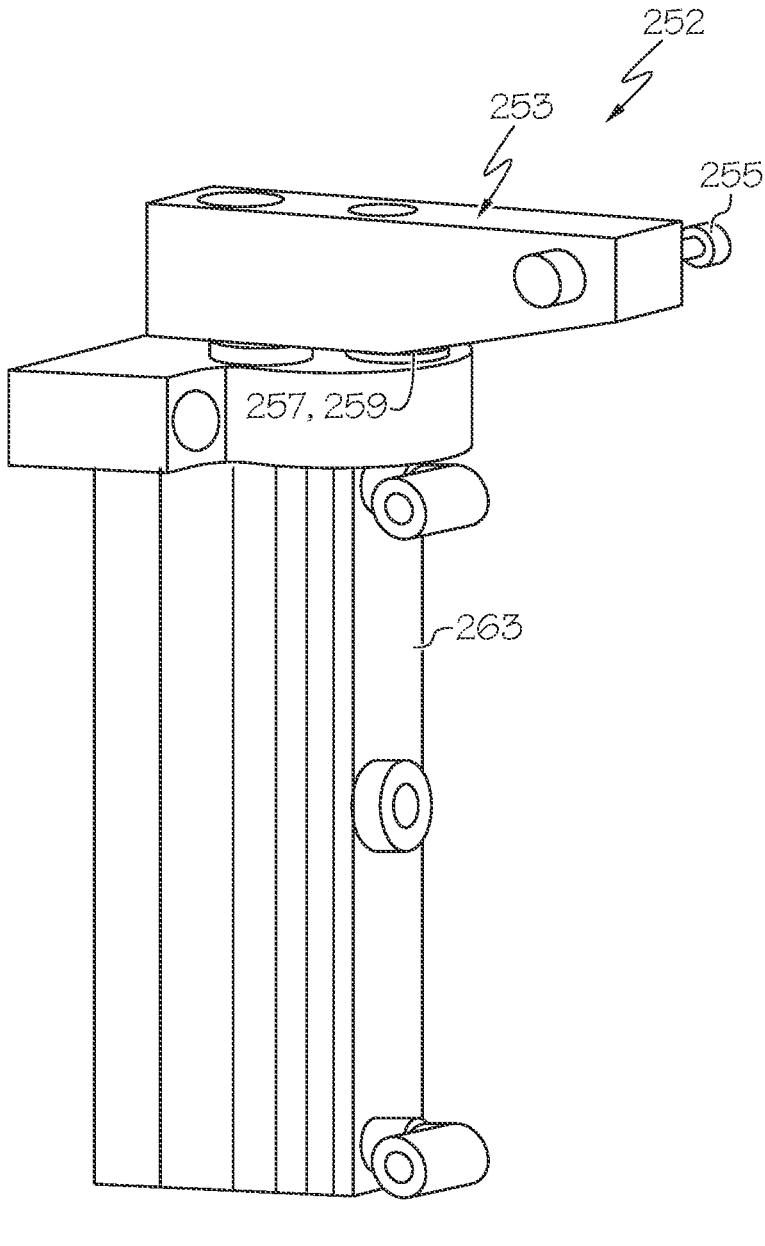
FIG. 17C is a diagrammatic view of the hard stop of FIG. 17B in a stop position, according to one or more embodiments shown and described herein.

Referring to FIG. 17A, as the build box 122 is moved over the lift platform assembly 180 in the conveying direction represented by arrow 251, a proximity sensor 250 detects presence of the build box 122 an provides a signal to the controller of the control system that slows the chain conveyors 244 and 246 and brings the build box 122 to a stop over the lift platform assembly 180. A pneumatically-actuated hard stop 252 may be used to stop the build box 122 at the desired location. Each chain conveyor 244 and 246 may have a hard stop 252. It should be noted that the conveying direction can be reversed by relocating the hard stops 252 to the opposite end of the elevated conveyor 126. Referring to FIGS. 17B and 17C, the hard stops 252 may be actuated (e.g., turned) into a stop position to precisely stop the build box 122 at the desired location. In particular, the hard stops 252 include a stop arm 253 with a stop member 255 that extend outward from the stop arm 253. The stop arm 253 pivots with an actuation rod 261 that is driven by a pneumatic cylinder 263. When the actuation rod 261 rotates, the actuation rod 261 also retracts into the cylinder 263. A reinforced pin 257 is provided on the stop arm 253 that is received by a bushing 259 in the stop position as shown by FIG. 17C. In the stop position, the hard stops 252 clamp onto the build box 122 providing a hard stop and then swing out to the illustrated open position to allow the build box 122 to be conveyed off of the elevated conveyor 126.

Figure 18:
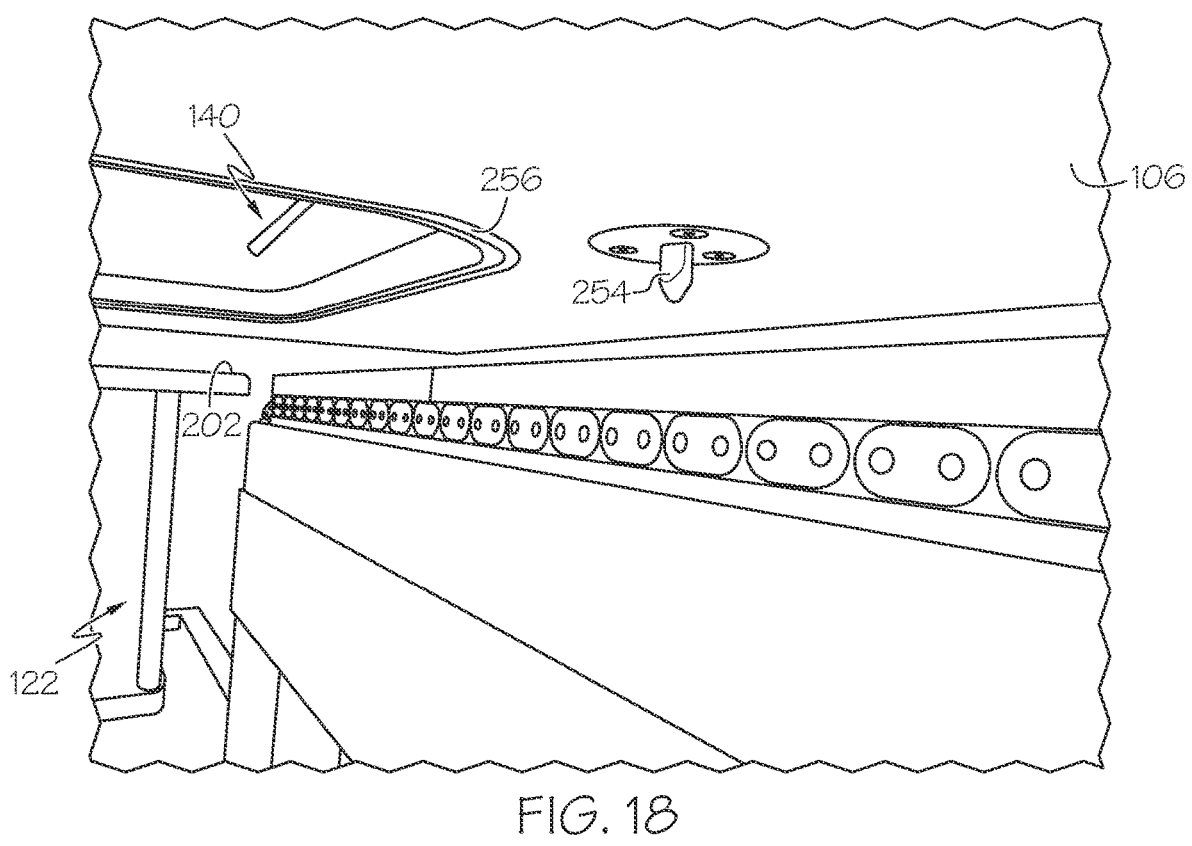
FIG. 18 is another diagrammatic view of the additive manufacturing apparatus of FIG. 2, according to one or more embodiments shown and described herein.
Figure 19:
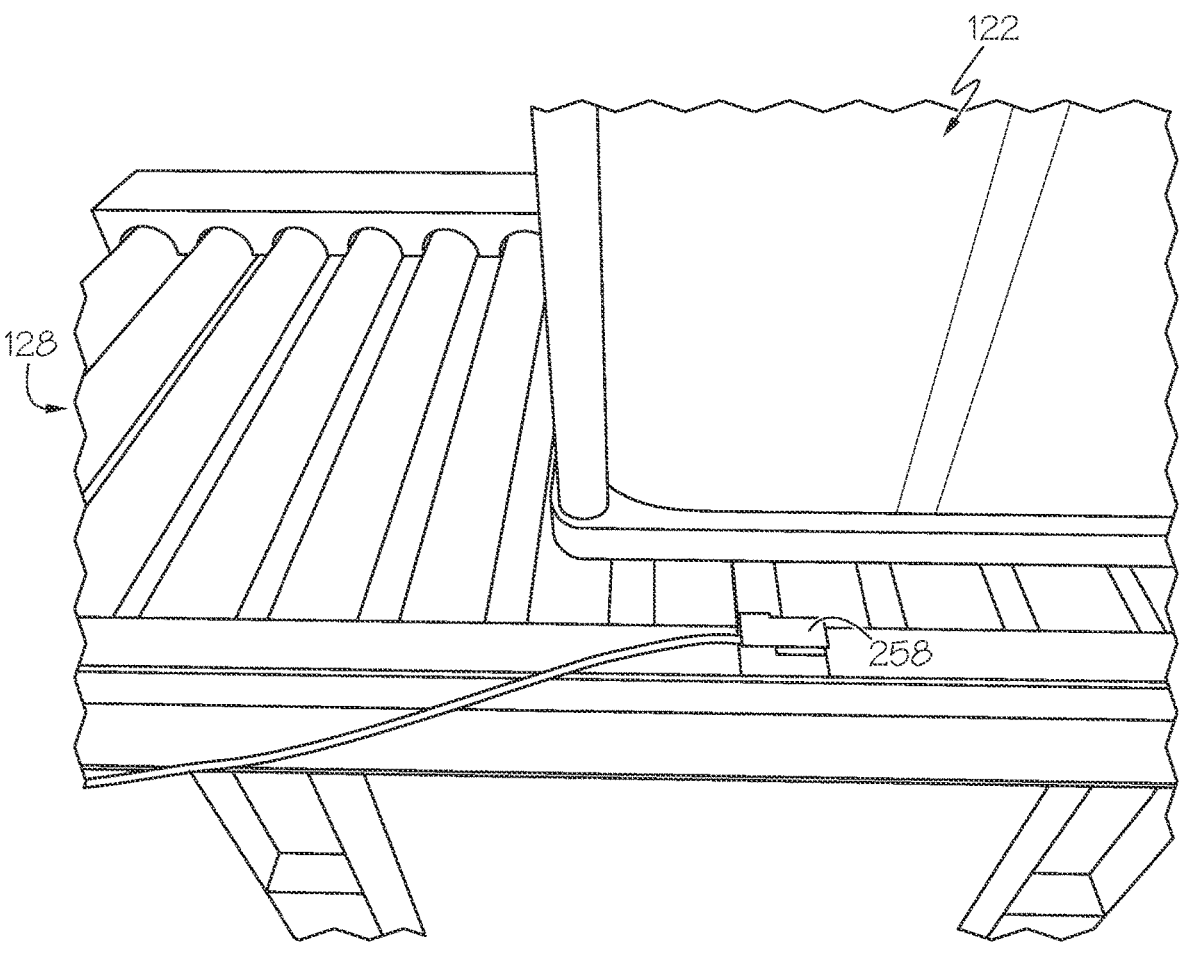
FIG. 19 is another diagrammatic view of the additive manufacturing apparatus of FIG. 2, according to one or more embodiments shown and described herein.

Referring to FIG. 18 in some embodiments, one or more locating pins 254 (e.g., two or four) may be provided at the underside of the process chamber floor 106 to further align the build box 122 as the build box is raised against the process chamber floor 106. The locating pins 254 may be received within locating pin openings 211 that are provided in the top flange plate 202. The locations of the locating pins 254 are fixed to align the build box 122 as it is raised. FIG. 18 also shows the opening 140 in the process chamber floor 106. A seal 256 may be provided around an outer perimeter of the opening 140 to provide a gas-tight seal with the build box 122 when lifted and held thereagainst. Referring briefly to FIG. 19, another proximity sensor 258 may be provided on the outfeed conveyor 128 to detect the presence of the build box 122 and provide a signal to the control system.

Lid Management System

Referring again to FIG. 4, as pointed out above, the opening 140 in the process chamber floor 106 has a shape (e.g., rectangular, such as square) that corresponds to a horizontal cross-sectional shape of the build box 122. A size of the opening 140 may be smaller than an outer perimeter of the top flange plate 202 (FIGS. 10 and 11A) of the build box 122 to allow the build box 122 to seal against the underside of the process chamber floor 106 and around the opening 140 as the build box 122 is raised toward the opening 140. The lift platform assembly 136 may lift the build box 122 toward the opening 140 and may also raise the build platform 144 to the opening 140 for a build operation. As one example, the opening 204 of the top flange plate 202 may be about 512 mm×512 mm, the opening 140 of the process chamber floor 106 may be about 518 mm×518 mm and the build platform 144 may be about 510 mm×510 mm. Other larger or smaller sizes are possible depending, at least in part, on the desired build area size.

The lid management system 114 includes actuator 300 that can be used to move a machine lid 302 toward and away from the process chamber floor 106. The machine lid 302 is sized and shaped to mate with the perimeter of the opening 140 of the process chamber floor 106. The machine lid 302 includes a seal 330 that can seal against the perimeter of the opening 140 in order to provide an air-tight seal. The machine lid 302 may also be used to clamp onto the build box lid 304 for removing the build box lid 304, as will be described in greater detail below. In FIG. 4, the build box lid 304 is shown removed from the build box 122 by the lid management system 114.

Figure 20:
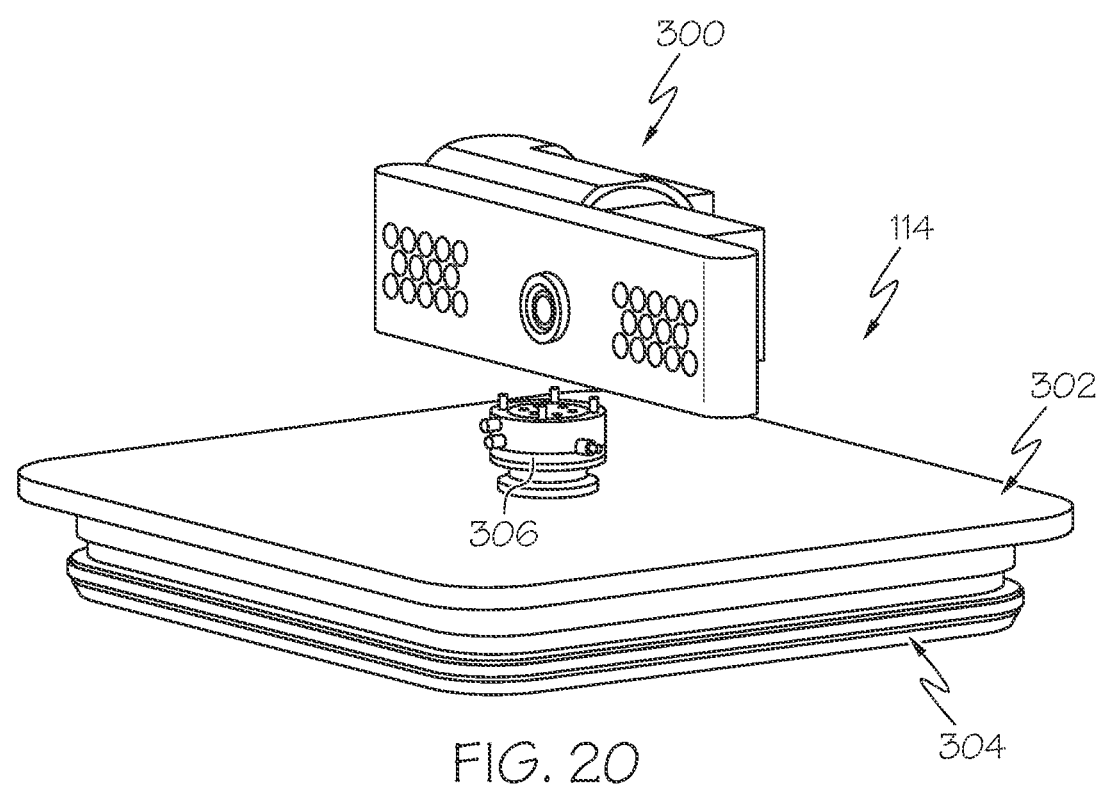
FIG. 20 is a diagrammatic view of the lid management system of FIG. 4, according to one or more embodiments shown and described herein.
Figure 21:
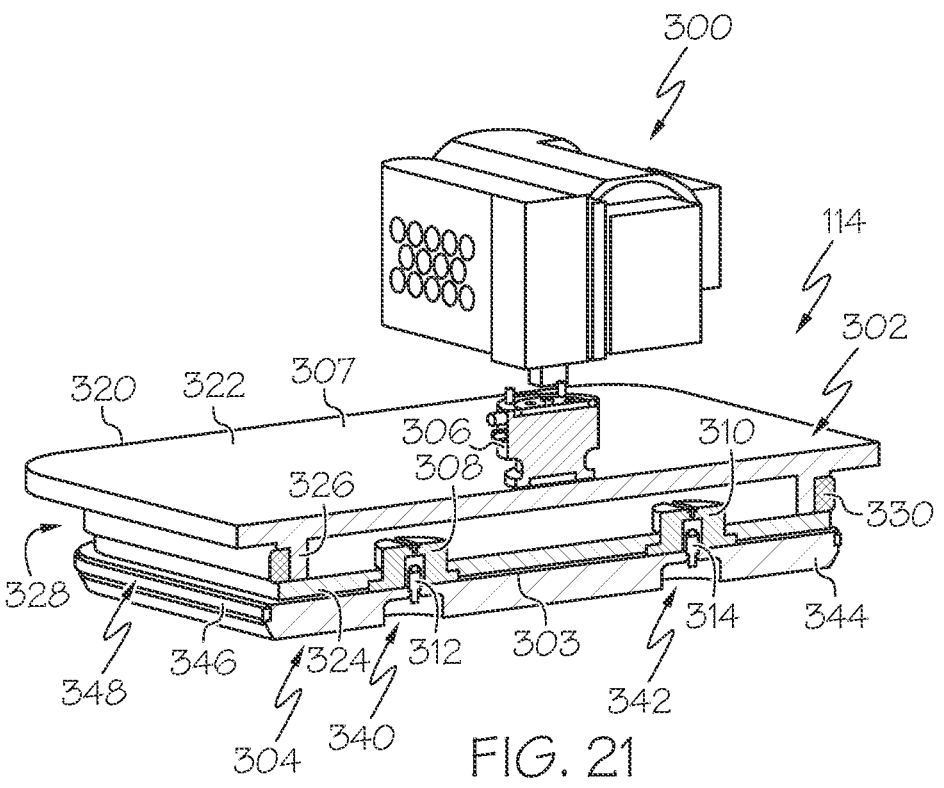
FIG. 21 is a diagrammatic, section view of the lid management system of FIG. 20, according to one or more embodiments shown and described herein.

Referring now to FIGS. 20 and 21, the lid management system 114 is diagrammatically illustrated in greater detail including the actuator 300 and machine lid 302. In the example of FIG. 20, the build box lid 304 is illustrated connected to the machine lid 302 after the build box lid 304 is removed from the build box 122 using the machine lid 302. The actuator 300 may be any suitable actuator, such as a zip chain actuator. The actuator 300 may include a zip chain that connects to a connector 306. The connector 306 may be a compliance device that automatically allows for some X-Y positioning deviations between the chain and the connector 306 when connecting together. The connector 306 may be mounted to the machine lid 302 using any suitable method, such as welding, fastening, etc.

FIG. 21 shows an exemplary machine lid 302 for illustrative purposes. Referring to FIG. 21, on a face 303 of the machine lid 302 that is opposite face 307 are one or more clamp devices 308 and 310. The clamp devices 308 and 310 may be powered, such as using pneumatic, hydraulic power, electric power, etc. The clamp devices may be commercially available from Jergens, Inc. of Cleveland, OH. The clamp devices 308 and 310 clamp onto studs 312 and 314, such as also available from Jergens, Inc, that are mounted to the build box lid 304. In some embodiments, the clamp devices 308 and 310 are normally closed to inhibit an unintended release of the studs 312 and 314 and the build box lid 304, for example, due to an issue with the pneumatic system. While two studs 312 and 314 are shown, any number of suitable studs may be used, such as four to allow for multiple clamping and build box 122 orientations. Use of four studs can allow the box-shaped build box 122 with build box lid 304 to be fed into the intake conveyor 120 (FIG. 3) in multiple orientations corresponding to the four sides of the build box 122.

Figure 22:
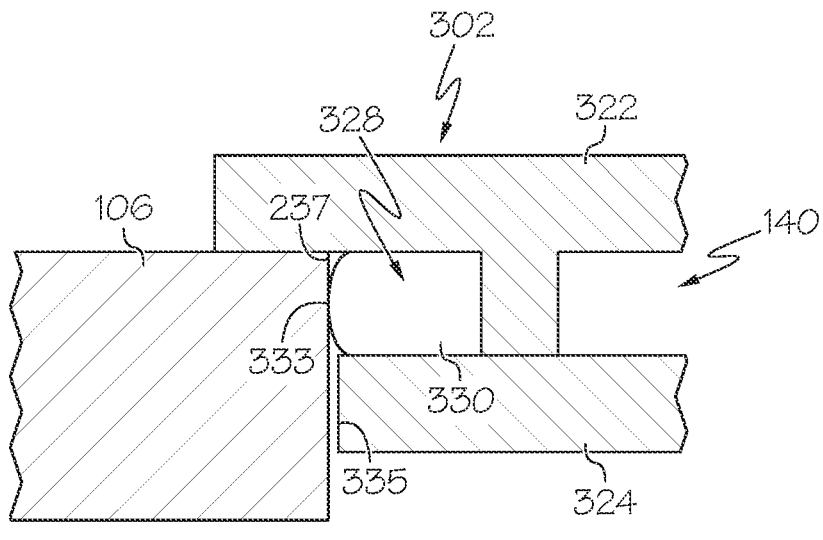
FIG. 22 is a section view of a portion of a machine lid of the lid management system of FIG. 21 showing a seal in an inflated configuration, according to one or more embodiments shown and described herein.
Figure 23:
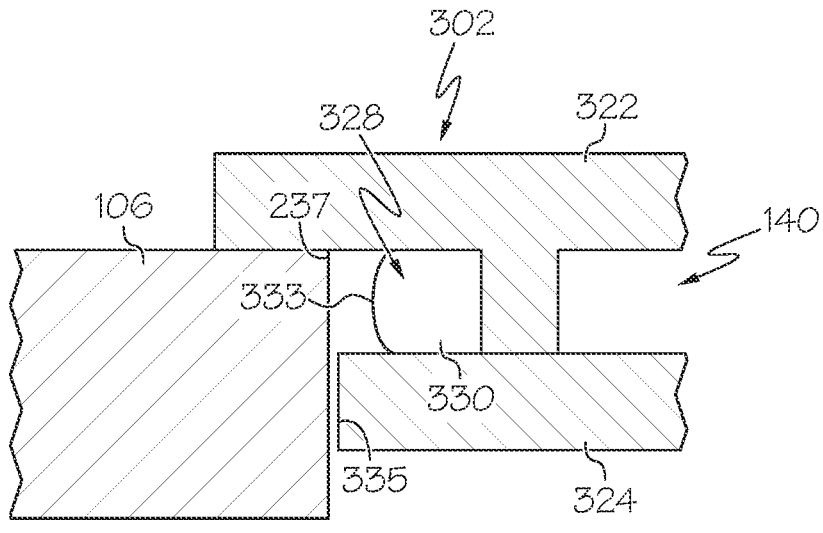
FIG. 23 is another section view of the portion of the machine lid of FIG. 21 in a deflated configuration, according to one or more embodiments shown and described herein.

The machine lid 302 may be formed of multiple plates to form a machine lid body 320. The machine lid body 320 includes an upper plate 322 that faces the process chamber 110 and a lower plate 324 that faces away from the process chamber 110. In the illustrated embodiment, the upper plate 322 includes an intermediate wall 326 that extends toward the lower plate 324 forming a volume between the upper and lower plates 322 and 324. In other embodiments, the machine lid may be solid, monolithic piece of material. In some embodiments, the lower plate 324 may include the wall 326. Both the upper plate 322 and the lower plate 324 extend outwardly beyond the wall 326 thereby forming a recess 328 therebetween that extends about an entire periphery of the machine lid body 320. Referring briefly to FIGS. 21 and 22, a seal 330 may be located in the recess 328. The seal 330 may have an inflated configuration (FIGS. 21 and 22) and a deflated configuration (FIG. 23), or the seal may not be inflatable. Referring particularly to FIG. 22, in the inflated configuration, an outer perimeter 333 of the seal 330 is located outside of an outer perimeter 335 of the lower plate 324 in order to seal against the perimeter 237 of the opening 140 of the process chamber floor 106 providing a gas-tight seal. Referring to FIG. 23, in the deflated configuration, the outer perimeter 333 of the seal 330 may be retracted from the perimeter 237 of the opening 140 to facilitate removal of the machine lid 302 and build box lid 304 from the opening 140, exposing of the build platform 144.

Referring back to FIG. 21, the build box lid 304 may be formed as a single, monolithic piece of material, such as aluminum. In other embodiments, the build box lid may be formed of multiple plates or pieces. In some embodiments, the build box lid 304 includes openings 340 and 342 that provide regions of reduced thickness so that the studs 312 and 314 can be accessed from outer face 344, e.g., to remove and replace the studs 312 and 314. The build box lid 304 may also include a seal 346 that extends about an entire periphery of the build box lid 304. The seal 346 may be located within a recess 348. The seal 346 may or may not be inflatable. Multiple seals may be used or other components may be added, such as a brush that extends about the build box lid 304 in a fashion similar to seal 346 that is used to displace powder clinging around the opening or the build box 122. In the illustrated example, the seal 346 is solid (e.g., formed of a silicone foam with a round profile) and not inflatable and provides a powder-tight seal with the build box 122 to inhibit loose powder from escaping out of the build box 122 after a build process. An O-ring may be used as the seal 346. The perimeter of the build box lid 304 may also be chamfered that interlocks with a corresponding chamfer of the build box 122. Such a chamfered arrangement can be used to register the build box lid 304 with the build box 122.

Figure 24:
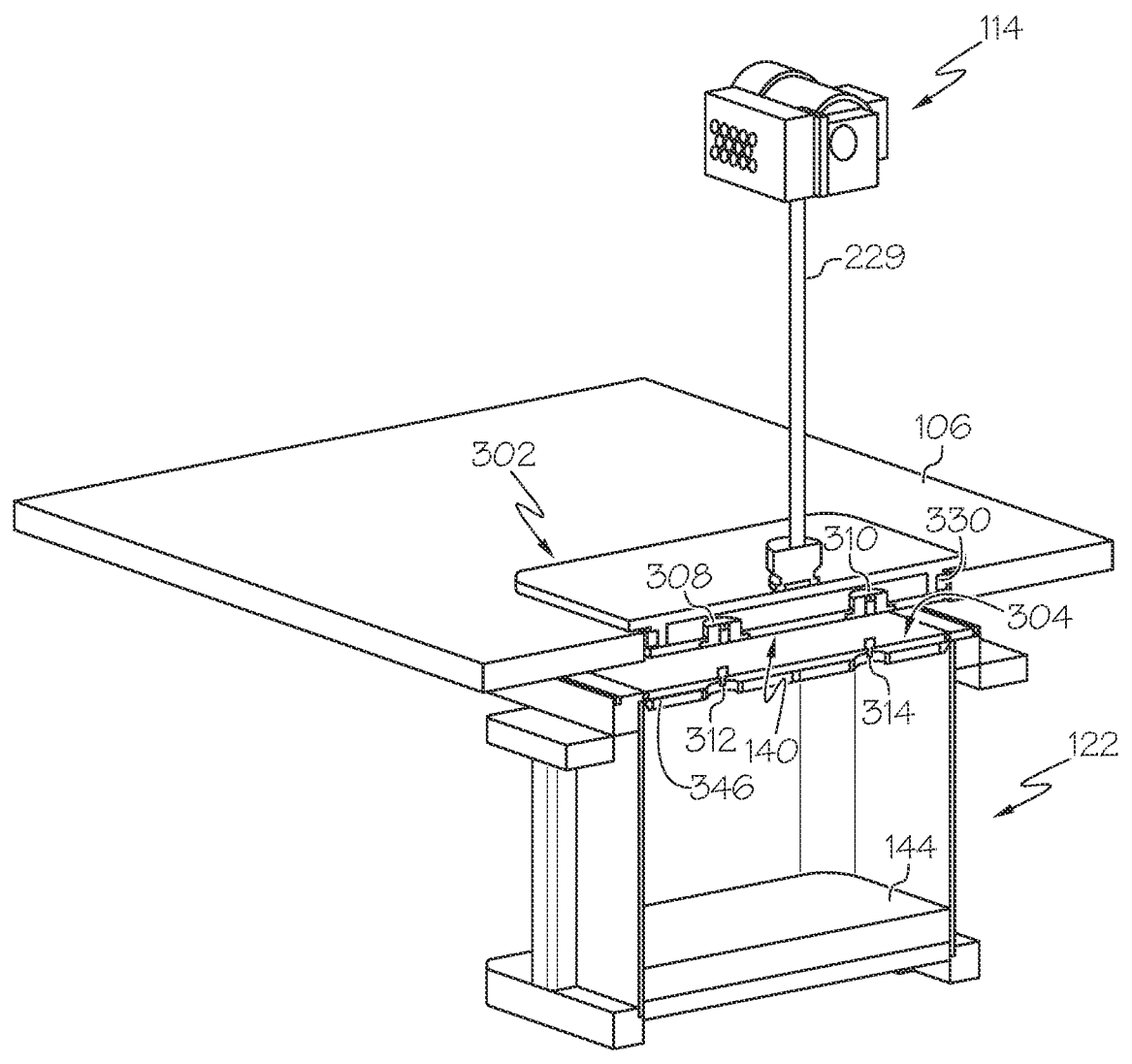
FIG. 24 illustrates operation of the lid management system of FIG. 4, according to one or more embodiments shown and described herein.

In FIGS. 24-29, operation of the lid management system 114 with operation of the box management system (not shown) is illustrated diagrammatically. Referring first to FIG. 24, the build box 122 is illustrated in a lowered position where the build box 122 is located on the lift platform assembly 136. In the lowered position, there is a gap between the build box 122 and the process chamber floor 106. The gap may include air as it is exposed to the surroundings. To inhibit entry of air into the process chamber 110, the machine lid 302 is mated and sealed against the perimeter of the opening 140 of the process chamber floor 106 using the seal 330 that is in the inflated configuration.

The build box lid 304 is mated with an inner perimeter of the build box 122 using the seal 346. It should be noted that the seal against the build box 122 may or may not be gas-tight, but is powder-tight to prevent powder from exiting the build box 122 unintentionally. The build box lid 304 includes the studs 312 and 314 that mate with the clamp devices 308 and 310 as the build box 122 is raised by the lift platform assembly 136.

Figure 25:
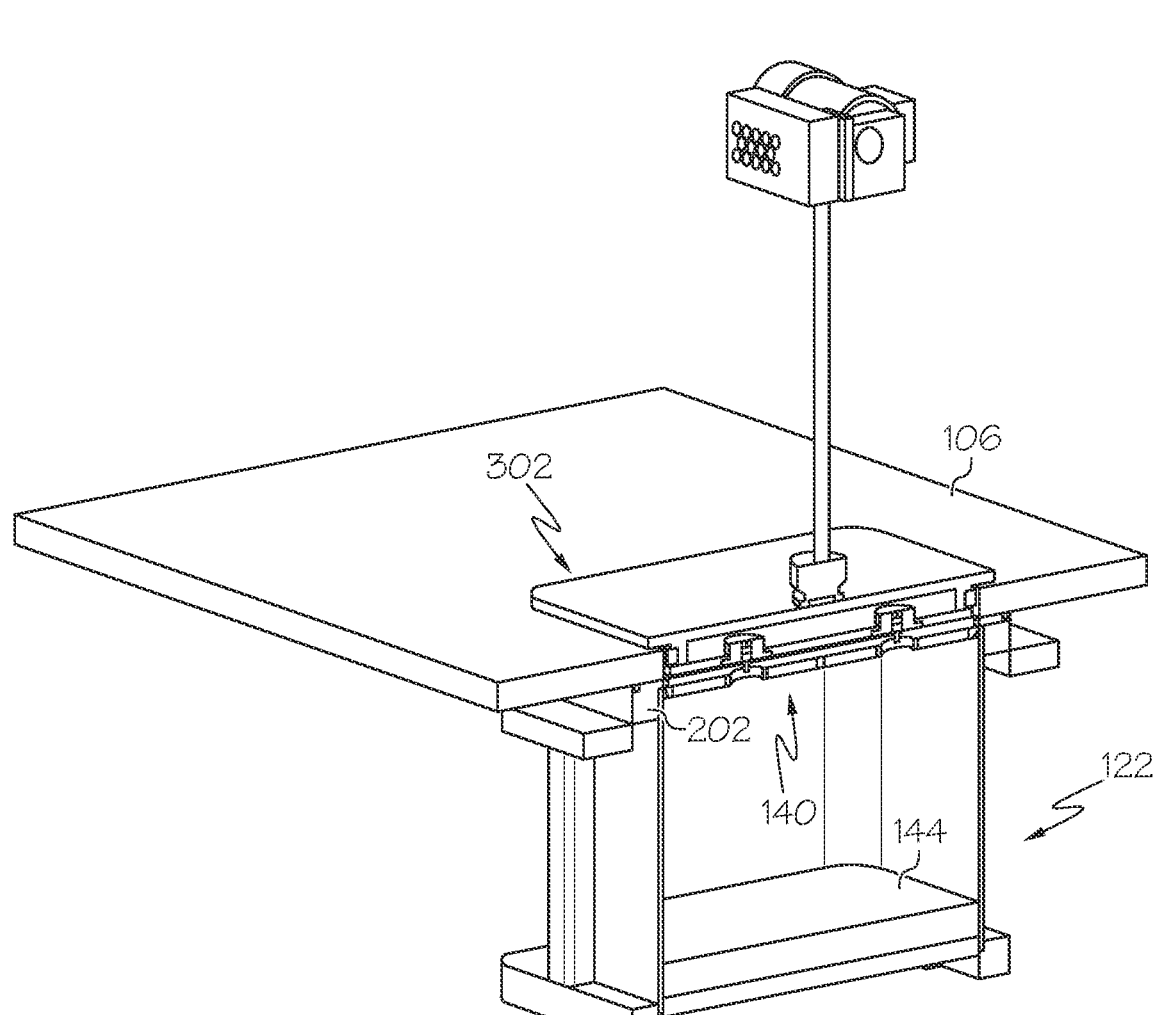
FIG. 25 illustrates operation of the lid management system of FIG. 4, according to one or more embodiments shown and described herein.

Referring to FIG. 25, the build box 122 is shown in a lifted position where the top flange plate 202 is sealed against an underside of the process chamber floor 106. The underside of the process chamber floor 106 may include the seal 256 (FIG. 18) that faces the top flange plate 202 to form a seal about the opening 140 once the build box 122 is raised. Because the build box 122 may not be gas-tight and may have air therein, the machine lid 302 remains in the lowered position, sealed against the process chamber floor 106 to inhibit air from the build box 122 entering the process chamber 110.

Figure 26:
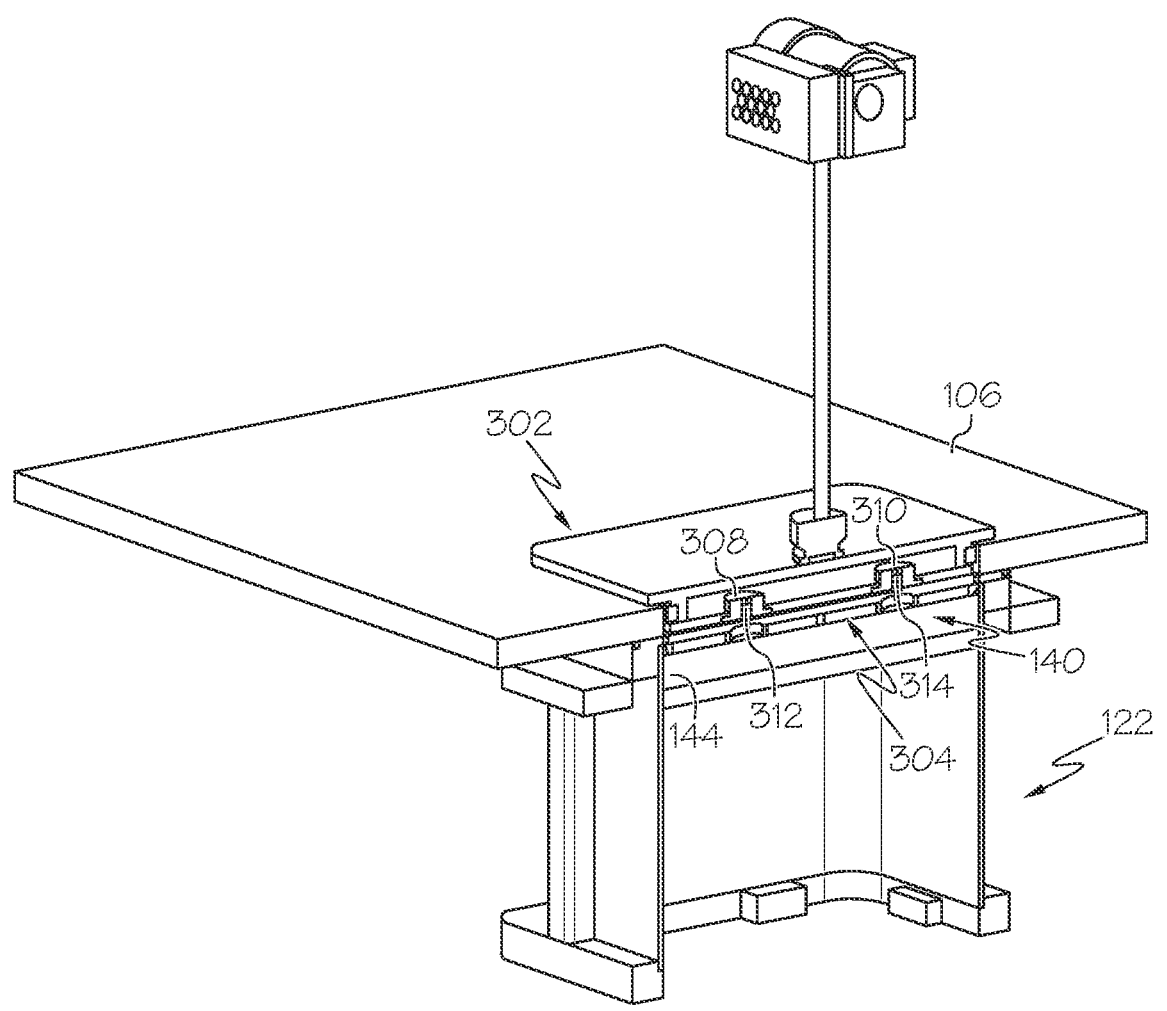
FIG. 26 illustrates operation of the lid management system of FIG. 4, according to one or more embodiments shown and described herein.

As can be seen from FIGS. 24 and 25, the build platform 144 may initially be located at the bottom of the build box 122. Referring to FIG. 26, the lift platform assembly 136 lifts the build platform 144 toward the build box lid 304 while the build box lid 304 is mated with the build box 122. In this regard, the build platform 144 may act as a positive displacement pump thereby forcing air out of the build box 122, through one or more check valves in the build box lid 304 and into an air vent system. The vent system is connected to an air vent that vents the air out of the process chamber 110 and to the surroundings. In some embodiments, a filter may be provided through which the air passes before the air is vented to the surroundings. As noted above, a bellows may be used to surround the vent system to seal the air from the inert environment. Use of the bellows will be described in greater detail with regard to FIG. 31.

As the build platform 144 is raised toward the opening 140 in the process chamber floor 106, the build platform 144 engages the build box lid 304. The build platform 144 then lifts the build box lid 304 to register with the machine lid 302. As the build box lid 304 is raised, the clamp devices 308 and 310 engage the studs 312 and 314 locking the build box lid 304 and the machine lid 302 together face-to-face. The machine lid 302 remains in the lowered position, sealed against the process chamber floor 106 and the air in build box 122 is evacuated.

Figure 27:
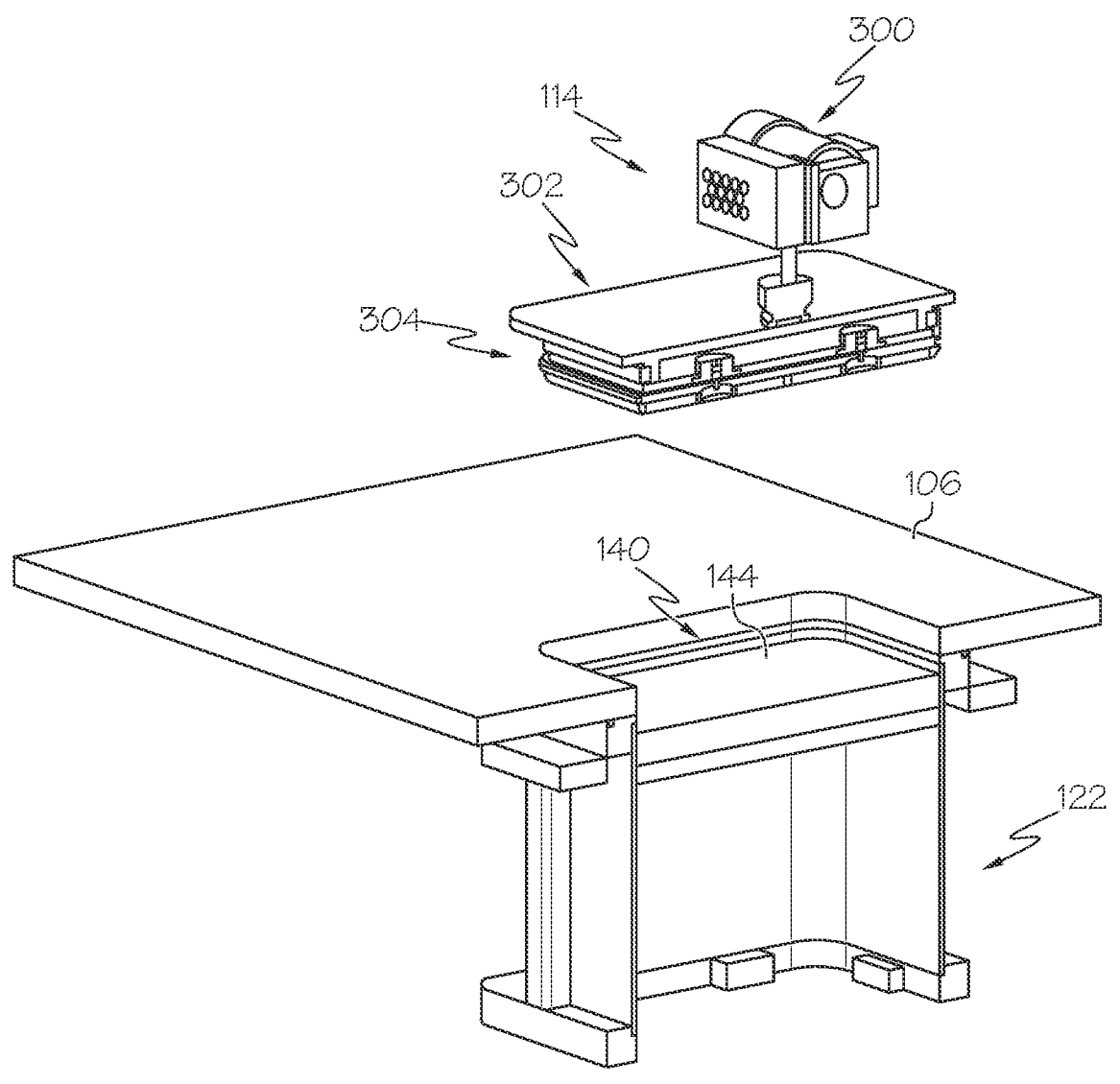
FIG. 27 illustrates operation of the lid management system of FIG. 4, according to one or more embodiments shown and described herein.
Figure 28:
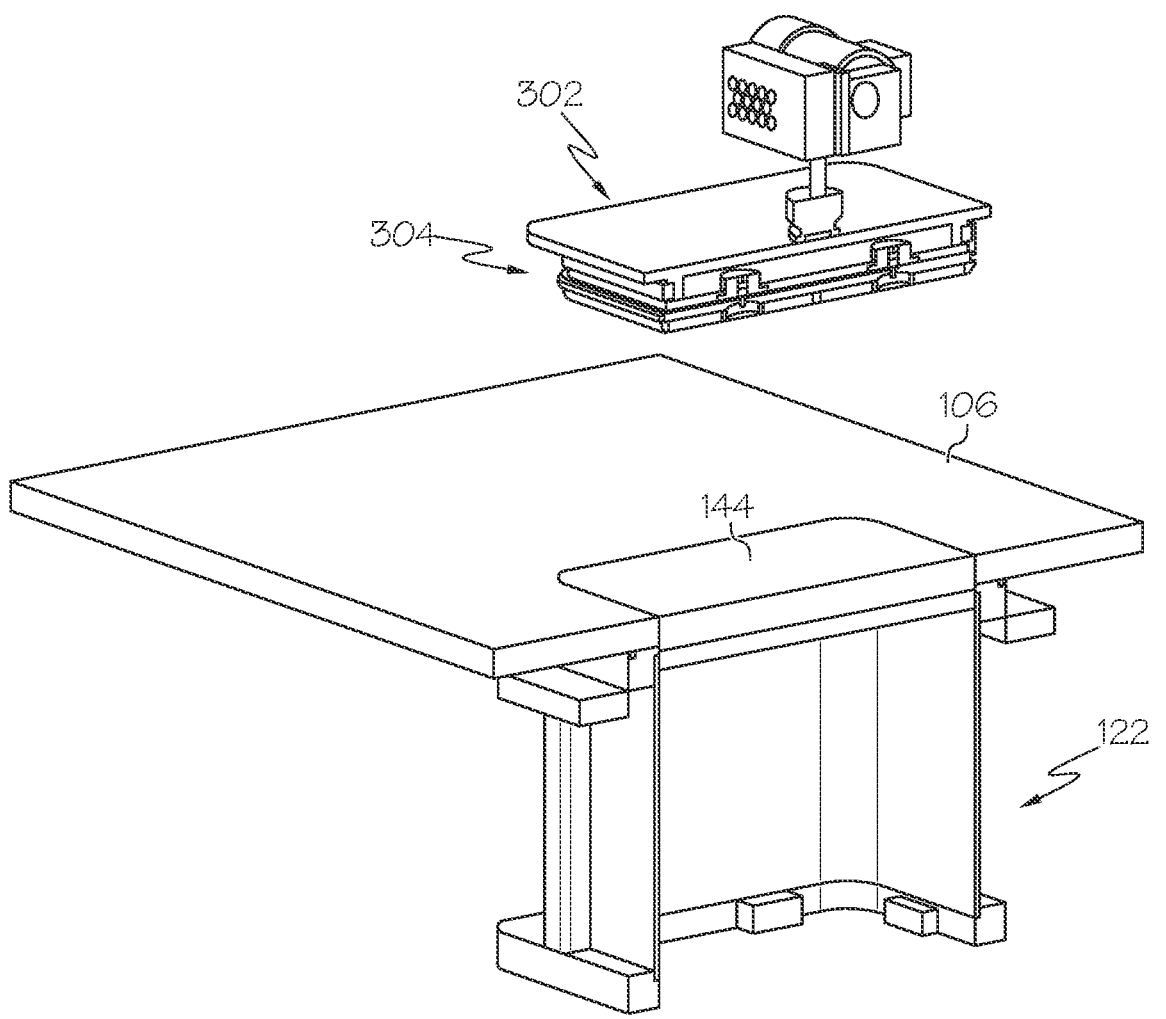
FIG. 28 illustrates operation of the lid management system of FIG. 4, according to one or more embodiments shown and described herein.

Referring to FIG. 27, with the build platform 144 raised, the actuator 300 raises the machine lid 302, which also raises the build box lid 304 due to the connection between the two. Lifting the machine lid 302 with the build box lid 304 exposes the raised build platform 144. In the fully raised position, the lid management system 114 exposes the build platform 144 for a build operation with enough clearance for a build head to pass below the build box lid 304 and over the build platform 144. However, there may be a gap between an inner surface of the process chamber floor 106 and a build surface of the build platform 144. At FIG. 28, the build platform 144 is raised to a level where the build surface of the build platform 144 is or is nearly flush with the inner surface of the process chamber floor 106.

Figure 29:
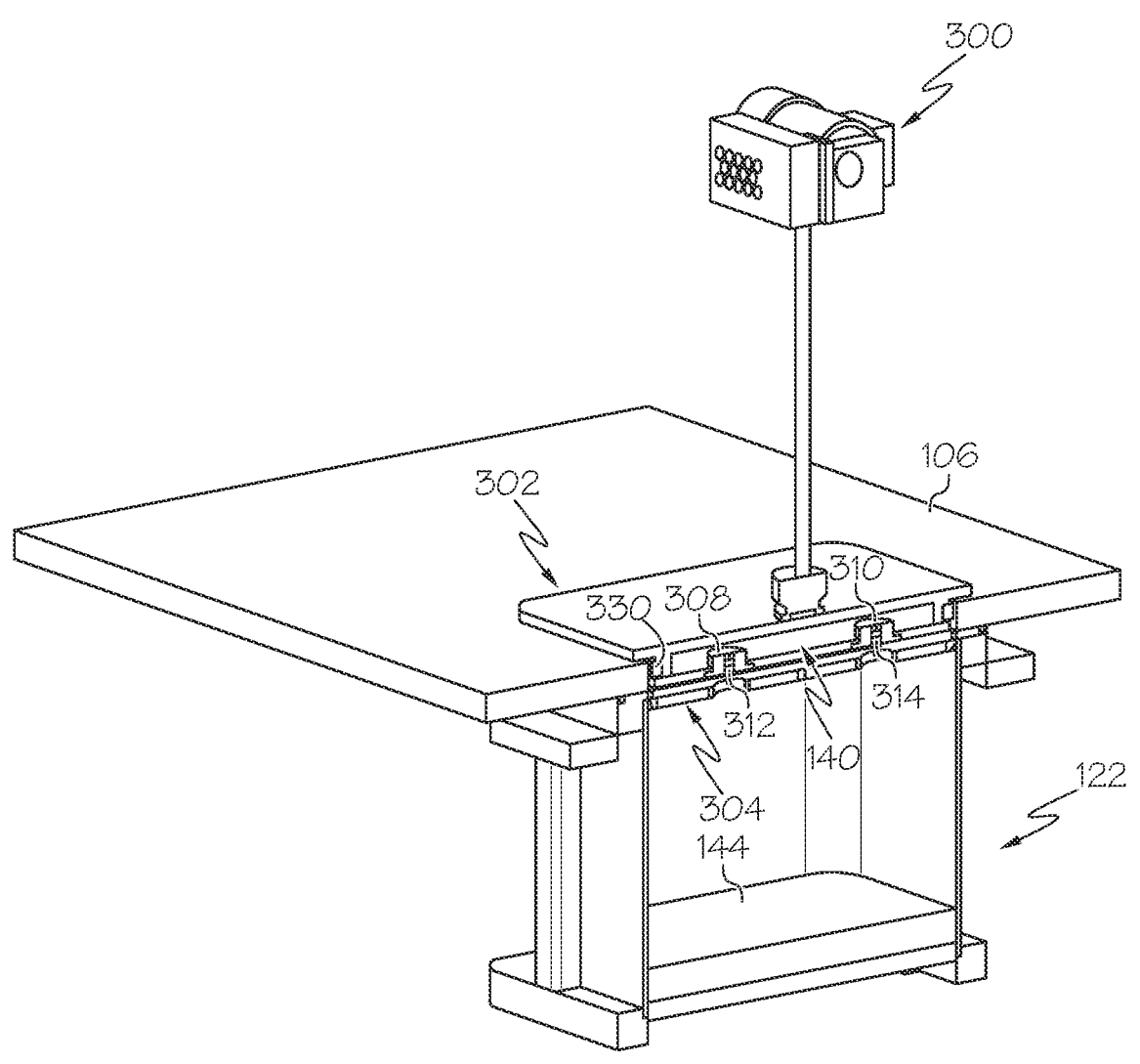
FIG. 29 illustrates operation of the lid management system of FIG. 4, according to one or more embodiments shown and described herein.
Figure 30:
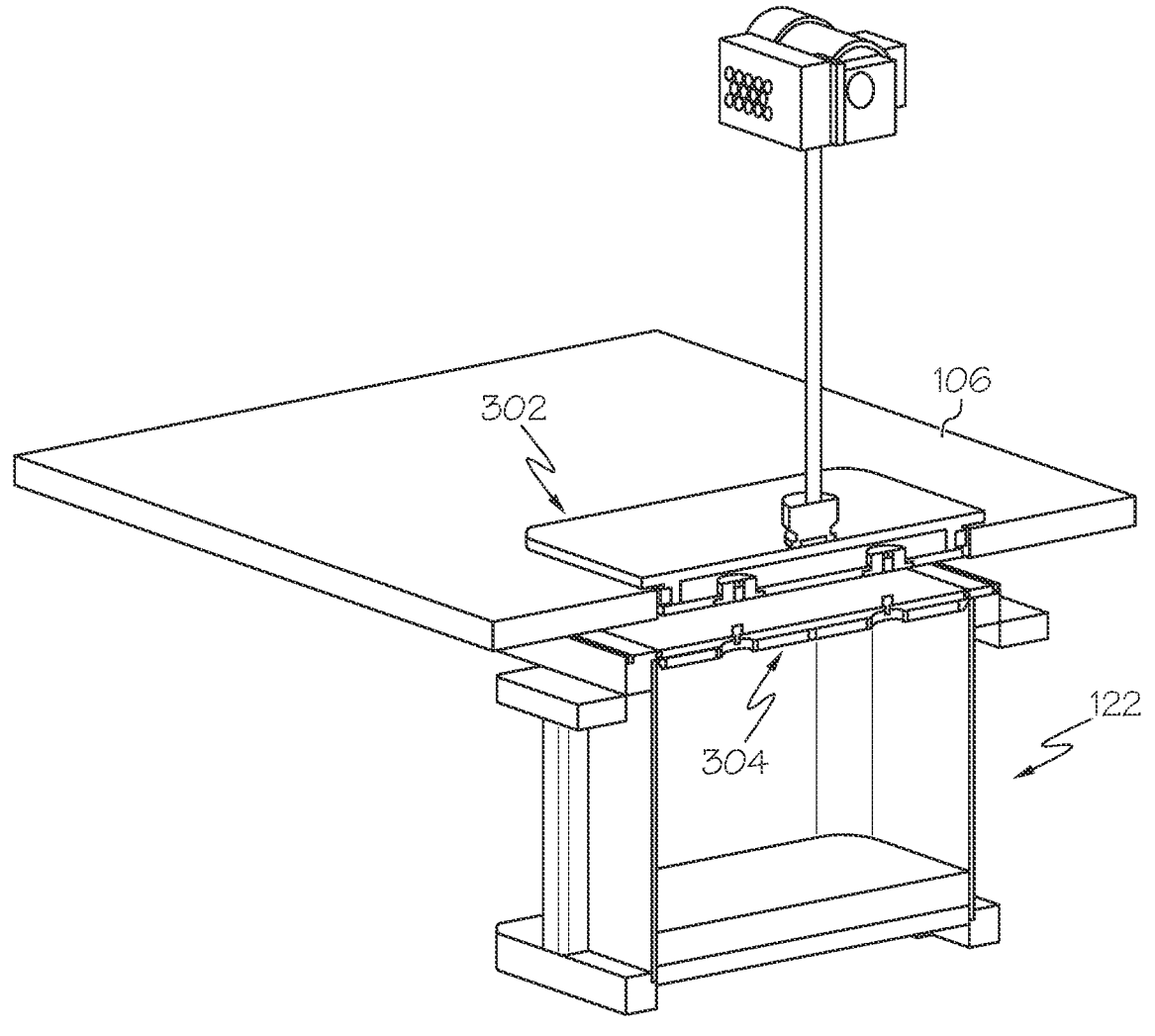
FIG. 30 illustrates operation of the lid management system of FIG. 4, according to one or more embodiments shown and described herein.

Referring now to FIG. 29, at the completion of the build process and with the build platform 144 in a lowered position, the machine lid 302 and the build box lid 304 are lowered toward the opening 140 in the process chamber floor 106. The machine lid 302 and the build box lid 304 are lowered until the build box lid 304 registers with the build box 122 and seals thereagainst to inhibit powder escape. Next, the clamp devices 308 and 310 are actuated (e.g., pneumatically) to release the studs 312 and 314 and the seal 330 of the machine lid 302 is inflated to again seal against the perimeter of the opening 140. The build box 122 is then lowered by the lift platform assembly, as shown by FIG. 30, back onto the elevated conveyor 126, which carries the build box 122 to the outfeed conveyor 128 (FIG. 13).

Figure 31:
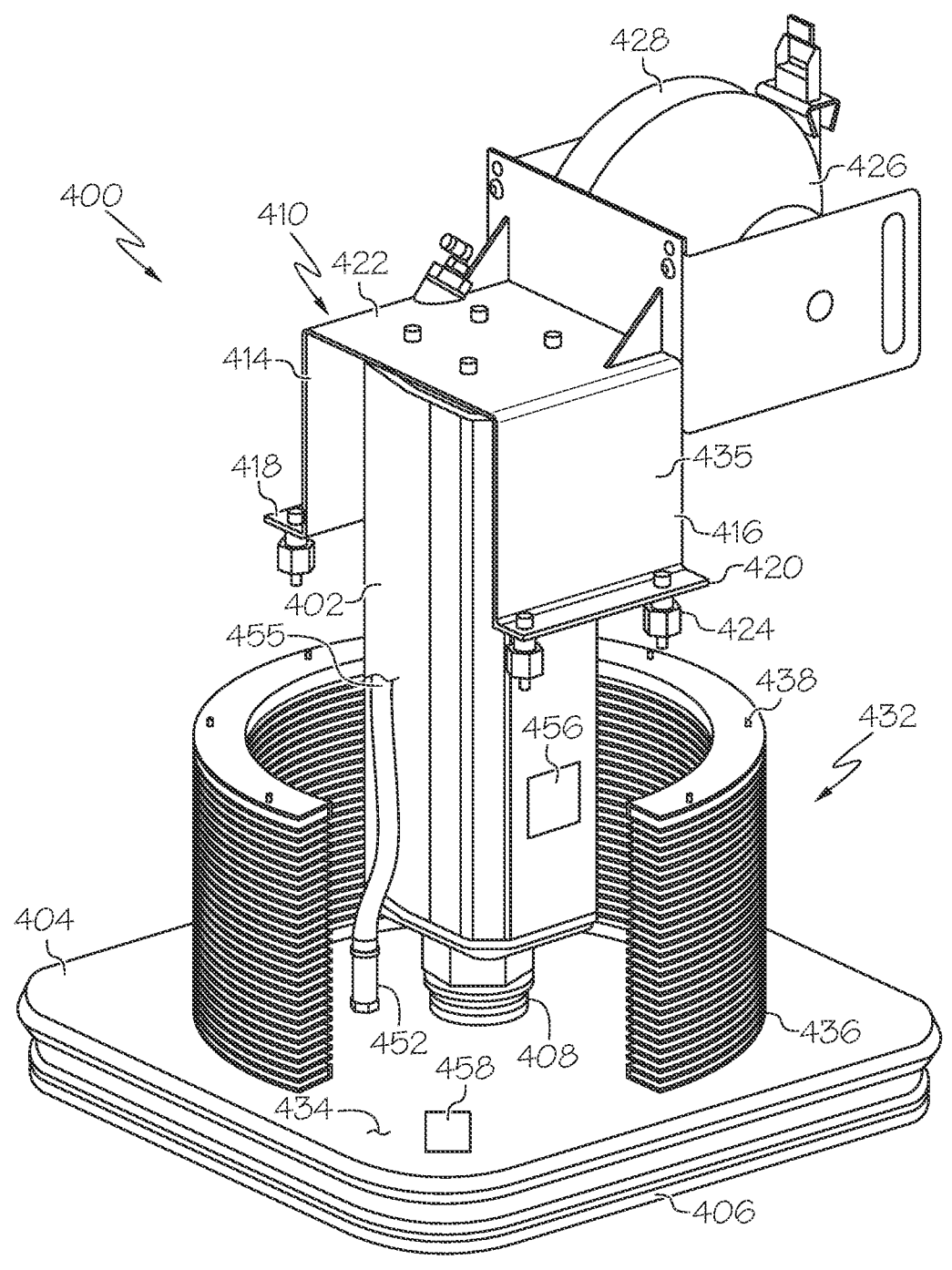
FIG. 31 is a diagrammatic view of another lid management system, according to one or more embodiments shown and described herein.

Referring to FIG. 31, another embodiment of a lid management system 400 is diagrammatically illustrated and includes components that are similar to the lid management system 114 described above including an actuator 402, a machine lid 404 and a build box lid 406. The actuator 402 may be any suitable actuator, such as a telescoping lifting column that is internally motor-driven. The actuator 402 may have an integrated brake that can be used to stop movement of the actuator 402 based on a signal, such as from a proximity sensor or a control input from an operator. The actuator 402 may include a telescoping rod that connects to a connector 408. As above, the connector 408 may be a compliance device that automatically compensates for some X-Y positioning deviations between the rod and the connector 408 when connecting together.

Illustrated by FIG. 31 is an actuator mounting assembly 410 that can be used to mount the lid management system 400 to a top plate that forms a process chamber ceiling of the process chamber. The actuator mounting assembly 410 includes a mounting bracket 435 that includes vertically extending mounting legs 414 and 416 with end flanges 418 and 420 that can be mounted to the top plate of the process chamber. A laterally extending mount 422 extends between the mounting legs 414 and 416 forming an inverted U-shape.

The mount 422 is used to mount to an end of the actuator 402 with the mounting legs 414 and 416 extending down opposite sides of the actuator 402. Each end flange 418 and 420 can include an adjustable fastener 424. In the illustrated embodiment, the adjustable fasteners 424 are located at opposite ends of the end flanges 418 and 420. The adjustable fasteners 424 allow for height adjustment of the mounting legs 414 and 416, which allows for pitch and roll adjustment of the actuator 402 to adjust a travel path of the telescoping rod. A spool 426, such as an e-spool, commercially available from igus GmbH of East Providence, RI, can be used to manage both electrical and pneumatic cables and hoses, represented by element 428, and allow for movement of the electrical and pneumatic connections, for example, with the telescoping rod and machine lid 404.

As discussed above, a bellows 432 may be mounted to a top face 434 of the machine lid 404. One end 436 of the bellows 432 may be sealingly mounted to the top face 434 of the machine lid 404 to form an air-tight seal therebetween while an opposite end 438 may be sealingly mounted to the top plate of the process chamber. Thus, the bellows 432 may expand and contract in an axial direction as the machine lid 404 is moved toward and away from the process chamber floor. In the expanded configuration with the machine lid 404 sealed against the perimeter of the opening in the process chamber floor, the bellows 432 can be used to isolate the air vent components connected to the air vent system from the surrounding inert environment within the process chamber.

Figure 32:
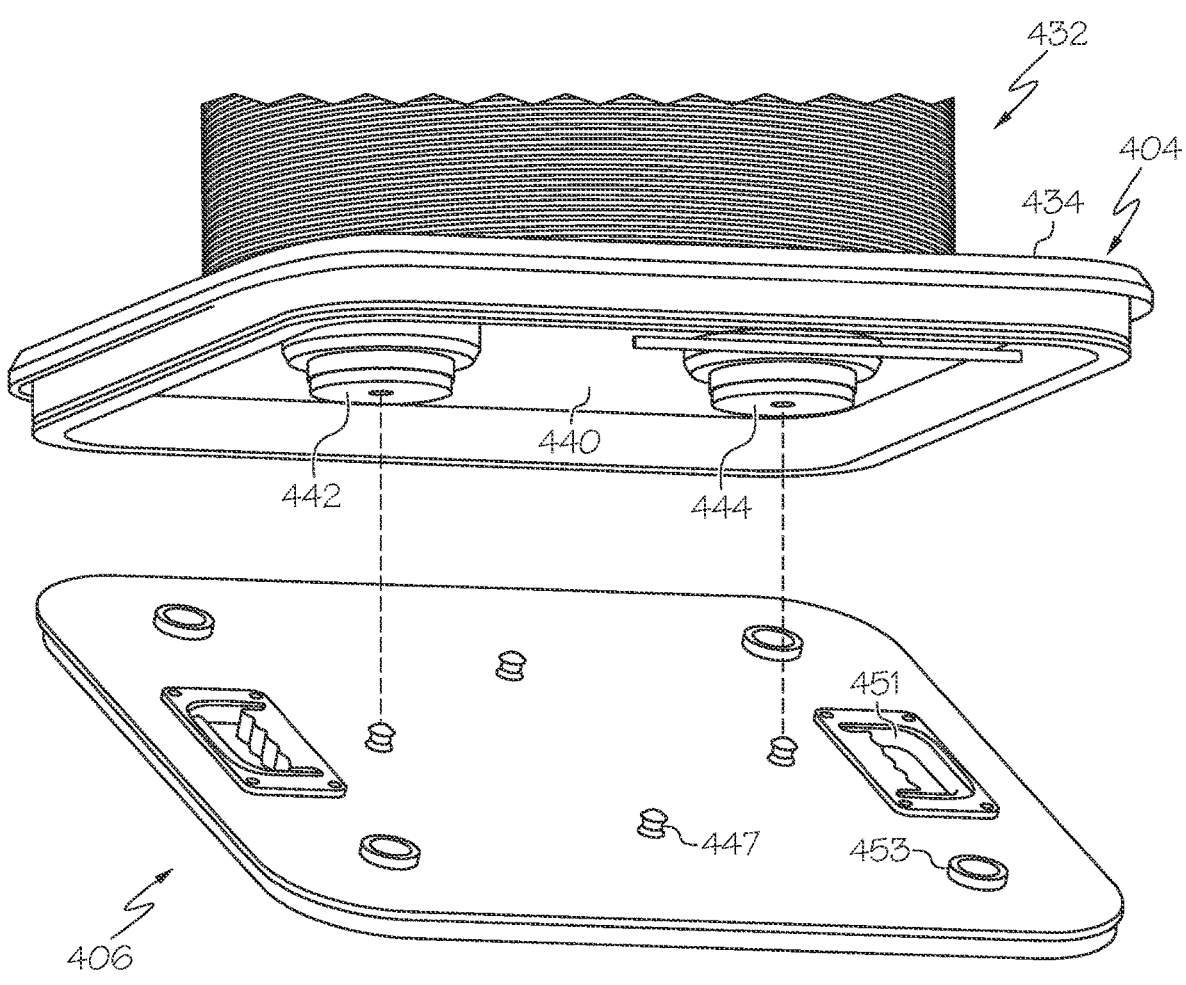
FIG. 32 is a diagrammatic view of a machine lid and an enclosure lid of the lid management system of FIG. 31, according to one or more embodiments shown and described herein.

Referring also to FIG. 32, on a face 440 of the machine lid 404 that is opposite the face 434 are clamp devices 442 and 444. The clamp devices 442 and 444 may be powered, such as using pneumatic or hydraulic power. The clamp devices 442 and 444 clamp onto studs 447 that are mounted to build box lid 406 in the fashion described above. As can be seen, four studs 447 are provided, which can allow the box-shaped build box with build box lid 406 to be fed into the intake conveyor in multiple orientations corresponding to the four sides of the build box. Handles 451 may also be provided to manually handle the build box lid 406. Breather valves 453 may be provided that allow air to enter and exit the build box 122 without allowing escape of powders located therein.

Shown in FIG. 31 is a pressure relief valve 452. The pressure relief valve 452 connects to the air vent system to allow air within the build box 122 to be vented out to the surroundings. As can be seen, the pressure relief valve 452 is located within an interior of the bellows 432 to isolate the pressure relief valve 452 from the inert environment. A tube 455 may be used to connect the pressure relief valve 452 to the vent system. Any number of valves may be used to vent the build box 122. In some embodiments the pressure relief valve 452 may operate when a pressure within the build box 122 reaches a predetermined pressure.

In some embodiments, the lid management system 400 may include one or more sensors in order for a controller to determine and/or monitor various lift events. As one example, the actuator 402 itself may include a position or proximity sensor that can be used by the controller to determine axial position of the telescoping rod and thus the position of the machine lid 404. In some embodiments, a proximity sensor, represented by element 456, may be provided to determine position of the machine lid 404. Another proximity sensor, represented by element 458, may be used to determine the presence of the build box lid 446 connected to the machine lid 404. Further, the connector 408 may have a sensor to provide a signal indicative of a lock/unlock condition. With the various sensors, the system can monitor position of the machine lid 404, presence of the build box lid 406 and lock status of the machine lid 404 during lifting and lowering events and if there is an out-of-parameter condition present. In some embodiments, an indication may be provided to an operator of the various conditions detected by the sensors and whether an out-of-parameter condition is present so that the operator can take an action accordingly.

Figures 33, 34:
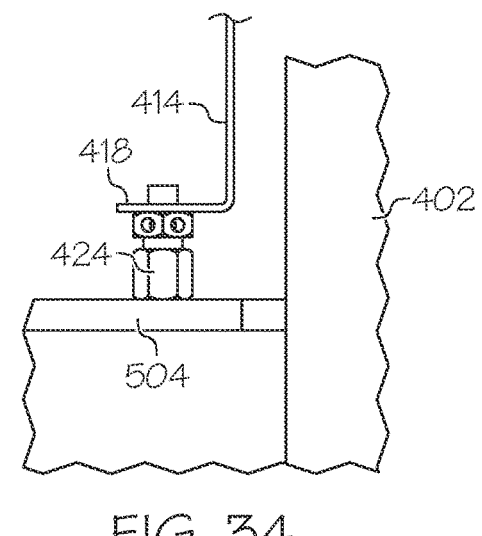
FIG. 33 illustrates operation of the lid management system of FIG. 31, according to one or more embodiments shown and described herein.
FIG. 34 is a detail view of a mounting bracket of the lid management system of FIG. 33, according to one or more embodiments shown and described herein.

Referring now to FIGS. 33 and 34, operation of the lid management system 400 is diagrammatically illustrated within an additive manufacturing apparatus 500. A process chamber 502 includes a top plate 504 and a process chamber floor 506. As described above, the build box 122 is illustrated in a raised position and sealed against the underside of the process chamber floor 506 at opening 520. The build platform 144 is illustrated in a partially raised position.

The lid management system 400 includes the actuator 402 with the actuator mounting assembly 410 that mounts the actuator 402 to a support structure 508 that is located above the top plate 504 of the process chamber 502. The actuator mounting assembly 410 includes the mounting bracket 435 that includes the vertically extending mounting legs 414 and 416 with end flanges 418 and 420 that are mounted to the support structure 508, which is mounted to or a part of the top plate 504. The mount 422 is used to mount to an end of the actuator 402 with the mounting legs 414 and 416 extending down opposite sides of the actuator 402. Each end flange 418 and 420 includes the adjustable fastener 424 that are mounted to the support structure 508.

Use of the support structure 508 that extends above the top plate 504 along with the mounting legs 414 and 416 positions the actuator 402 above the top plate 504. This positioning of the actuator 402 above the top plate 504 allows the actuator 402 to fully retract the machine lid 404 against the top plate 504. In some embodiments, a seal 512 may be provided that seals against the machine lid 404 in the fully raised position to inhibit leaking of inert gas and the escape of powders from the process chamber 502. The machine lid 404 and the build box lid 406 are lifted to a height H (e.g., 600 mm) to provide sufficient clearance for a build head 514 to perform a build operation.

Depowder Station

Figure 35:
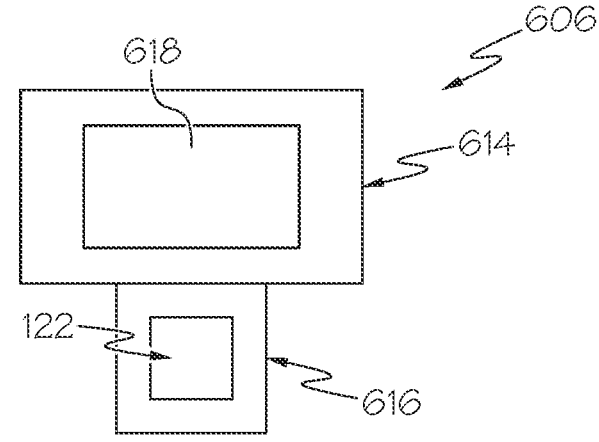
FIG. 35 is a diagrammatic view of an additive manufacturing system including build station and depowder station, according to one or more embodiments shown and described herein.
Figure 35:
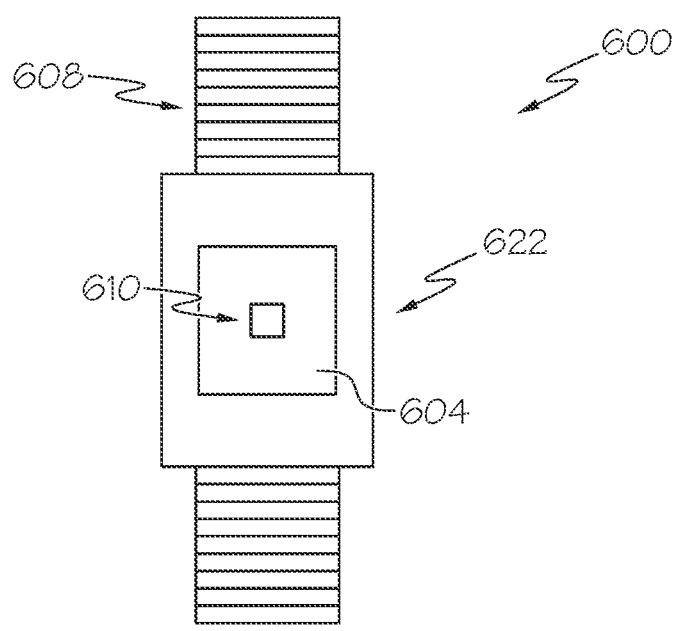

The above-described box management systems and lid management systems or portions thereof may be used for various additive manufacturing apparatuses stations other than the build station itself described above. Referring to FIG. 35, an additive manufacturing system 600 may include a build station 602 that includes a process chamber 604 and a depowder station 606 that may be located near or even be a part of the build station 602. The additive manufacturing system 600 includes a box management system 608 and a lid management system 610 that are the same as or similar to the box management and lid management systems described above. The depowder station 606 may be located near the build station 602. The depowder station 606 is used to remove excess powder from a newly formed three-dimensional part in order to expose the part. The depowder station 606 includes a depowder apparatus 614 and a conveyance apparatus 616. As will be described, the depowder station 606 includes a process chamber 618 and various tools that are used to remove powder from the part. The conveyance apparatus 616 conveys a build box 122 into the process chamber 618 for a depowder operation.

Figure 36:
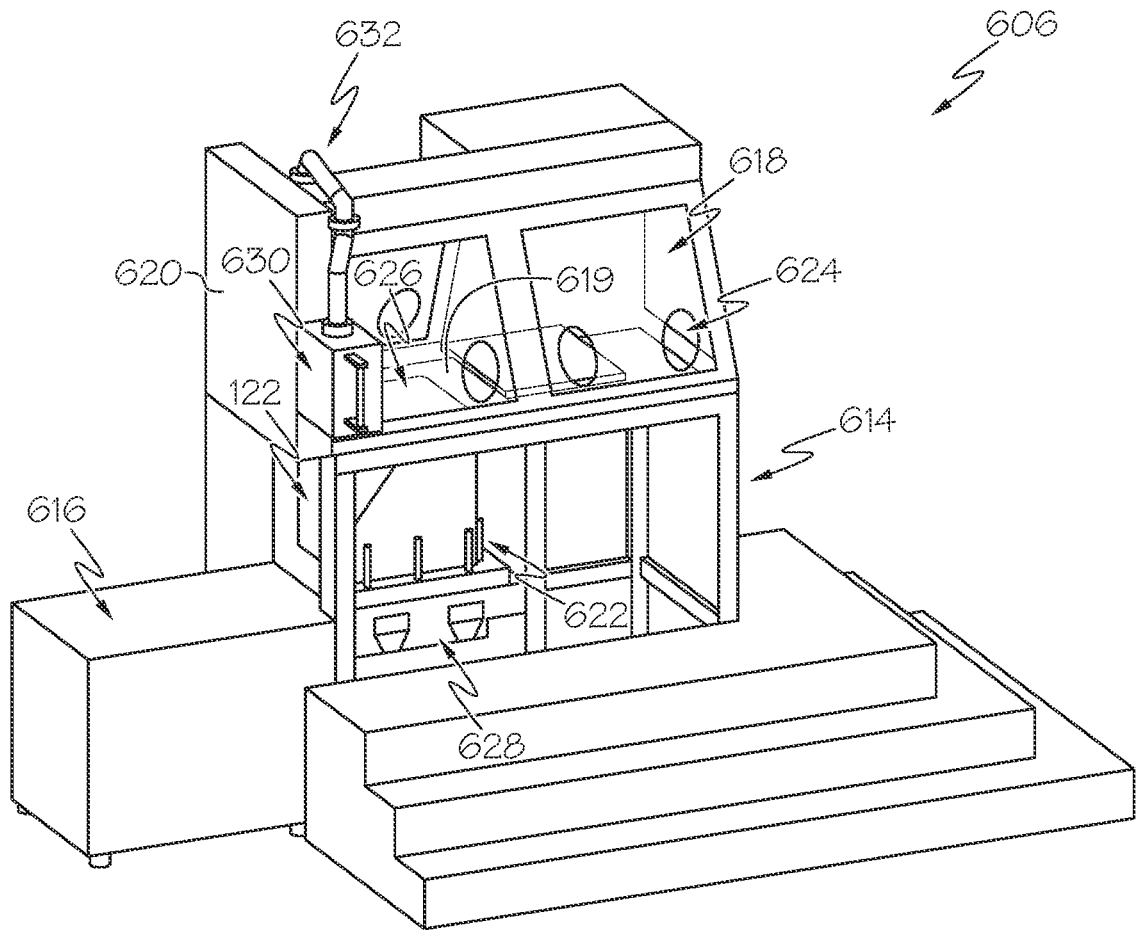
FIG. 36 is a diagrammatic view of the depowder station of FIG. 34, according to one or more embodiments shown and described herein.

FIG. 36 illustrates an exemplary embodiment of the depowder station 606. The depowder station 606 includes the depowder apparatus 614 and the conveyance apparatus

616. The depowder apparatus 614 includes a housing 620 that houses the process chamber 618 therein. A build box chamber 622 is located below the process chamber 618. The depowder apparatus 614 may essentially be a glovebox that can be closed to the surrounding environment. To this end, gloves may be attached to the housing 620 at glove ports 624 that provide manual access to the process chamber 618 while maintaining a gas-tight, sealed environment within the process chamber 618.

The conveyance apparatus 616 comprises a conveyor arrangement that moves the build box 122 into the build box chamber 622. FIG. 36 illustrates the build box 122 located below the process chamber 618. A process chamber floor 619 may include an opening 626 that is similar to opening 140 described above in that the opening 626 provides access to the build box 122 and is sized to allow the build box 122 to seal against the process chamber floor 619. A lift platform assembly 628 may be provided under a conveyance path of the build box 122. The lift platform assembly 628 may be driven, such as using a motor and/or pneumatics. For example, the lift platform assembly 628 may be the same as or similar to the lift platform assemblies described above comprising two stages. In other embodiments, the lift platform assembly 628 may be different than the lift platform assemblies described above. For example, the lift platform assembly 628 may comprise a single stage platform for lifting and lowing the build box 122. A process chamber monitoring device 630 may be provided to a user to monitor conditions within the process chamber. A movable arm 632 may connect the monitoring device 630 to the housing 620 to allow adjustment of a position of the monitoring device 630.

Figure 37:
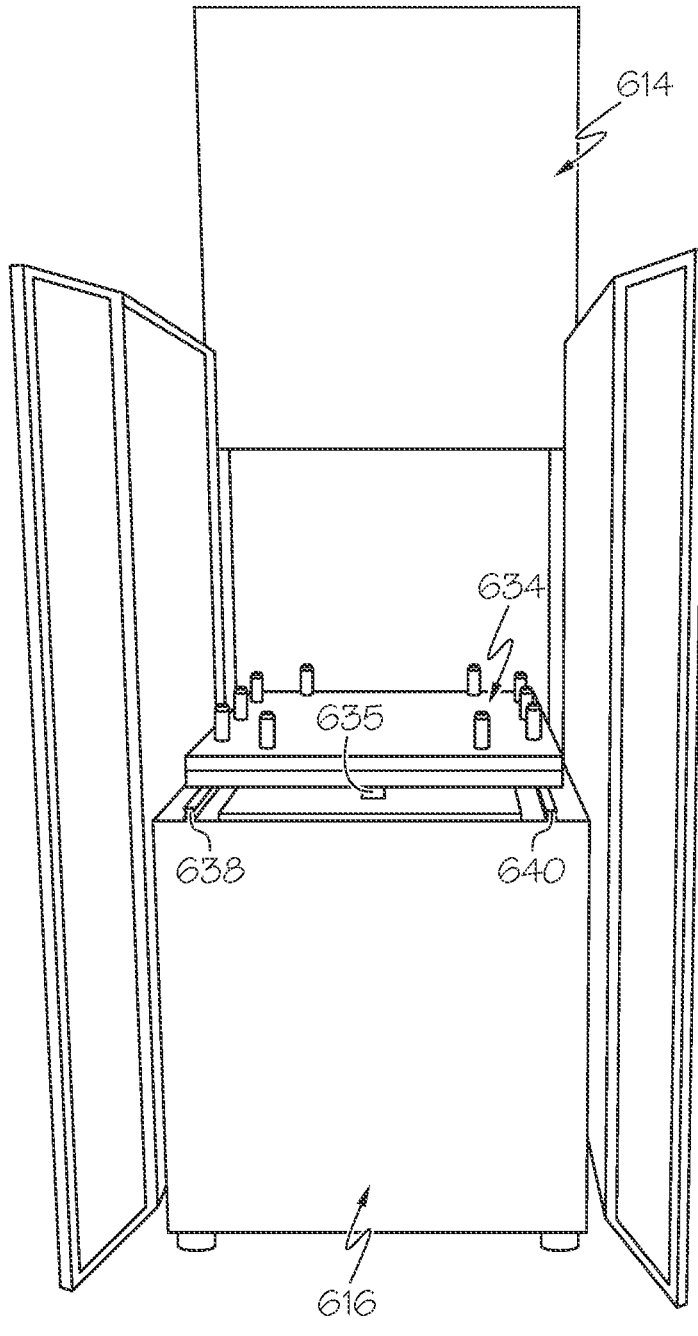
FIG. 37 is a diagrammatic view of a conveyance apparatus of the depowder station of FIG. 36, according to one or more embodiments shown and described herein.
Figure 38:
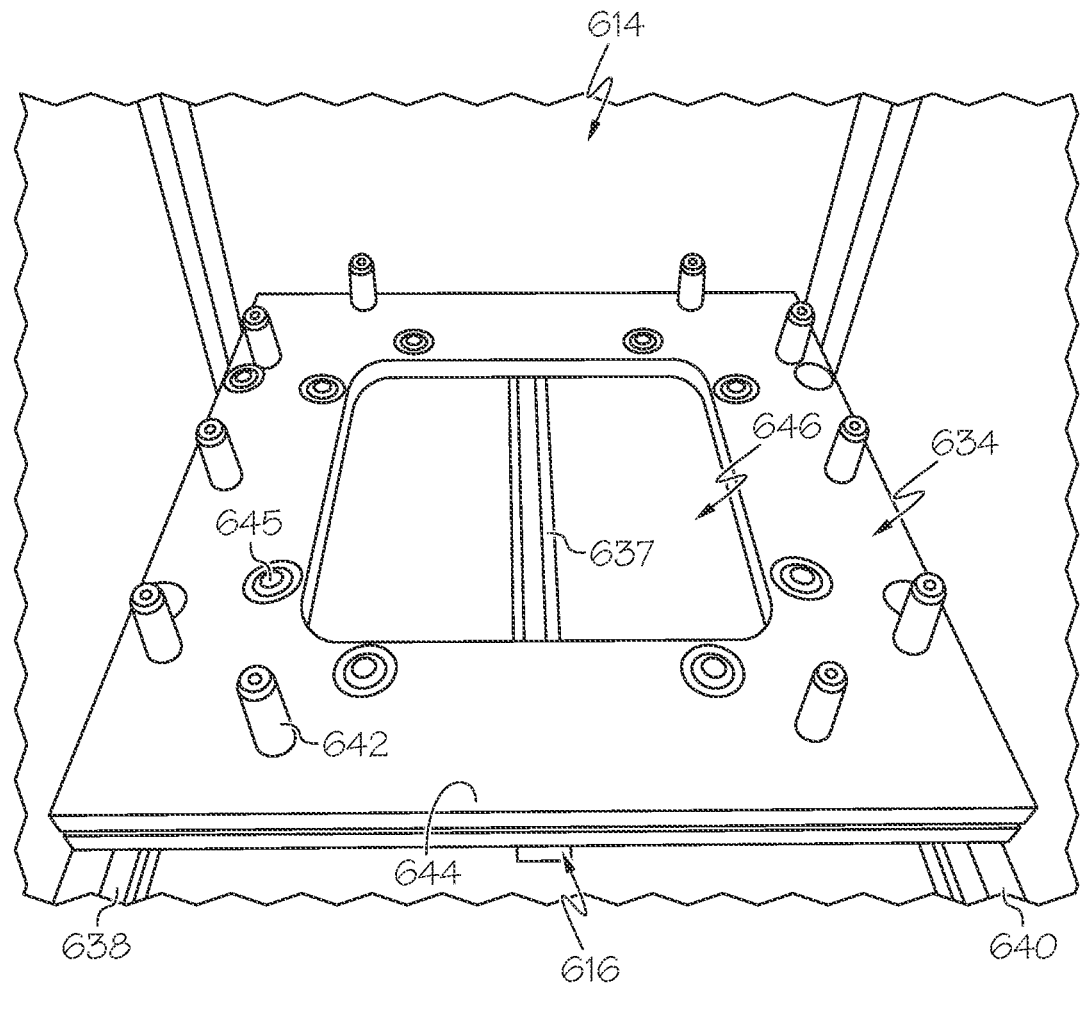
FIG. 38 is a diagrammatic view of a conveyance platform for use with the conveyance apparatus of FIG. 37, according to one or more embodiments shown and described herein.

Referring to FIGS. 37 and 38, the build box 122 rests on a conveyance platform 634. In FIG. 37, the conveyance platform 634 sits on the conveyance apparatus 616. The conveyance apparatus 616 has a top surface 636 that has guide rails 638 and 640 located thereon. The guide rails 638 and 640 extend in a conveyance direction toward the build box chamber 622. The conveyance platform 634 may include rail wheels or other corresponding mating structures that allow the conveyance platform 634 to travel along the guide rails 638 and 640 with the guide rails inhibiting unintended side-to-side movement of the conveyance platform 634 and the build box 122 located thereon. The conveyance apparatus 616 includes a pusher 635 (FIG. 37) that can be driven (e.g., by a motor, pneumatics, etc.) along a track 637 (FIG. 38) to push the conveyance platform 634 along the guide rails 638 and 640. Other conveyor types can be used, such as an elevated chain conveyor, roller conveyor or a combination of a roller conveyor and elevated chain conveyor similar to the conveyor arrangement described above. In one embodiment, the depowder station 612 may include the same box management and lid management systems described above.

Referring particularly to FIG. 38, the conveyance platform 634 includes a number of locating pegs 642 that are distributed over surface 644. The locating pegs 642 are positioned around an area where a build box 122 is to be located. The size of the area may be slightly larger than a footprint of the build box 122, allowing for some side-to-side adjustment of the position of the build box 122. Ball transfer units 645 may be provided to facilitate movement of the build box 122.

An opening 646 may be provided through the conveyance platform 634. The opening 646 may be aligned with the opening 214 in the bottom flange plate 206 (FIG. 11A) of the build box 122. The opening 214 can allow the lift platform assembly 628 to raise the build platform 144 so that an operator can better access the part located thereon rather than reaching into the build box 122, as discussed above for example.

Figure 39:
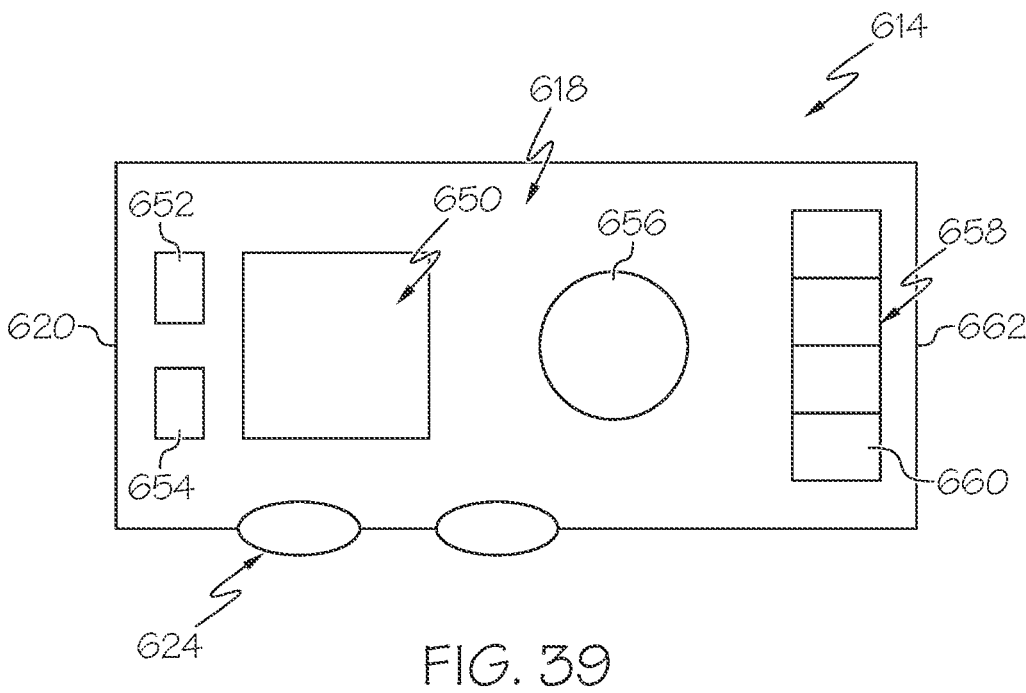
FIG. 39 illustrates a depowder apparatus for use with the depowder station of FIG. 36, according to one or more embodiments shown and described herein.

Referring to FIG. 39, a diagrammatic illustration of the depowder apparatus 614 and, more specifically components of the process chamber 618 is illustrated. The depowder apparatus 614 may include the housing 620 in which the process chamber 618 is located. The housing may have transparent locations e.g., around the glove ports 624 so that the depowdering operation can be viewed from outside the housing 620. A depowdering region 650 is where a part is retrieved from a build platform 144 of a build box 122. A vacuum source 652 and a pressurized gas source 654 may be provided to remove the powder from the part and also from the process chamber 618. Various end effectors (e.g., nozzles) may be provided to aid in powder removal/retrieval. In some embodiments, a turn table 656 may be located in the process chamber 618 to turn the part without holding the part. A tray system 658 that includes multiple trays 660 may be provided that can be used to hold one or more individual parts. An exit 662 may be provided where the trays can be removed (e.g., slip) out of the process chamber 618.

Figure 40:
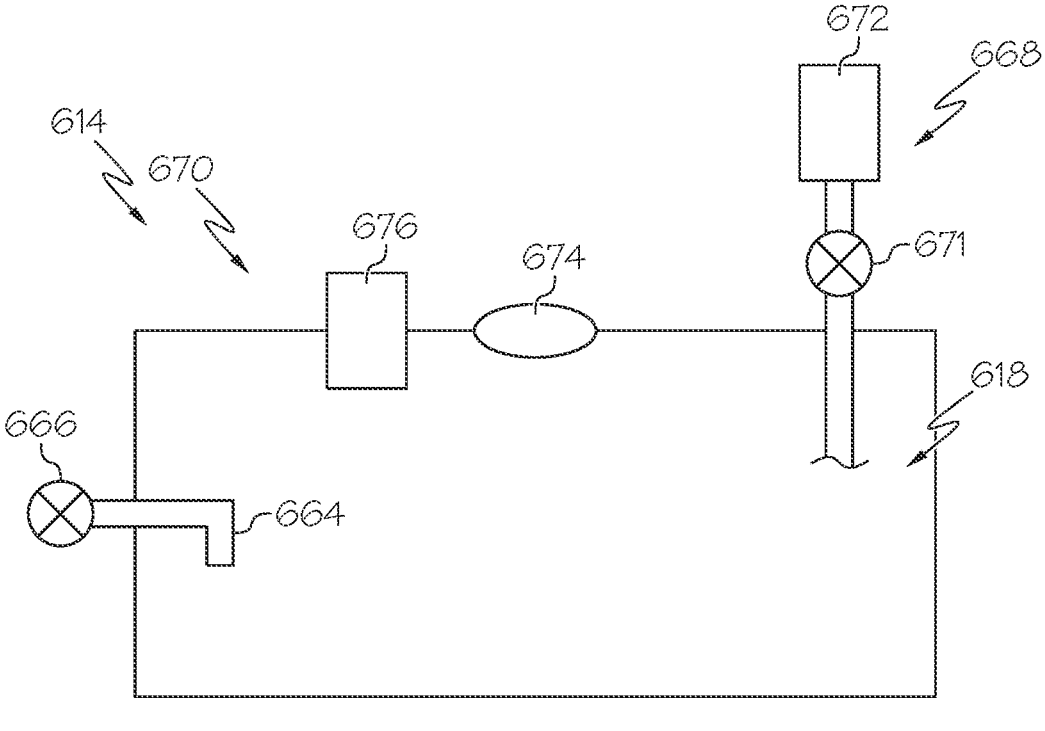
FIG. 40 illustrates an environmental control system for use with the depowder apparatus of FIG. 39, according to one or more embodiments shown and described herein.

Referring to FIG. 40, an environmental control system 670 for the depowder apparatus 614 is illustrated diagrammatically (additive manufacturing apparatus 100 may include a similar system). In this example, the depowder apparatus 614 includes a gas inlet 664 that is connected to a pressurized gas source 666 that provides a gas (e.g., an inert gas, such as nitrogen or argon) to the process chamber 618. An air vent system 668 may allow air to vent out of the process chamber 618 and to the surrounding environment. Various valves 671 and a HEPA filter 672 may allow filtered air to exit the depowder apparatus 614. A pressure transducer 674 may be used to measure pressure within the process chamber 618. The pressure transducer 674 may be a differential pressure transducer that can monitor and set pressure difference between the inside and outside the process chamber 618. A gas sensor 676, such as an oxygen sensor, can measure amounts of a gas inside the process chamber 618.

The above-described additive manufacturing apparatuses include box management systems that automatically carry build boxes through the additive manufacturing apparatuses for a three-dimensional build operation. The box management systems include a lift platform assembly that lifts the build boxes in two stages using an outer lift platform that lifts the entire build box and an inner lift platform that passes through the outer lift platform and lifts a build platform up to a process chamber floor for a build operation.

The above-described additive manufacturing apparatuses also include lid management systems that handle both a machine lid and a build box lid in order to maintain an inert environment within the process chamber. The build box lid may cover a build box to inhibit escape of powder therefrom so that the build box may be transported to and from the process chamber for a build operation. The machine lid may seal an opening in the process chamber floor to maintain an inert environment within the process chamber when a process chamber is removed and replaced. The machine lid includes clamp devices that can be used to clamp onto studs that are carried by the build box lid. When the actuator lifts the machine lid, the build box lid is also lifted thereby exposing the build platform and providing clearance for the build head to perform a build operation.

Further aspects of the invention are provided by the subject matter of the following clauses:

Clause 1: An apparatus for forming a three-dimensional article having successive layers of a powder material, which layers correspond to successive cross-sections of the three-dimensional article, the apparatus comprising: a process chamber comprising a process chamber floor having an opening therethrough, the opening defining a part processing area; and a lid management system comprising: an actuator comprising a movable arm that moves between retracted and extended positions; and a machine lid connected to the movable arm, the machine lid sized and configured to sealingly engage a perimeter of the opening of the process chamber floor with the movable arm in the extended position.

Clause 2: The apparatus of any of the above clauses further comprising a build head that deposits a layer of binder material in a predetermined pattern on a layer of powder material that has been distributed on a build platform located within the opening of the process chamber floor.

Clause 3: The apparatus of any of the above clauses, wherein the machine lid comprises a clamping device configured to clamp onto a build box lid of a build box that comprises the build platform.

Clause 4: The apparatus of any of the above clauses, wherein the machine lid comprises a seal that seals against the perimeter of the opening of the process chamber floor.

Clause 5: The apparatus of any of the above clauses, wherein the seal is inflatable having an inflated configuration of increased dimension and a deflated configuration of decreased dimension.

Clause 6: The apparatus of any of the above clauses further comprising an actuator mounting assembly comprising a mounting bracket that mounts the actuator above a top plate that forms a ceiling of the process chamber.

Clause 7: The apparatus of any of the above clauses, wherein the mounting bracket comprises mounting legs that extend alongside the actuator and a laterally extending mount that extends between the mounting legs, the laterally extending mount connected to the actuator.

Clause 8: The apparatus of any of the above clauses, wherein each mounting leg includes an end flange that mounts to a support structure using one or more adjustable fasteners, the adjustable fasteners providing for height adjustment of the mounting bracket.

Clause 9: The apparatus of any of the above clauses further comprising a build box that is located under the process chamber floor and comprises a build platform located within the opening of the process chamber floor.

Clause 10: The additive manufacturing apparatus of any of the above clauses, wherein the build box comprises a build box lid that seals against an enclosure body of the build box.

Clause 11: A build box for an apparatus for forming a three-dimensional article having successive layers of a powder material, which layers correspond to successive cross-sections of the three-dimensional article, the build box comprising: an enclosure body forming a build volume; a build platform slidably disposed in the build volume; and a build box lid covering the build volume that is removable from the enclosure body.

Clause 12: The build box of any of the above clauses, wherein the build box lid comprises one or more clamping structures on a face of the build box lid that are grasped by a clamping device of the additive manufacturing apparatus for removing the build box lid from the enclosure body.

Clause 13: The build box of any of the above clauses further comprising a top flange plate having an opening therethrough with a perimeter that extends around the enclosure body.

Clause 14: The build box of any of the above clauses further comprising a bottom flange plate having a channel formed therein that receives a bottom edge of the enclosure body.

Clause 15: The build box of any of the above clauses, wherein the build platform comprises multiple, stacked plates that form a groove having a seal located therein that maintains a pressure against an inner surface of the enclosure body.

Clause 16: The build box of any of the above clauses, wherein the enclosure body and build platform are formed of different materials.

Clause 17: A method of sealing a process chamber of an apparatus, the apparatus for forming a three-dimensional article having successive layers of a powder material, which layers correspond to successive cross-sections of the three-dimensional article, the method comprising: sealing an opening that defines a part processing area in a process chamber floor using a machine lid, the machine lid connected to a movable arm of an actuator for moving the machine lid toward and away from the opening in the process chamber floor; and removing the machine lid from the opening.

Clause 18: The method of any of the above clauses further comprising introducing an inert gas to the process chamber with the machine lid sealing the opening.

Clause 19: The method of any of the above clauses further comprising sealing around the opening using a build box, the build box comprising a build box lid.

Clause 20: The method of any of the above clauses further comprising raising a build platform using a lift platform assembly, wherein the build platform engages and raises the build box lid.

Clause 21: The method of any of the above clauses, wherein the build box lid comprises a stud, the method further comprising the machine lid grasping the stud using a clamping device.

Clause 22: The method of any of the above clauses further comprising the actuator raising the machine lid and the build box lid together thereby exposing the build platform.

Clause 23: The method of any of the above clauses further comprising: lowering the build platform using the lift platform assembly; and lowering the build box lid and the machine lid together such that the build box lid sealing against the build box and the machine lid sealing against a perimeter of the opening in the process chamber floor.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. An apparatus for forming a three-dimensional article having successive layers of a powder material, which layers correspond to successive cross-sections of the three-dimensional article, the apparatus comprising:

a process chamber comprising a process chamber floor having an opening therethrough, the opening defining a part processing area; and a lid management system comprising:

an actuator comprising a movable arm that moves between retracted and extended positions; and a machine lid connected to the movable arm by a connector located on a top face of the machine lid, the machine lid sized and configured to sealingly engage a perimeter of the opening of the process chamber floor with the movable arm in the extended position.

2. The apparatus of claim 1 further comprising a build head that deposits a layer of binder material in a predetermined pattern on a layer of powder material that has been distributed on a build platform located within the opening of the process chamber floor.

3. The apparatus of claim 1, wherein the machine lid comprises a clamping device configured to clamp onto a build box lid of a build box that comprises the build platform.

4. The apparatus of claim 1, wherein the machine lid comprises a seal that seals against the perimeter of the opening of the process chamber floor.

5. The apparatus of claim 4, wherein the seal is inflatable having an inflated configuration of increased dimension and a deflated configuration of decreased dimension.

6. The apparatus of claim 1 further comprising an actuator mounting assembly comprising a mounting bracket that mounts the actuator above a top plate that forms a ceiling of the process chamber.

7. The apparatus of claim 6, wherein the mounting bracket comprises mounting legs that extend alongside the actuator and a laterally extending mount that extends between the mounting legs, the laterally extending mount connected to the actuator.

8. The apparatus of claim 7, wherein each mounting leg includes an end flange that mounts to a support structure using one or more adjustable fasteners, the adjustable fasteners providing for height adjustment of the mounting bracket.

9. The apparatus of claim 1 further comprising a build box that is located under the process chamber floor and comprises a build platform located within the opening of the process chamber floor.

10. The additive manufacturing apparatus of claim 9, wherein the build box comprises a build box lid that seals against an enclosure body of the build box.

11. A build box for an apparatus for forming a three-dimensional article having successive layers of a powder material, which layers correspond to successive cross-sections of the three-dimensional article, the build box comprising:

an enclosure body forming a build volume;

a build platform slidably disposed in the build volume; and a build box lid covering the build volume that is removable from the enclosure body, the build box lid comprising a connector located on a top face of the machine lid.

12. The build box of claim 11, wherein the build box lid comprises one or more clamping structures on a face of the build box lid that are grasped by a clamping device of the additive manufacturing apparatus for removing the build box lid from the enclosure body.

13. The build box of claim 11 further comprising a top flange plate having an opening therethrough with a perimeter that extends around the enclosure body.

14. The build box of claim 13 further comprising a bottom flange plate having a channel formed therein that receives a bottom edge of the enclosure body.

15. The build box of claim 11, wherein the build platform comprises multiple, stacked plates that form a groove having a seal located therein that maintains a pressure against an inner surface of the enclosure body.

16. The build box of claim 11, wherein the enclosure body and build platform are formed of different materials.

17. A method of sealing a process chamber of an apparatus, the apparatus for forming a three-dimensional article having successive layers of a powder material, which layers correspond to successive cross-sections of the three-dimensional article, the method comprising:

sealing an opening that defines a part processing area in a process chamber floor using a machine lid, the machine lid connected to a movable arm of an actuator for moving the machine lid toward and away from the opening in the process chamber floor, the movable arm connected to a connector located on a top face of the machine lid; and removing the machine lid from the opening.

18. The method of claim 17 further comprising introducing an inert gas to the process chamber with the machine lid sealing the opening.

19. The method of claim 17 further comprising sealing around the opening using a build box, the build box comprising a build box lid.

20. The method of claim 19 further comprising raising a build platform using a lift platform assembly, wherein the build platform engages and raises the build box lid.

\* \* \* \* \*